US012760804B2

(12) United States Patent
Ogawa et al.

(10) Patent No.: US 12,760,804 B2
(45) Date of Patent: Oct. 13, 2026

(54) VALVE APPARATUS

(71) Applicant: DENSO CORPORATION, Kariya-city (JP)

(72) Inventors: Hiroshi Ogawa, Nisshin-city (JP); Kazuhide Uchida, Nisshin-city (JP); Mikio Matsuda, Nisshin-city (JP); Teppei Matsumoto, Kariya-city (JP); Akira Higuchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 166 days.

(21) Appl. No.: 18/732,284

(22) Filed: Jun. 3, 2024

(65) Prior Publication Data

US 2024/0318734 A1 Sep. 26, 2024

Related U.S. Application Data

(63) Continuation of application No. PCT/JP2022/038746, filed on Oct. 18, 2022.

(30) Foreign Application Priority Data

Dec. 7, 2021 (JP) ................................. 2021-198457

(51) Int. Cl.
*F16K 11/074* (2006.01)
*F16K 3/04* (2006.01)
*F16K 41/10* (2006.01)

(52) U.S. Cl.
CPC .............. *F16K 11/074* (2013.01); *F16K 3/04* (2013.01); *F16K 41/106* (2013.01)

(58) Field of Classification Search
CPC ......... F16K 11/074; F16K 41/106; F16K 3/04
See application file for complete search history.

(56) References Cited

U.S. PATENT DOCUMENTS 9,109,824 B2 * 8/2015 Pawlik .................... F25B 41/31
9,803,759 B2 * 10/2017 Bachofer ............ F16K 11/0743
9,920,842 B1 * 3/2018 Karani ................ F16K 37/0016
10,094,489 B2 * 10/2018 Freitas .................... F16K 47/04
11,566,481 B2 * 1/2023 Chambers ................. E21B 7/06
11,965,601 B2 * 4/2024 Kondo .................... F16K 31/04
(Continued)

FOREIGN PATENT DOCUMENTS

CN 110657268 A 1/2020
WO 2020002337 A1 1/2020

*Primary Examiner* — Craig M Schneider
*Assistant Examiner* — Christopher D Ballman
(74) *Attorney, Agent, or Firm* — Nixon & Vanderhye P.C.

(57) ABSTRACT

A rotor is placed on one axial side relative to a passage hole forming portion at an inside of a housing. A differential pressure device is placed on the one axial side relative to the rotor and has a pressure chamber. The housing has: a one-side space that is placed on the one axial side relative to the rotor; and at least one other-side space that is placed on another axial side, which is opposite to the one axial side, relative to the passage hole forming portion. The differential pressure device generates an urging force that urges the rotor against the passage hole forming portion by a differential pressure between a pressure in the pressure chamber and a pressure in the one-side space in a case where a pressure in the at least one other-side space is higher than the pressure in the one-side space.

18 Claims, 24 Drawing Sheets

(56) References Cited

U.S. PATENT DOCUMENTS

| | | | | |
|---|---|---|---|---|
| 12,449,043 | B2 * | 10/2025 | Mizunuma ................ | F01P 7/16 |
| 2015/0233483 | A1 | 8/2015 | Bachofer | |
| 2022/0196157 | A1 | 6/2022 | Mizunuma et al. | |

* cited by examiner (a)

(b)

VALVE APPARATUS

CROSS REFERENCE TO RELATED APPLICATIONS

This application is a continuation application of International Patent Application No. PCT/JP2022/038746 filed on Oct. 18, 2022, which designated the U.S. and claims the benefit of priority from Japanese Patent Application No. 2021-198457 filed on Dec. 7, 2021. The entire disclosures of all of the above applications are incorporated herein by reference.

TECHNICAL FIELD

The present disclosure relates to a valve apparatus configured to conduct a fluid.

BACKGROUND

Previously, there has been proposed a valve apparatus that includes a drive disk and a stationary disk which are placed in a flow passage in a housing and are stacked one on top of the other. The drive disk is rotated about a predetermined central axis while sliding relative to the stationary disk. In the valve apparatus described above, an opening port is changed from one to another according to a rotational position of the drive disk, and thereby a flow passage in the housing is changed from one to another.

Furthermore, in the valve apparatus described above, the drive disk is urged against the stationary disk by an urging spring. Thereby, a gap between the drive disk and the stationary disk is sealed. That is, a constant contact pressure is applied to a contact surface of the drive disk and a contact surface of the stationary disk, which are in contact with each other, so that leakage of the fluid through the gap between the drive disk and the stationary disk is limited.

SUMMARY

This section provides a general summary of the disclosure, and is not a comprehensive disclosure of its full scope or all of its features.

According to the present disclosure, there is provided a valve apparatus that includes a housing, a passage hole forming portion, a rotor and a differential pressure device. The passage hole forming portion is placed in the housing and is not rotatable relative to the housing. The passage hole forming portion has at least one passage hole which is configured to conduct a fluid through the at least one passage hole. The rotor is placed in the housing on one axial side relative to the passage hole forming portion in an axial direction of a predetermined central axis of the rotor. The rotor is configured to rotate about the predetermined central axis while sliding relative to the passage hole forming portion. The differential pressure device is placed on the one axial side relative to the rotor in the axial direction and has a pressure chamber which is configured to receive the fluid. The differential pressure device is configured to generate an urging force that urges the rotor against the passage hole forming portion.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
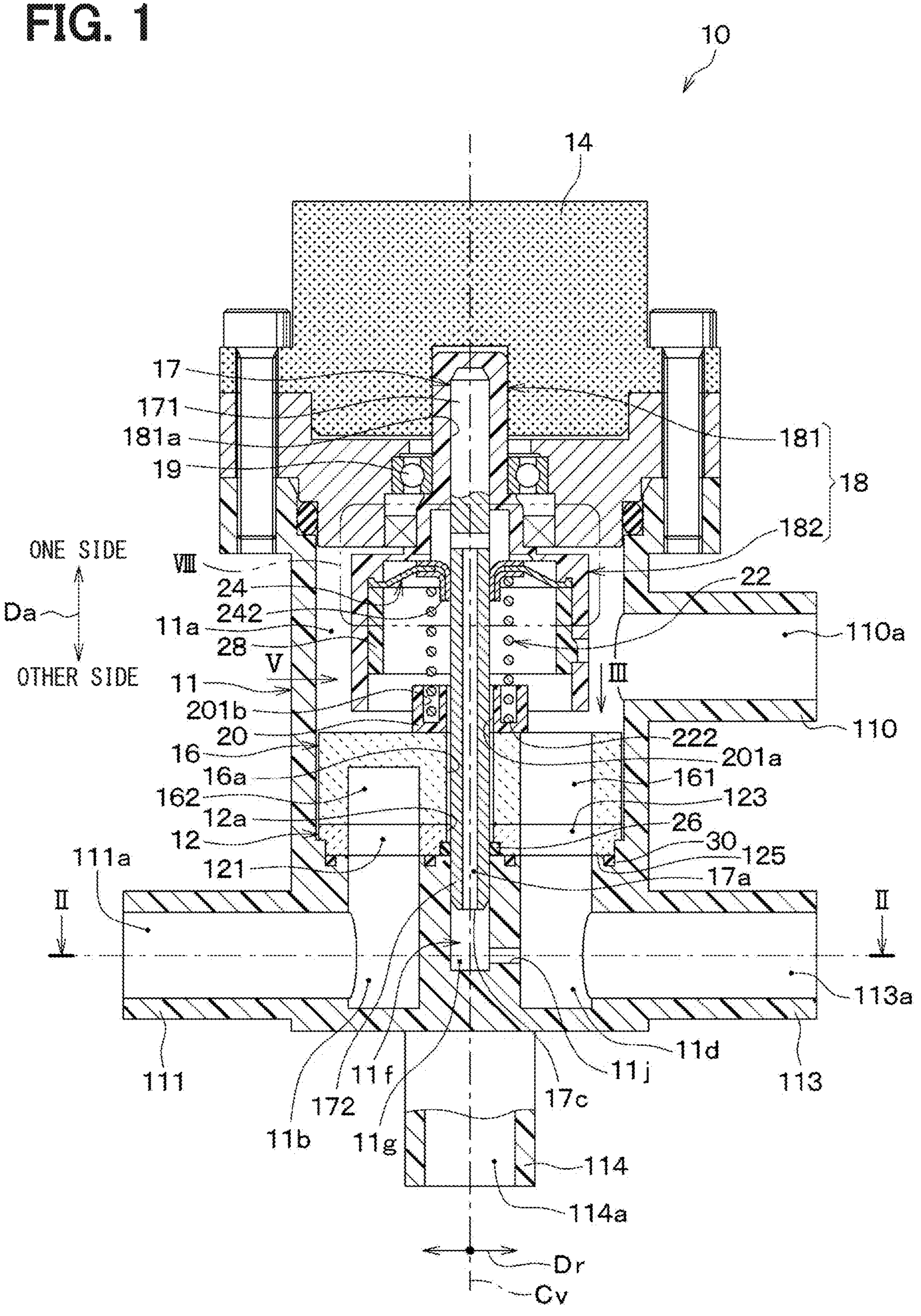
FIG. 1 is a schematic longitudinal cross-sectional view of a valve apparatus of a first embodiment taken along a plane which includes a valve central axis of the valve apparatus.

Previously, there has been proposed a valve apparatus that includes a drive disk and a stationary disk which are placed in a flow passage in a housing and are stacked one on top of the other. The drive disk is rotated about a predetermined central axis while sliding relative to the stationary disk. In the valve apparatus described above, an opening port is changed from one to another according to a rotational position of the drive disk, and thereby a flow passage in the housing is changed from one to another.

Furthermore, in the valve apparatus described above, the drive disk is urged against the stationary disk by an urging spring. Thereby, a gap between the drive disk and the stationary disk is sealed. That is, a constant contact pressure is applied to a contact surface of the drive disk and a contact surface of the stationary disk, which are in contact with each other, so that leakage of the fluid through the gap between the drive disk and the stationary disk is limited.

In recent years, a demand for greater functionality in the valve apparatus has created the following need that did not exist in the past. Here, it is assumed that in the valve apparatus, a flow of the fluid from the drive disk side to the stationary disk side is referred to as a forward flow. In such a case, it is necessary to consider a reverse flow, which is a flow of the fluid from the stationary disk side to the drive disk side, depending on an operation mode of a system which is provided with the valve device.

In the case of the reverse flow, a fluid pressure at the stationary disk side becomes higher than a fluid pressure at the drive disk side in the flow passage in the housing, and thereby a reverse pressure, which is a fluid pressure that lifts the drive disk away from the stationary disk, is generated. The reverse pressure becomes higher at the time when a large flow rate occurs, or at the time when the flow passage is fully closed by the drive disk.

When a lifting force, which lifts the drive disk by the reverse pressure, becomes larger than a load of the urging spring, the drive disk is lifted away from the stationary disk, and a gap is generated between the drive disk and the stationary disk. Therefore, leakage of the fluid is generated between the drive disk and the stationary disk, and thereby the function of the valve apparatus is deteriorated.

It is conceivable to have a countermeasure of increasing the load of the urging spring by taking the reverse pressure into account to limit this situation. However, since the load of the urging spring is the constant load, the load of the urging spring may become larger than the required load in, for example, a case where the reverse pressure is not generated. When the load of the urging spring becomes large, a frictional torque, which is caused by friction between the drive disk and the stationary disk, is increased. Therefore, the countermeasure of increasing the load of the urging spring by taking the reverse pressure into account requires an increase in a drive force of an actuator that rotates the drive disk, and thereby it will result in a large increase in the costs. As a result of the diligent study of the inventors of the present application, the above finding is made.

According to the present disclosure, there is provided a valve apparatus including:

- a housing that is configured to conduct a fluid through an inside of the housing;
- a passage hole forming portion that is placed in the housing and is not rotatable relative to the housing, wherein the passage hole forming portion has at least one passage hole which is configured to conduct the fluid through the at least one passage hole;
- a rotor that is placed in the housing on one axial side relative to the passage hole forming portion in an axial direction of a predetermined central axis of the rotor, wherein the rotor is configured to rotate about the predetermined central axis while sliding relative to the passage hole forming portion; and
- a differential pressure device that is placed on the one axial side relative to the rotor in the axial direction and has a pressure chamber which is configured to receive the fluid, wherein:

the housing has:

- a one-side space that is placed on the one axial side relative to the rotor in the axial direction; and
- at least one other-side space that is placed on another axial side, which is opposite to the one axial side, relative to the passage hole forming portion in the axial direction, wherein the at least one other-side space is communicated with the at least one passage hole;

the rotor is configured to increase or decrease an opening degree of the at least one passage hole relative to the one-side space in response to rotation of the rotor;

the differential pressure device is configured to generate an urging force that urges the rotor against the passage hole forming portion by a differential pressure between a pressure in the pressure chamber and a pressure in the one-side space at least when a pressure in the at least one other-side space is higher than the pressure in the one-side space; and the urging force is increased when the pressure in the pressure chamber is increased relative to the pressure in the one-side space.

According to the above construction, although the reverse pressure, which is the fluid pressure that lifts the rotor away from the passage hole forming portion, is generated in the case where the pressure in the at least one other-side space is larger than the pressure in the one-side space, the differential pressure device urges the rotor against the passage hole forming portion against the reverse pressure. Furthermore, the urging force of the differential pressure device is increased in response to the increase in the pressure in the pressure chamber relative to the pressure in the one-side space, so that the urging force of the differential pressure device is adjusted according to the amount of the reverse pressure. Therefore, it is possible to limit the lifting of the rotor away from the passage hole forming portion while limiting the excessive increase in the frictional torque between the rotor and the passage hole forming portion.

Here, the rotor serves as the drive disk discussed above, and the passage hole forming portion serves as the stationary disk discussed above.

Furthermore, the term "at least" described above means that the urging force of the differential pressure device may be generated in a case that is other than the case where the pressure in the at least one other-side space is higher than the pressure in the one-side space. Additionally, the term "at least" described above does not necessarily limit the structure of the valve apparatus to the structure of the differential pressure device which always generates the urging force in the case where the pressure in the at least one other-side space is higher than the pressure in the one-side space.

The reference sign in parentheses attached to each component indicates an example of the correspondence between this component and the specific component described in the embodiment(s) described later.

Hereinafter, each of embodiments will be described with reference to the drawings. In each of the following embodiments, portions, which are the same or equivalent to each other, will be indicated by the same reference signs.

First Embodiment

A valve apparatus 10 of the present embodiment is a heat medium control valve for a vehicle and is installed at, for example, a hybrid vehicle. The valve apparatus 10 shown in FIGS. 1 and 2 forms a part of a heat medium circuit that circulates a heat medium by a pump through: for example, a vehicle driving power source; a radiator; a battery cooling heat exchanger; and a heater core that is an air conditioning heat exchanger. Therefore, the heat medium, which is circulated through the heat medium circuit, flows through the valve apparatus 10.

The valve apparatus 10 can increase or decrease a flow rate of the heat medium in the flow path through the valve apparatus 10 in the heat medium circuit, and the valve apparatus 10 can also switch or shut off the flow path. The heat medium, which is circulated through the valve apparatus 10, is a fluid in a liquid form, and, for example, a water-based coolant, which contains ethylene glycol, may be used as the heat medium.

Figure 2:
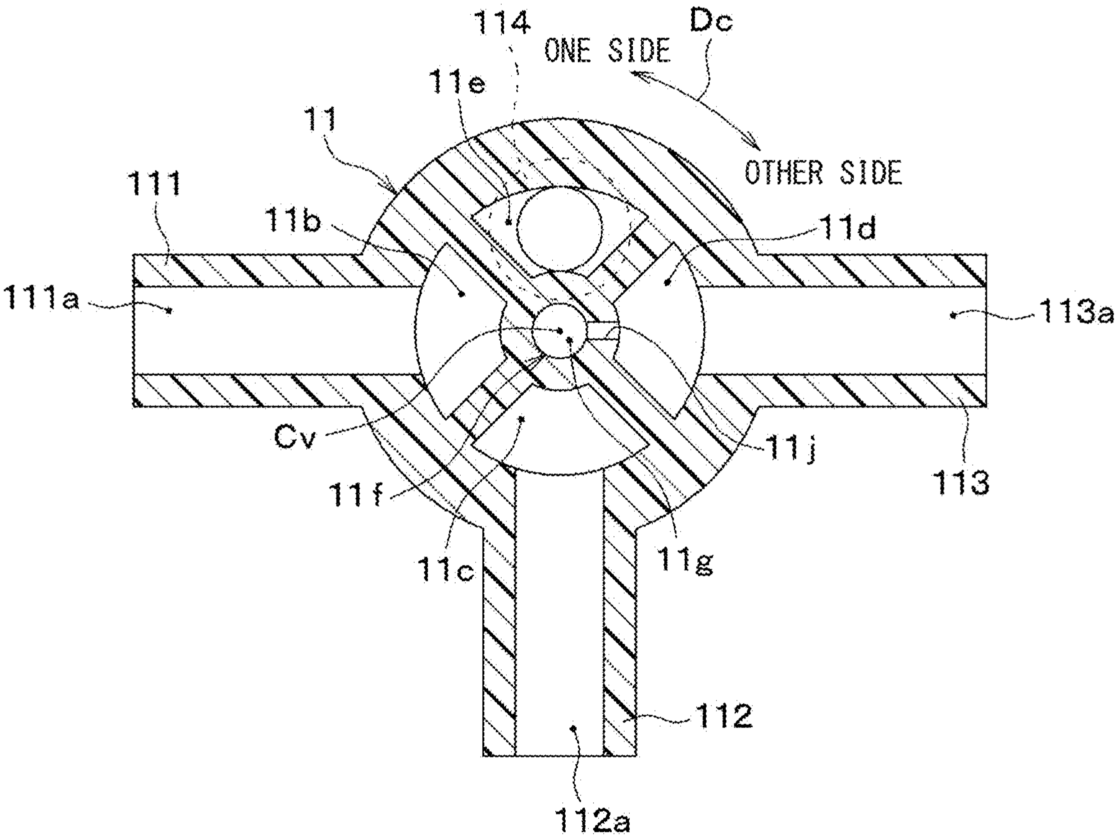
FIG. 2 is a cross-sectional view taken along line II-II in FIG. 1 according to the first embodiment.

Specifically, as shown in FIGS. 1 and 2, the valve apparatus 10 is a disk valve that performs a valve opening/closing operation by rotating a rotor 16, which is shaped generally in a form of a circular disk, around a valve central axis Cv that serves as a predetermined central axis. The valve apparatus 10 of the present embodiment is a multi-way valve that has five ports 110, 111, 112, 113, 114.

In the description of the present embodiment, an axial direction of the valve central axis Cv is also referred to as a valve axial direction Da, and a radial direction of the valve central axis Cv is also referred to as a valve radial direction Dr. Furthermore, a circumferential direction around the valve central axis Cv is also referred to as a valve circumferential direction Dc.

The valve apparatus 10 includes a housing 11, a stator 12, an actuator 14, the rotor 16, a shaft 17, a shaft body 18, a lever 20, an urging spring 22, a differential pressure device 24, a fixture component 28 and a gasket 30.

The housing 11 forms an outer shell of the valve apparatus 10, and the heat medium flows at an inside of the housing 11. The housing 11 is a non-rotating member that does not rotate, and the housing 11 is made of, for example, resin. The housing 11 receives the stator 12, the rotor 16, the shaft 17, the shaft body 18, the lever 20, the urging spring 22 and the differential pressure device 24 at the inside of the housing 11.

The housing 11 has: a one-side port 110 having a one-side port passage 110*a*; a first other-side port 111 having a first other-side port passage 111*a*; and a second other-side port 112 having a second other-side port passage 112*a*. Furthermore, the housing 11 has: a third other-side port 113 having a third other-side port passage 113*a*; and a fourth other-side port 114 having a fourth other-side port passage 114*a*.

The above-described five ports 110, 111, 112, 113, 114 are respectively shaped in a tubular form. Furthermore, the one-side port passage 110*a* is placed on one axial side (also simply referred to as one side) relative to the first to fourth other-side port passages 111*a*, 112*a*, 113*a*, 114*a* in the valve axial direction Da. For example, each of the one-side port 110 and the first to third other-side ports 111, 112, 113 is in a projecting form that outwardly projects toward a radially outer side (also simply referred to as an outer side) in the valve radial direction Dr, and the fourth other-side port 114 is in a projecting form that projects toward the other axial side (also simply referred to as the other side) which is opposite to the one-axial side in the valve axial direction Da. In the description of the present embodiment, the first to fourth other-side port passages 111*a*, 112*a*, 113*a*, 114*a* may be written as first to fourth other-side port passages 111*a*-114*a*.

Besides the port passages 110*a*, 111*a*, 112*a*, 113*a*, 114*a* described above, a plurality of spaces 11*a*, 11*b*, 11*c*, 11*d*, 11*e*, which are partitioned from each other and are configured to conduct the heat medium, are also formed at the inside of the housing 11. Specifically, a one-side space 11*a*, a first other-side space 11*b*, a second other-side space 11*c*, a third other-side space 11*d* and a fourth other-side space 11*e* are formed at the inside of the housing 11. Furthermore, the stator 12 and the rotor 16 partition between: the one-side space 11*a*; and the first to fourth other-side spaces 11*b*, 11*c*, 11*d*, 11*e*. The one-side space 11*a* is placed on the one axial side relative to the first to fourth other-side spaces 11*b*, 11*c*, 11*d*, 11*e* in the valve axial direction Da, and the stator 12 and the rotor 16 are held between the one-side space 11*a*; and the first to fourth other-side spaces 11*b*, 11*c*, 11*d*, 11*e*. In the description of the present embodiment, the first to fourth other-side spaces 11*b*, 11*c*, 11*d*, 11*e* may be written as first to fourth other-side spaces 11*b*-11*e*.

The one-side space 11*a* is communicated with the one-side port passage 110*a*, and the first other-side space 11*b* is communicated with the first other-side port passage 111*a*. Furthermore, the second other-side space 11*c* is communicated with the second other-side port passage 112*a*. Also, the third other-side space 11*d* is communicated with the third other-side port passage 113*a*, and the fourth other-side space 11*e* is communicated with the fourth other-side port passage 114*a*. In the present embodiment, the third other-side space 11*d* serves as an other-side space (one of at least one other-side space) of the present disclosure.

The first to fourth other-side spaces 11*b*-11*e* are partitioned from each other by partition walls of the housing 11 and are arranged in the valve circumferential direction Dc. Specifically, the second other-side space 11*c* is adjacent to the first other-side space 11*b* and is placed on one circumferential side (also simply referred to as one side) relative to the first other-side space 11*b* in the valve circumferential direction Dc, and the third other-side space 11*d* is adjacent to the second other-side space 11*c* and is placed on the one circumferential side relative to the second other-side space 11*c* in the valve circumferential direction Dc. The fourth other-side space 11*e* is adjacent to the third other-side space 11*d* and is placed on the one circumferential side relative to the third other-side space 11*d* in the valve circumferential direction Dc, and the first other-side space 11*b* is adjacent to the fourth other-side space 11*e* and is placed on the one circumferential side relative to the fourth other-side space 11*e* in the valve circumferential direction Dc.

The housing 11 has a shaft insertion hole 11*f* into which the shaft 17 is inserted. The shaft insertion hole 11*f* is a blind hole that has a hole bottom on the other axial side in the valve axial direction Da, and the shaft insertion hole 11*f* has a central axis coinciding with the valve central axis Cv and extends in the valve axial direction Da. The shaft insertion hole 11*f* extends toward the other axial side in the valve axial direction Da from a portion of the shaft insertion hole 11*f* which is occupied by the shaft 17. Specifically, the shaft insertion hole 11*f* has an other-side portion 11*g* which is placed on the other axial side in the valve axial direction Da relative to the shaft 17 inserted into the shaft insertion hole 11*f*.

The shaft insertion hole 11*f* is placed on the other axial side relative to the stator 12 in the valve axial direction Da and is placed on a radially inner side (also simply referred to as an inner side) relative to the first to fourth other-side spaces 11*b*-11*e* in the valve radial direction Dr. The shaft 17 is inserted into the shaft insertion hole 11*f*, and thereby the housing 11 rotatably supports the shaft 17.

Figure 3:
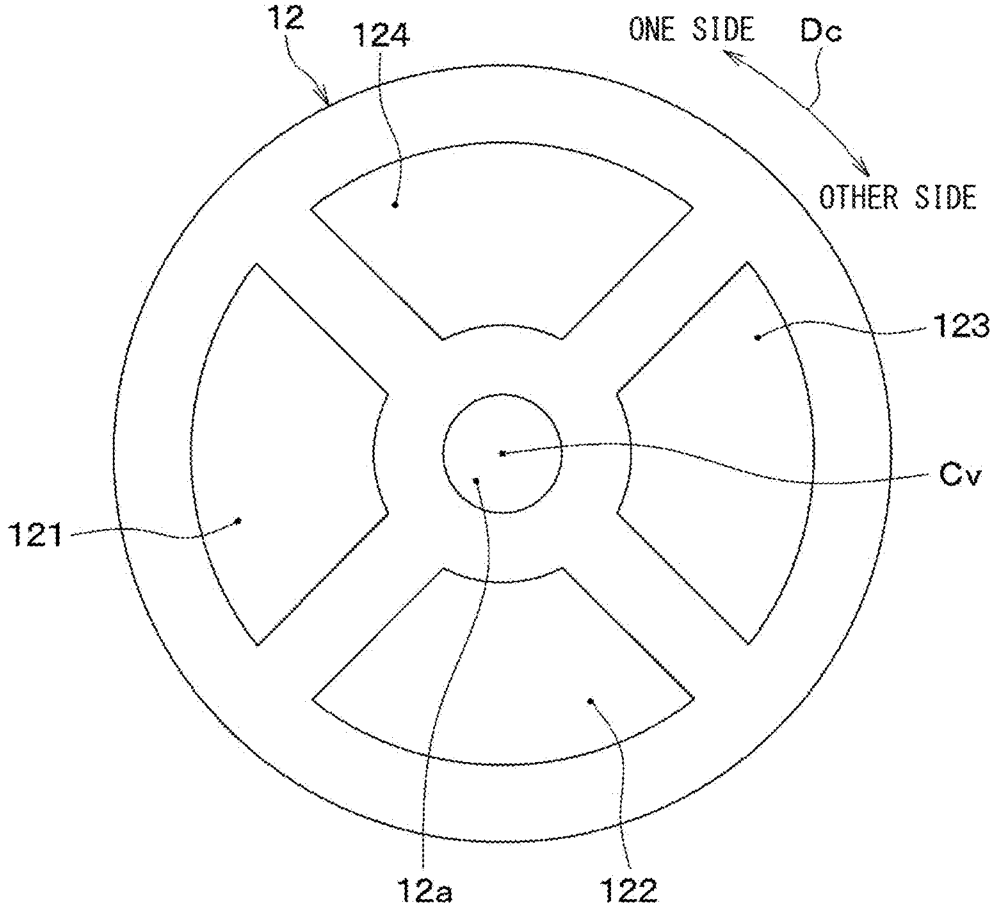
FIG. 3 is a view taken in a direction of an arrow III in FIG. 1, indicating a stator alone of the valve apparatus according to the first embodiment.

As shown in FIGS. 1 to 3, the stator 12 is shaped generally in, for example, a circular disk form which has a central axis coinciding with the valve central axis Cv, and the stator 12 is made of ceramic to achieve high sliding performance. The stator 12 is installed at the inside of the housing 11 such that the stator 12 is non-rotatable relative to the housing 11 through engagement between a recess and projection (not shown). The stator 12 is also referred to as a stationary disk.

The stator 12 is formed as a passage hole forming portion that has the first to fourth passage holes 121, 122, 123, 124 which are configured to conduct the heat medium in the housing 11. Each of the first to fourth passage holes 121, 122, 123, 124 is formed as a through-hole that extends through the stator 12 in the valve axial direction Da. In the description of the present embodiment, the first to fourth passage holes 121, 122, 123, 124 may be written as first to fourth passage holes 121-124.

Here, the first to fourth other-side spaces 11*b*-11*e* are placed on the other axial side relative to the stator 12 in the valve axial direction Da. The first to fourth passage holes 121-124 of the stator 12 correspond to the first to fourth other-side spaces 11*b*-11*e*, respectively.

Therefore, the first other-side space 11*b* is connected to and is communicated with the first passage hole 121 of the stator 12 through one end portion of the first other-side space 11*b* placed on the one axial side in the valve axial direction Da. Furthermore, the second other-side space 11*c* is connected to and is communicated with the second passage hole 122 of the stator 12 through one end portion of the second other-side space 11*c* placed on the one axial side in the valve axial direction Da. Also, the third other-side space 11*d* is connected to and is communicated with the third passage hole 123 of the stator 12 through one end portion of the third other-side space 11*d* placed on the one axial side in the valve axial direction Da. Furthermore, the fourth other-side space 11*e* is connected to and is communicated with the fourth passage hole 124 of the stator 12 through one end portion of the fourth other-side space 11*e* placed on the one axial side in the valve axial direction Da.

Furthermore, the first to fourth passage holes 121-124 of the stator 12 are arranged in the valve circumferential direction Dc like the first to fourth other-side spaces 11*b*-11*e*. Specifically, the second passage hole 122 is adjacent to the first passage hole 121 and is placed on the one circumferential side relative to the first passage hole 121 in the valve circumferential direction Dc, and the third passage hole 123 is adjacent to the second passage hole 122 and is placed on the one circumferential side relative to the second passage hole 122 in the valve circumferential direction Dc. The fourth passage hole 124 is adjacent to the third passage hole 123 and is placed on the one circumferential side relative to the third passage hole 123 in the valve circumferential direction Dc, and the first passage hole 121 is adjacent to the fourth passage hole 124 and is placed on the one circumferential side relative to the fourth passage hole 124 in the valve circumferential direction Dc.

Furthermore, the stator 12 has an insertion hole 12*a* through which the shaft 17 is inserted. This insertion hole 12*a* extends through the stator 12 in the valve axial direction Da and has a central axis coinciding with the valve central axis Cv. Furthermore, the insertion hole 12*a* is placed on the radially inner side relative to the first to fourth passage holes 121-124 in the valve radial direction Dr.

Figure 4:
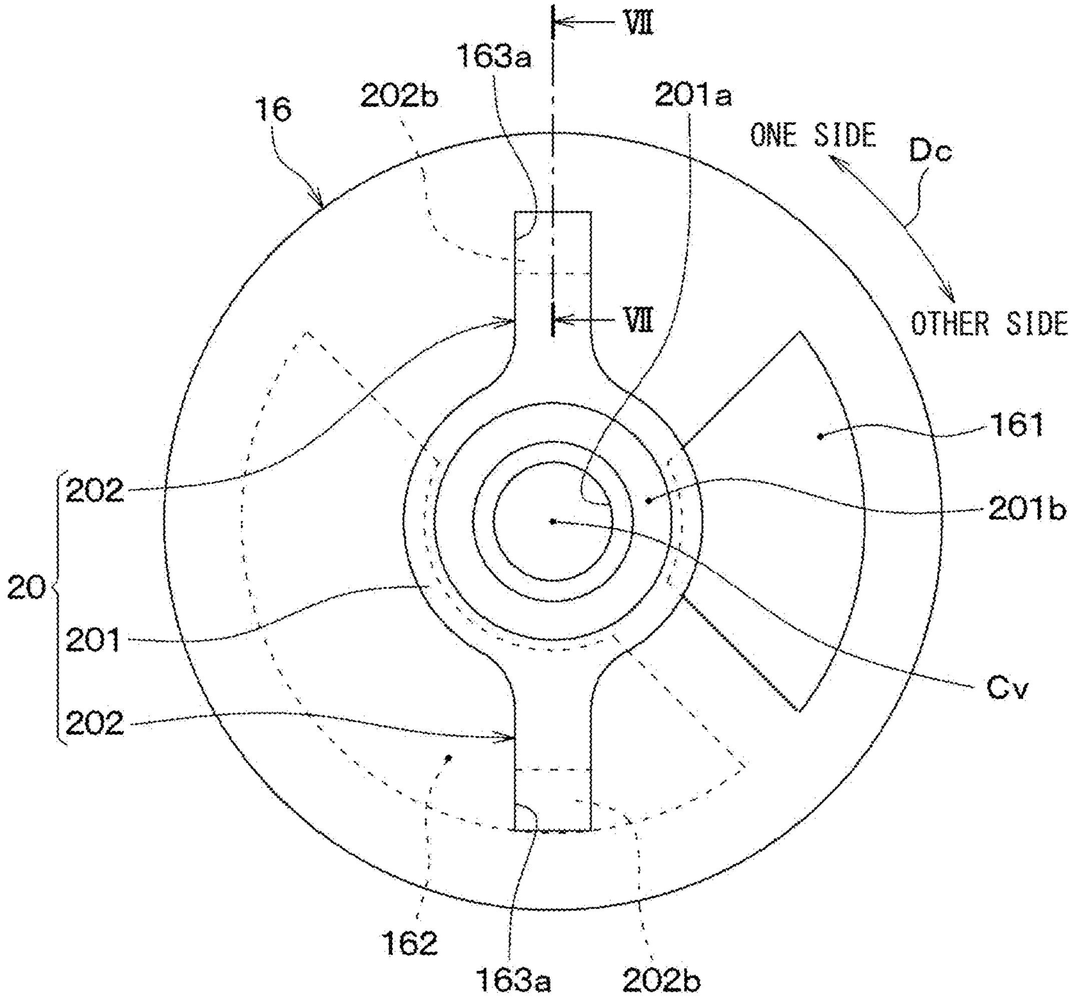
FIG. 4 is a view taken in a direction of an arrow III in FIG. 1, indicating a rotor and a lever of the valve apparatus according to the first embodiment.

As shown in FIGS. 1 and 4, the rotor 16 is shaped generally in, for example, a circular disk form and has a central axis coinciding with the valve central axis Cv, and the rotor 16 is made of ceramic to achieve high sliding performance. Furthermore, the rotor 16 is configured to rotate about the valve central axis Cv. Specifically, the rotor 16 is configured to rotate about the valve central axis Cv relative to the housing 11 and the stator 12. The rotor 16 is also referred to as a drive disk.

The rotor 16 is placed on the one axial side relative to the stator 12 in the valve axial direction Da at the inside of the housing 11. Specifically, the rotor 16 is stacked to and is in contact with the stator 12 on the one axial side relative to the stator 12 in the valve axial direction Da. Therefore, in the case of rotating the rotor 16, the rotor 16 is rotated about the valve central axis Cv while sliding relative to the stator 12.

Furthermore, the one-side space 11*a* of the housing 11 is placed on the one axial side relative to the rotor 16 in the valve axial direction Da.

The rotor 16 is a rotatable valve element that is configured to rotate about the valve central axis Cv. The rotor 16 has: an opening-degree adjusting hole 161, which extends through the rotor 16 and serves as a through-passage; and an intercommunication groove 162, which serves as a return passage. The opening-degree adjusting hole 161 is a through-hole that extends through the rotor 16 in the valve axial direction Da.

Furthermore, the intercommunication groove 162 has: a groove bottom which is placed on the one axial side in the valve axial direction Da; and an opening, which is placed on the other axial side in the valve axial direction Da. The intercommunication groove 162 is spaced from the opening-degree adjusting hole 161 in the valve circumferential direction Dc and extends in an arcuate form which is centered on the valve central axis Cv.

The rotor 16 increases or decreases an opening degree of each of the first to fourth passage holes 121-124 relative to the one-side space 11*a* in response to rotation of the rotor 16. For example, in a state where the opening-degree adjusting hole 161 of the rotor 16 overlaps with the first passage hole 121 on the one axial side in the valve axial direction Da, the rotor 16 increases the opening degree of the first passage hole 121 relative to the one-side space 11*a* by increasing the amount of overlap of the opening-degree adjusting hole 161 relative to the first passage hole 121. This is also true with respect to the opening degree of each of the second to fourth passage holes 122, 123, 124 relative to the one-side space 11*a*. Specifically, the rotor 16 selectively communicates a corresponding one of the first to fourth passage holes 121-124 relative to the one-side space 11*a* through the opening-degree adjusting hole 161 according to the rotational position of the rotor 16.

The opening degree of the first passage hole 121 relative to the one-side space 11*a* is a degree of opening of the first passage hole 121 relative to the one-side space 11*a*. Here, the opening degree of the first passage hole 121 in a full-opening state of the first passage hole 121 is indicated as 100%, and the opening degree of the first passage hole 121 in a full-closing state of the first passage hole 121 is indicated as 0%. The full opening state of the first passage hole 121 refers to a state where the opening degree of the first passage hole 121 relative to the one-side space 11*a* is a maximum opening degree. Furthermore, the full closing state of the first passage hole 121 refers to a state where the first passage hole 121 is entirely closed by the rotor 16 on the one axial side in the valve axial direction Da. In this full closing state, the flow of the heat medium between the one-side space 11*a* and the first other-side space 11*b* is fully blocked. This is also true with respect to the opening degree of each of the second to fourth passage holes 122, 123, 124 relative to the one-side space 11*a*. As a confirmatory statement, among the first to fourth passage holes 121-124, each pair of passage holes 121-124, which are communicated with each other through the intercommunication groove 162, are not fully closed although the pair of passage holes 121-124 are blocked relative to the one-side space 11*a*.

Furthermore, the rotor 16 connects a communicating passage hole, which is one of the first to fourth passage holes 121-124, to an adjacent one of the first to fourth passage holes 121-124, which is adjacent to this communicating passage hole, through the intercommunication groove 162 while blocking this communicating passage hole from the one-side space 11*a*, and the rotor 16 changes this communicating passage hole among the first to fourth passage holes 121-124 in response to the rotation of the rotor 16. In an example where the first passage hole 121 is the communicating passage hole, the rotor 16 communicates between the first passage hole 121 and the second passage hole 122 through the intercommunication groove 162 by overlapping the intercommunication groove 162 over the first passage hole 121 and the second passage hole 122 on the one axial side in the valve axial direction Da. Alternatively, the rotor 16 communicates between the first passage hole 121 and the fourth passage hole 124 through the intercommunication groove 162 by overlapping the intercommunication groove 162 over the first passage hole 121 and the fourth passage hole 124 on the one axial side in the valve axial direction Da. In a case where one of the second to fourth passage holes 122-124 serves as the communicating passage hole, the above description is also true for this communicating passage hole.

Furthermore, the rotor 16 has an insertion hole 16*a* through which the shaft 17 is inserted. The insertion hole 16*a* has a central axis coinciding with the valve central axis Cv, and the insertion hole 16*a* extends through the rotor 16 in the valve axial direction Da. The insertion hole 16*a* is placed on the radially inner side relative to the opening-degree adjusting hole 161 and the intercommunication groove 162 in the valve radial direction Dr.

The actuator 14 is a drive power source which is configured to rotate the rotor 16, and the actuator 14 includes an electric motor and a speed reducer. The electric motor is a stepping motor, which is controlled by, for example, an external electronic control device. The rotation of the electric motor is transmitted to the rotor 16 after reducing a rotational speed of the rotation through the speed reducer.

Figure 5:
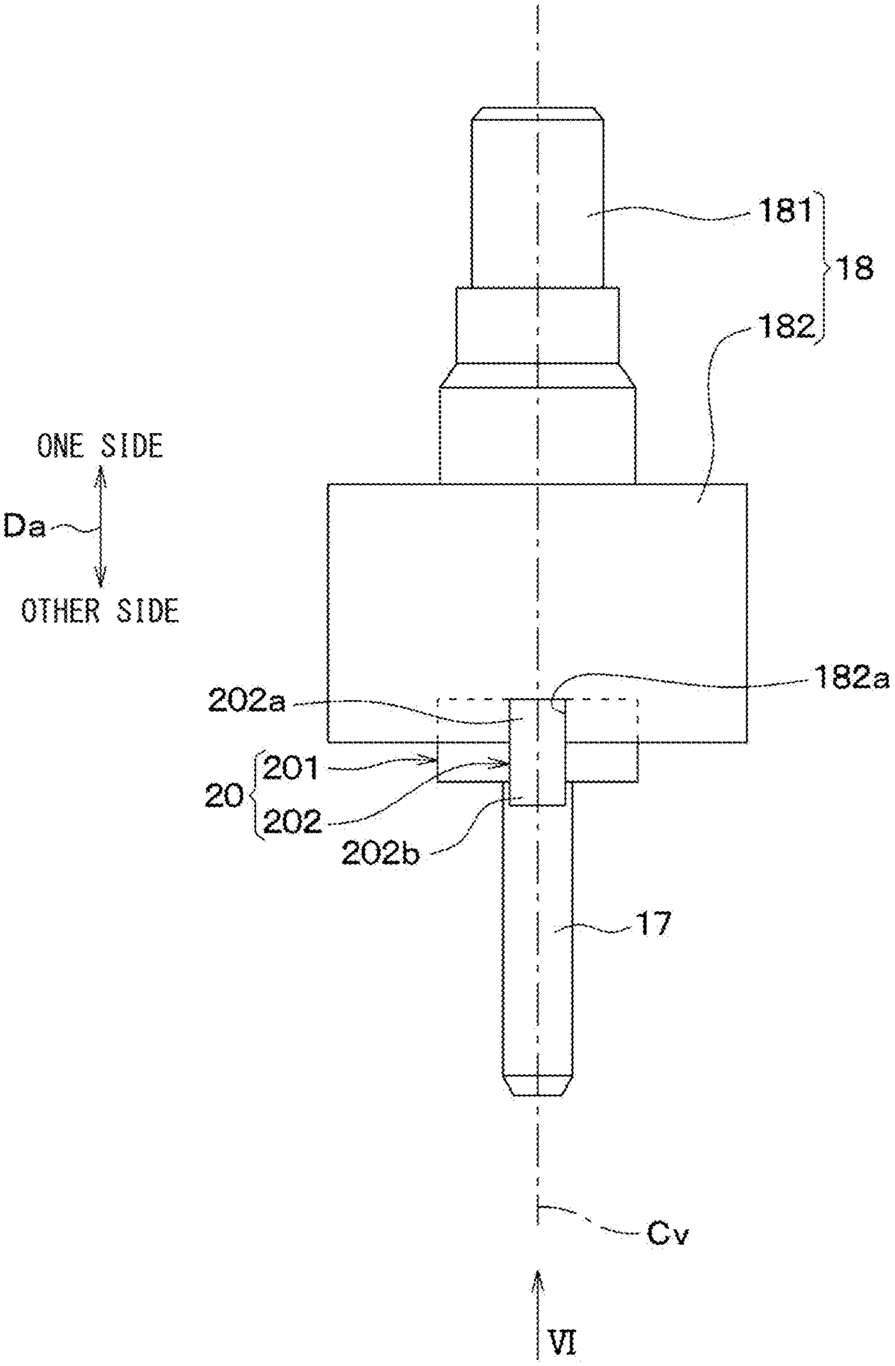
FIG. 5 is a view taken in a direction of an arrow V in FIG. 1, indicating a shaft and the lever of the valve apparatus according to the first embodiment.
Figure 6:
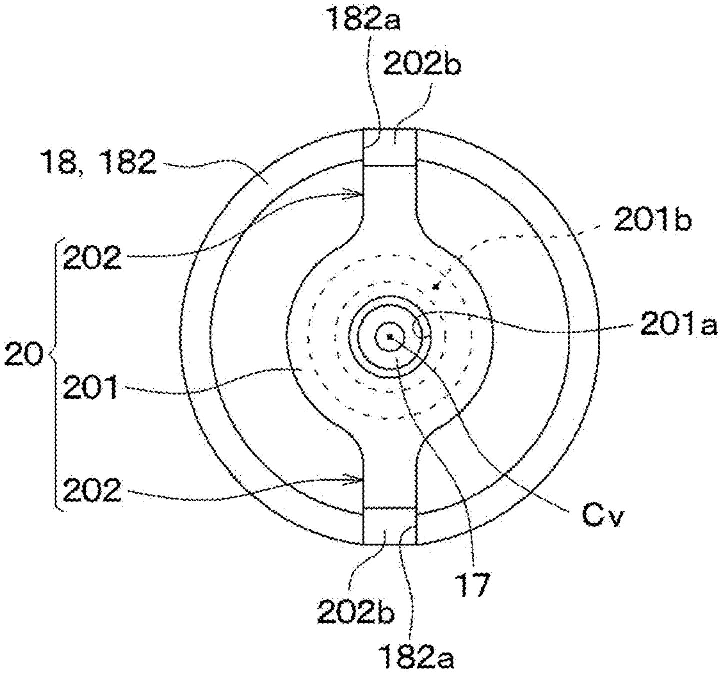
FIG. 6 is a view taken in a direction of an arrow VI in FIG. 5.
Figure 7:
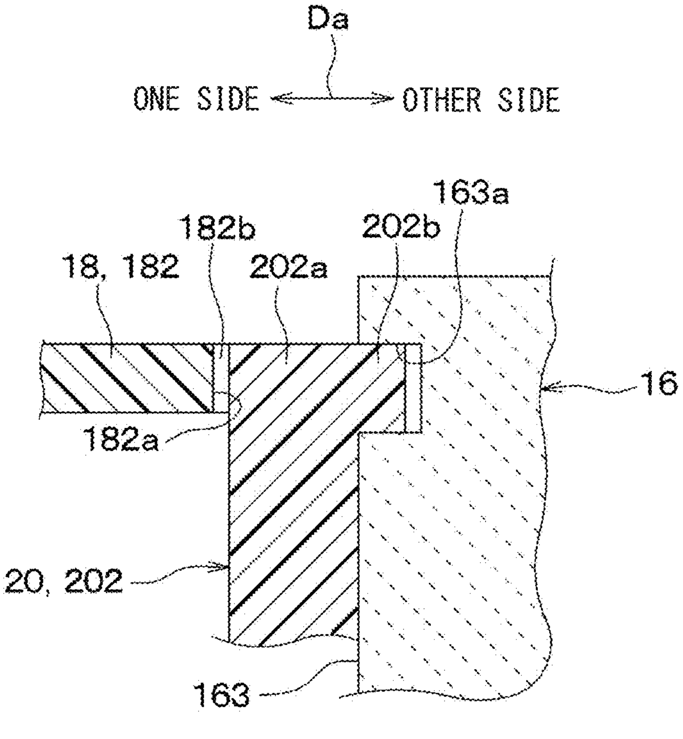
FIG. 7 is a cross-sectional view taken along line VII-VII in FIG. 4 according to the first embodiment.

As shown in FIGS. 1 and 5, the shaft body 18 is a drive force transmission shaft that is configured to transmit the drive force, which is outputted from the actuator 14, to the rotor 16. The shaft body 18 has: a shaft portion 181; and a tubular portion 182 which is placed on the other axial side relative to the shaft portion 181 in the valve axial direction Da. The shaft portion 181 and the tubular portion 182 are formed integrally in one-piece.

The shaft portion 181 of the shaft body 18 has a central axis coinciding with the valve central axis Cv and extends in the valve axial direction Da. The shaft portion 181 is rotatably supported by the housing 11 through a bearing 19. The tubular portion 182 of the shaft body 18 has an increased diameter that is increased relative to the shaft portion 181. The tubular portion 182 is shaped in a cylindrical tubular form that has a tube bottom on the one axial side in the valve axial direction Da and an opening on the other axial side in the valve axial direction Da. The majority of the tubular portion 182 of the shaft body 18 is placed in the one-side space 11*a* of the housing 11.

Furthermore, the shaft portion 181 of the shaft body 18 has a shaft fitting hole 181*a* into which the shaft 17 is securely fitted. This shaft fitting hole 181*a* is a blind hole. That is, the shaft fitting hole 181*a* has a hole bottom on the one axial side in the valve axial direction Da and opens at the tube bottom of the tubular portion 182, and the shaft fitting hole 181*a* has a central axis coinciding with the valve central axis Cv and extends in the valve axial direction Da. The tube bottom of the tubular portion 182 of the present embodiment has two steps which are arranged in the valve axial direction Da.

The shaft 17 is a core rod. The shaft 17 has a central axis coinciding with the valve central axis Cv and is configured to support the rotor 16 and the shaft body 18 in a manner that enables rotation of the rotor 16 and the shaft body 18 about the valve central axis Cv. The shaft 17 extends in the valve axial direction Da from the one axial side relative to the stator 12 and the rotor 16 toward the other axial side relative to the stator 12 and the rotor 16. Specifically, the shaft 17 extends through the rotor 16 and the stator 12 in the valve axial direction Da via the insertion hole 16*a* of the rotor 16 and the insertion hole 12*a* of the stator 12. A small radial gap is formed between the shaft 17 and a hole wall surface of each of the insertion holes 12*a*, 16*a*.

Furthermore, the shaft 17 has a shaft one-side portion 171 and a shaft other-side portion 172. The shaft one-side portion 171 includes one end portion of the shaft 17 placed on the one axial side in the valve axial direction Da, and the shaft one-side portion 171 is placed on the one axial side relative to the tubular portion 182 of the shaft body 18 in the valve axial direction Da. The shaft one-side portion 171 is fixed to the shaft body 18 in a state where the shaft one-side portion 171 is fitted into the shaft fitting hole 181*a*. Thereby, the shaft 17 is rotated integrally with the shaft body 18.

The shaft other-side portion 172 includes the other end portion of the shaft 17 placed on the other axial side in the valve axial direction Da, and the shaft other-side portion 172 is placed on the other axial side relative to the stator 12 in the valve axial direction Da. The shaft other-side portion 172 is inserted into the shaft insertion hole 11*f* of the housing 11 and is thereby supported in a manner that enables rotation of the shaft other-side portion 172 relative to the housing 11.

Thus, the shaft 17 and the shaft body 18 are rotatably supported by the bearing 19 on the one axial side in the valve axial direction Da and are rotatably supported by a hole wall surface of the shaft insertion hole 11*f* on the other axial side in the valve axial direction Da.

Furthermore, an O-ring 26 is installed between the stator 12 and the shaft 17 at the inside of the insertion hole 12*a* of the stator 12. The O-ring 26 limits the flow of the heat medium between the one-side space 11*a* and the shaft insertion hole 11*f*.

As shown in FIGS. 1 and 4 to 6, the lever 20 transmits the rotation of the shaft body 18 to the rotor 16 and limits a radial positional deviation of an end portion 222 of the urging spring 22, which is placed on the other axial side in the valve axial direction Da, in the valve radial direction Dr. The lever 20 is received in the one-side space 11*a* of the housing 11 and is placed on the one axial side relative to the rotor 16 in the valve axial direction Da.

Specifically, the lever 20 has: a lever center portion 201, which has a central axis coinciding with the valve central axis Cv; and a pair of arm portions 202 which outwardly extend from the lever center portion 201 in the valve radial direction Dr. The lever center portion 201 and the pair of arm portions 202 contact the rotor 16 from the one axial side in the valve axial direction Da.

The lever center portion 201 has an insertion hole 201*a*. The insertion hole 201*a* has a central axis coinciding with the valve central axis Cv and extends through the lever center portion 201 in the valve axial direction Da. The shaft 17 is inserted through the insertion hole 201*a*. Specifically, the shaft 17 extends through the lever center portion 201 in the valve axial direction Da via the insertion hole 201*a* of the lever center portion 201. A small radial gap is formed between the shaft 17 and a hole wall surface of the insertion hole 201*a* of the lever center portion 201.

Furthermore, the lever center portion 201 has a spring support groove 201*b* which is placed on the radially outer side relative to the insertion hole 201*a* in the valve radial direction Dr. The spring support groove 201*b* circumferentially extends in a circular ring form centered on the valve central axis Cv. The spring support groove 201*b* has a groove bottom on the other axial side in the valve axial direction Da and an opening on the one axial side in the valve axial direction Da. The end portion 222 of the urging spring 22, which is placed on the other axial side in the valve axial direction Da, is inserted in the spring support groove 201*b*.

As shown in FIGS. 4 to 7, each of the pair of arm portions 202 has: an arm distal end portion 202*a*, which is placed on the radially outer side in the valve radial direction Dr; and a distal end projection 202*b*, which projects from the arm distal end portion 202*a* toward the other axial side in the valve axial direction Da.

The tubular portion 182 of the shaft body 18 has a pair of fitting grooves 182*a* formed at an end of the tubular portion 182 which faces the other axial side in the valve axial direction Da. The pair of fitting grooves 182*a* are arranged symmetrically about the valve central axis Cv in the valve radial direction Dr. The arm distal end portions 202*a* are fitted into the pair of fitting grooves 182*a*, respectively. Thereby, relative rotation between the shaft body 18 and the lever 20 is limited.

A depth of each of the fitting grooves 182*a* measured in the valve axial direction Da is larger than a width of a portion of the arm distal end portion 202*a*, which is fitted into the fitting groove 182*a*. Therefore, a small axial gap 182*b* is formed between a bottom surface of the fitting groove 182*a* and the arm distal end portion 202*a*. This axial gap 182*b* can absorb a dimensional error in the valve axial direction Da of the individual components involved in the relative positional relationship between the rotor 16 and the shaft body 18. Furthermore, since the lever 20 and the rotor 16 are always urged toward the other axial side in the valve axial direction Da by the urging spring 22, wobbling of the lever 20 and the rotor 16 in the valve axial direction Da caused by the presence of the axial gap 182*b* described above is limited.

Also, the rotor 16 has a rotor one-side surface 163 which is placed on the one axial side in the valve axial direction Da and faces the one axial side. A pair of fitting recesses 163*a* (see FIGS. 4, 7 and 16), which are recessed toward the other axial side in the valve axial direction Da, are formed at the rotor one-side surface 163. The pair of fitting recesses 163*a* are symmetrically arranged about the valve central axis Cv in the valve radial direction Dr. The distal end projections 202*b* of the lever 20 are fitted into the pair of fitting recesses 163*a*, respectively.

Thereby, relative rotation between the rotor 16 and the lever 20 is limited. Specifically, the lever 20; the shaft body 18; and the shaft 17 fixed to the shaft body 18 are rotated integrally with the rotor 16 about the valve central axis Cv.

Figure 8:
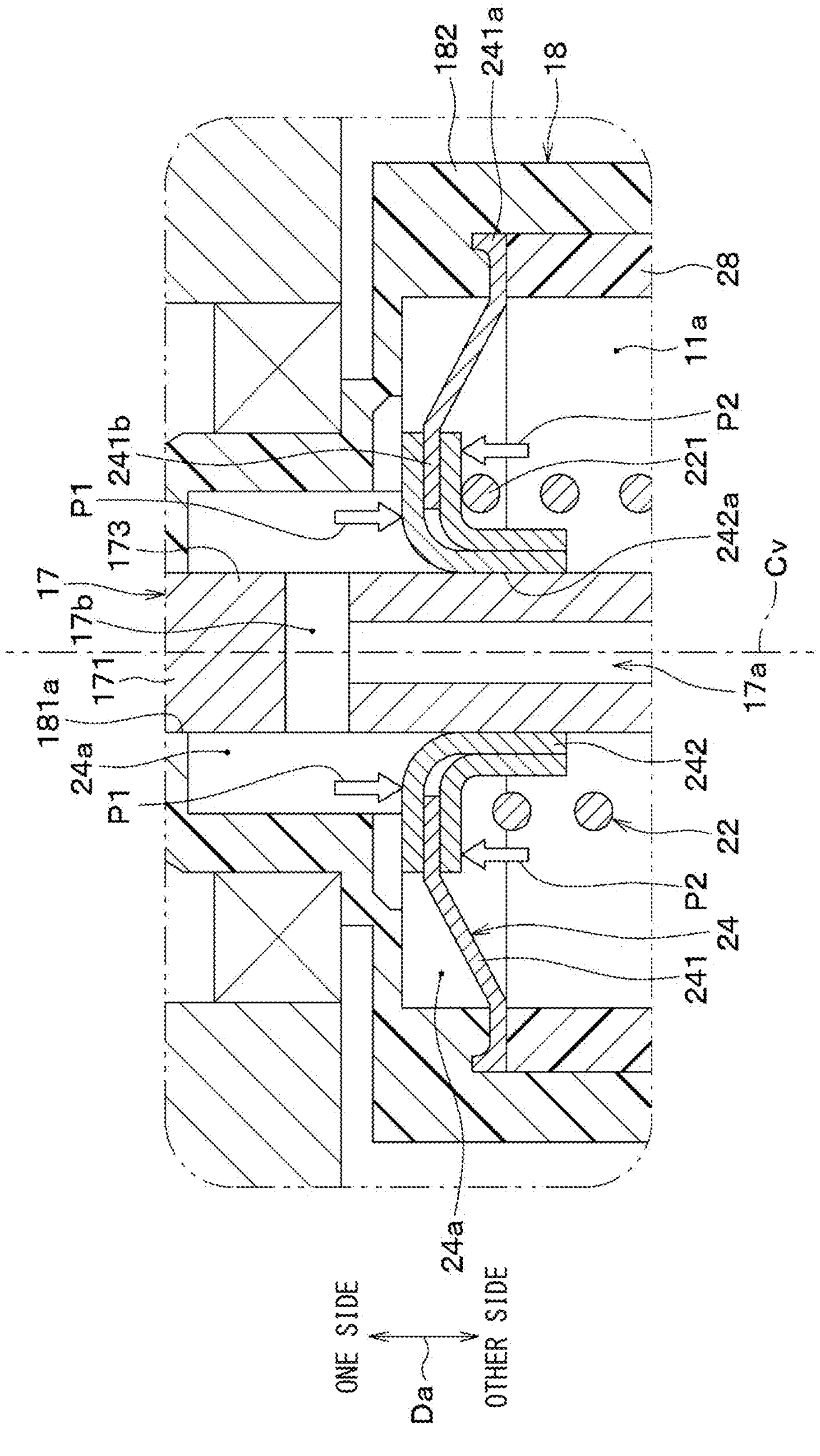
FIG. 8 is a partial enlarged view of a portion VIII in FIG. 1 according to the first embodiment.

As shown in FIGS. 1 and 8, the urging spring 22 and the differential pressure device 24 serve as an urging device which urges the rotor 16 against the stator 12. The urging spring 22 and the differential pressure device 24 are placed on the one axial side relative to the rotor 16 in the valve axial direction Da. In the present embodiment, the urging spring 22 and the differential pressure device 24 are coupled in series in the transmission path of the urging force, which urges the rotor 16 against the stator 12, and the differential pressure device 24 urges the rotor 16 in the valve axial direction Da through the urging spring 22.

Furthermore, the stator 12 has a stator other-side surface 125 which is placed on the other axial side in the valve axial direction Da and faces the other axial side. The gasket 30 is installed between: the stator other-side surface 125; and a portion of the housing 11 which is opposed to the stator other-side surface 125. The gasket 30 is made of a resilient material.

The gasket 30 surrounds and partitions the openings of the first to fourth passage holes 121-124, which open at the stator other-side surface 125. When the stator 12 is urged toward the housing 11 by the urging spring 22 and/or the differential pressure device 24 in the valve axial direction Da, the gasket 30 tightly contacts the housing 11 and the stator 12 to seal between the housing 11 and the stator 12.

The urging spring 22 is a compression coil spring and is received in the one-side space 11*a* of the housing 11 in a state where the urging spring 22 is compressed and is deformed in the valve axial direction Da. That is, the urging spring 22 is a resilient body that is resiliently deformable. Since the urging spring 22 is held in the state where the urging spring 22 is compressed and is deformed in the valve axial direction Da, the urging spring 22 always generates a repulsive force in response to the state where the urging spring 22 is compressed and is deformed in the valve axial direction Da (i.e., in response to the compression and deformation of the urging spring 22). The urging spring 22 has a central axis coinciding with the valve central axis Cv and is shaped in a coil form that extends in the valve axial direction Da.

The urging spring 22 has: one end portion 221, which is placed on the one axial side in the valve axial direction Da; and the other end portion 222, which is placed on the other axial side in the valve axial direction Da. The urging spring 22 is placed between an urging portion 242 of the differential pressure device 24 and the lever center portion 201. The one end portion 221 of the urging spring 22 contacts the urging portion 242 of the differential pressure device 24, and the other end portion 222 of the urging spring 22 contacts the lever center portion 201. With this configuration, the urging spring 22 urges the rotor 16 toward the other axial side (i.e., toward the stator 12) in the valve axial direction Da through the lever 20 by the repulsive force that is generated in response to the compression and deformation of the urging spring 22. Furthermore, the shaft 17 is inserted through the inside of the urging spring 22.

The differential pressure device 24 has a pressure chamber 24*a* into which the heat medium is introduced. The differential pressure device 24 generates the urging force, which urges the rotor 16 against the stator 12, by a differential pressure (in other words, a pressure difference) between a pressure P1 in the pressure chamber 24*a* and a pressure P2 in the one-side space 11*a*.

Specifically, the differential pressure device 24 includes a diaphragm 241 and the urging portion 242 which are placed at the inside of the tubular portion 182 of the shaft body 18. The pressure chamber 24*a* of the differential pressure device 24 is formed at the inside of the tubular portion 182. Specifically, the pressure chamber 24*a* is surrounded by the diaphragm 241, the urging portion 242 and a portion of the tubular portion 182 of the shaft body 18. The pressure chamber 24*a* is also referred to as a back pressure chamber.

The diaphragm 241 is a flexible membrane-like object, for example, made of a thin sheet of metal, resin, or rubber. The diaphragm 241 is shaped generally in a circular disk form that is centered on the valve central axis Cv and extends in the valve radial direction Dr. A through-hole, which extends through the diaphragm 241 in the valve axial direction Da, is formed at the center of the diaphragm 241. The shaft 17 is inserted through this through-hole of the diaphragm 241 and extends through the diaphragm 241.

The diaphragm 241 has: an outer peripheral end portion 241*a*, which is placed on the radially outer side in the valve radial direction Dr; and an inner peripheral end portion 241*b*, which is placed on the radially inner side in the valve radial direction Dr. The outer peripheral end portion 241*a* is fixed to the tubular portion 182 by the fixture component 28 that is fitted to the inside of the tubular portion 182 of the shaft body 18. That is, the differential pressure device 24 is supported through the shaft 17, which is fixed to the shaft body 18, in a manner that enables rotation of the differential pressure device 24 about the valve central axis Cv relative to the housing 11, and the differential pressure device 24 is rotated integrally with the rotor 16. A gap(s) between the outer peripheral end portion 241*a* of the diaphragm 241 and the tubular portion 182 is airtightly sealed.

The inner peripheral end portion 241*b* of the diaphragm 241 is fixed to the urging portion 242 of the differential pressure device 24. A gap(s) between the inner peripheral end portion 241*b* of the diaphragm 241 and the urging portion 242 is airtightly sealed.

The urging portion 242 of the differential pressure device 24 is a bushing into which the shaft 17 is inserted, and the urging portion 242 is configured to urge the rotor 16 toward the other axial side in the valve axial direction Da. Specifically, since the urging spring 22 and the lever center portion 201 are interposed between the urging portion 242 and the rotor 16, the urging portion 242 urges the rotor 16 through the urging spring 22 and the lever center portion 201.

An urging portion through-hole 242*a* extends through the urging portion 242 in the valve axial direction Da, and the shaft 17 is inserted into the urging portion through-hole 242*a*. The urging portion 242 is movable relative to the shaft 17 in the valve axial direction Da. Specifically, the inner peripheral end portion 241*b* of the diaphragm 241, which is coupled to the urging portion 242, is a movable end portion that is movable in the valve axial direction Da.

A gap between the urging portion 242 and the shaft 17 is airtightly sealed or is substantially sealed to such an extent that leakage of the heat medium through this gap does not affect the pressure P1 in the pressure chamber 24*a*. Furthermore, at a moving end of the urging portion 242 on the one-axial side in the valve axial direction Da, the urging portion 242 abuts against a stopper (not shown) formed at, for example, the shaft body 18 and is thereby stopped.

The diaphragm 241 and the urging portion 242 are placed on the other axial side relative to the pressure chamber 24*a* of the differential pressure device 24 in the valve axial direction Da and partition between the pressure chamber 24*a* and the one-side space 11*a*. Specifically, the diaphragm 241 and the urging portion 242 are exposed to the pressure chamber 24*a* and are also exposed to the one-side space 11*a* on the opposite side that is opposite to the pressure chamber 24*a*. Therefore, the pressure P1 in the pressure chamber 24*a* acts to urge the urging portion 242 toward the other axial side in the valve axial direction Da, and the pressure P2 in the one-side space 11*a* acts to urge the urging portion 242 toward the one axial side in the valve axial direction Da.

In the present embodiment, a size of a pressure receiving surface area of the diaphragm 241 and the urging portion 242 on the pressure chamber 24*a* side is the same as a size of a pressure receiving surface area of the diaphragm 241 and the urging portion 242 on the one-side space 11*a* side. Thus, in a case where the pressure P1 in the pressure chamber 24*a* and the pressure P2 in the one-side space 11*a* satisfy a relationship of $P1>P2$, the differential pressure device 24 generates the urging force that urges the rotor 16 toward the stator 12 by the differential pressure between the pressure P1 and the pressure P2. In contrast, in another case where the pressure P1 in the pressure chamber 24*a* and the pressure P2 in the one-side space 11*a* satisfy a relationship of $P1 \leq P2$, the differential pressure device 24 does not generate the urging force that urges the rotor 16 toward the stator 12 by the differential pressure between the pressure P1 and the pressure P2.

The pressure receiving surface area on the pressure chamber 24*a* side described above refers to a surface area obtained by projecting a region of the diaphragm 241 and the urging portion 242 exposed to the pressure chamber 24*a* in the valve axial direction Da onto a virtual plane perpendicular to the valve axial direction Da. Furthermore, the pressure receiving surface area on the one-side space 11*a* side described above refers to a surface area obtained by projecting a region of the diaphragm 241 and the urging portion 242 exposed to the one-side space 11*a* in the valve axial direction Da onto a virtual plane perpendicular to the valve axial direction Da.

Furthermore, as described above, the diaphragm 241 and the urging portion 242 are exposed to the pressure chamber 24*a*, and also a portion of the tubular portion 182 of the shaft body 18 is exposed to the pressure chamber 24*a*. Therefore, the portion of the tubular portion 182, which is exposed to the pressure chamber 24*a*, forms a portion of the shaft body 18 and also a portion of the differential pressure device 24.

As shown in FIGS. 1 and 8, the shaft 17 extends through the pressure chamber 24*a* in the valve axial direction Da at a location between the urging portion 242 of the differential pressure device 24 and the shaft one-side portion 171. Therefore, the shaft 17 has a pressure-chamber exposed portion 173 that is exposed to the pressure chamber 24*a*.

A communication passage 17*a*, which communicates between the third other-side space 11*d* and the pressure chamber 24*a*, is formed at an inside of the shaft 17. Thus, the communication passage 17*a* extends in the valve axial direction Da. The communication passage 17*a* has: one end portion 17*b*, which is placed on the one-axial side in the valve axial direction Da; and the other end portion 17*c*, which is placed on the other axial side in the valve axial direction Da. At the inside of the shaft 17, the communication passage 17*a* extends in the valve axial direction Da from the one axial side relative to the stator 12 and the rotor 16 in the valve axial direction Da to the other axial side relative to the stator 12 and the rotor 16 in the valve axial direction Da.

The communication passage 17*a* is bent to extend in the valve radial direction Dr at the one end portion 17*b*, and thereby the communication passage 17*a* opens outward in the valve radial direction Dr at the pressure-chamber exposed portion 173 of the shaft 17. Therefore, the communication passage 17*a* is communicated with the pressure chamber 24*a* at the one end portion 17*b*.

Furthermore, the other end portion 17*c* of the communication passage 17*a* opens at the other end portion of the shaft 17 toward the other axial side in the valve axial direction Da. Therefore, the communication passage 17*a* is communicated with the shaft insertion hole 11*f* at the other end portion 17*c*. A communication hole 11*j* is formed at the housing 11 to extend through a wall of the housing 11 between the shaft insertion hole 11*f* and the third other-side space 11*d*. The communication hole 11*j* connects between the other-side portion 11*g* of the shaft insertion hole 11*f* and the third other-side space 11*d* to communicate therebetween. Therefore, the other end portion 17*c* of the communication passage 17*a* is communicated with the third other-side space 11*d* through the other-side portion 11*g* of the shaft insertion hole 11*f* and the communication hole 11*j*.

Thus, the pressure chamber 24*a* is communicated with the third other-side space 11*d* through the communication passage 17*a* of the shaft 17, the other-side portion 11*g* of the shaft insertion hole 11*f* and the communication hole 11*j* in this order. Specifically, since the communication passage 17*a* of the shaft 17 communicates between the third other-side space 11*d* and the pressure chamber 24*a*, the pressure P1 in the pressure chamber 24*a* becomes equal to the pressure in the third other-side space 11*d*. Therefore, in a case where the pressure in the third other-side space 11*d* is higher than the pressure P2 in the one-side space 11*a*, the pressure P1 in the pressure chamber 24*a* and the pressure P2 in the one-side space 11*a* have the relationship of P1>P2. In this case, the differential pressure device 24 generates the urging force, which urges the rotor 16 against the stator 12, by the differential pressure between the pressure P1 in the pressure chamber 24*a* and the pressure P2 in the one-side space 11*a*. The urging force is increased when the pressure P1 in the pressure chamber 24*a* is increased relative to the pressure P2 in the one-side space 11*a*.

In contrast, in another case where the pressure in the third other-side space 11*d* is lower than the pressure P2 in the one-side space 11*a*, the pressure P1 in the pressure chamber 24*a* and the pressure P2 in the one-side space 11*a* have the relationship of P1<P2. Furthermore, in another case where the pressure in the third other-side space 11*d* is equal to the pressure P2 in the one-side space 11*a*, the pressure P1 in the pressure chamber 24*a* and the pressure P2 in the one-side space 11*a* have the relationship of P1=P2. In each of these last two cases, the differential pressure between the pressure P1 in the pressure chamber 24*a* and the pressure P2 in the one-side space 11*a* does not urge the urging portion 242 of the differential pressure device 24 toward the other axial side in the valve axial direction Da. In other words, the differential pressure device 24 does not generate the urging force which urges the rotor 16 against the stator 12 by the differential pressure.

For example, in a case where the discharge side (i.e., a discharge port) of the pump of the heat medium circuit is connected to the one-side port passage 110*a*, and the third passage hole 123 of the stator 12 is fully closed, the pressure in the third other-side space 11*d* becomes lower than the pressure P2 in the one-side space 11*a*. Furthermore, in a case where the discharge side of the pump of the heat medium circuit is connected to the one-side port passage 110*a*, and the heat medium flows from the one-side space 11*a* to the third other-side space 11*d*, the pressure in the third other-side space 11*d* also becomes lower than the pressure P2 in the one-side space 11*a*. In these cases, the pressure P1 in the pressure chamber 24*a* and the pressure P2 in the one-side space 11*a* have the relationship of P1<P2. Therefore, the differential pressure between the pressure P1 in the pressure chamber 24*a* and the pressure P2 in the one-side space 11*a* does not urge the urging portion 242 of the differential pressure device 24 toward the other axial side in the valve axial direction Da. As a result, as shown in FIG. 9(*a*), the urging portion 242 is moved by the resilient force of the urging spring 22 to a moving end on the one axial side in the valve axial direction Da.

In contrast, in a case where the discharge side of the pump of the heat medium circuit is connected to the third other-side port passage 113*a*, and the third passage hole 123 of the stator 12 is fully closed, the pressure in the third other-side space 11*d* becomes higher than the pressure P2 in the one-side space 11*a*. Furthermore, in a case where the discharge side of the pump of the heat medium circuit is connected to the third other-side port passage 113*a*, and the heat medium flows from the third other-side space 11*d* to the one-side space 11*a*, the pressure in the third other-side space 11*d* also becomes higher than the pressure P2 in the one-side space 11*a*. In these cases, the pressure P1 in the pressure chamber 24*a* and the pressure P2 in the one-side space 11*a* have the relationship of P1>P2.

Figure 9:
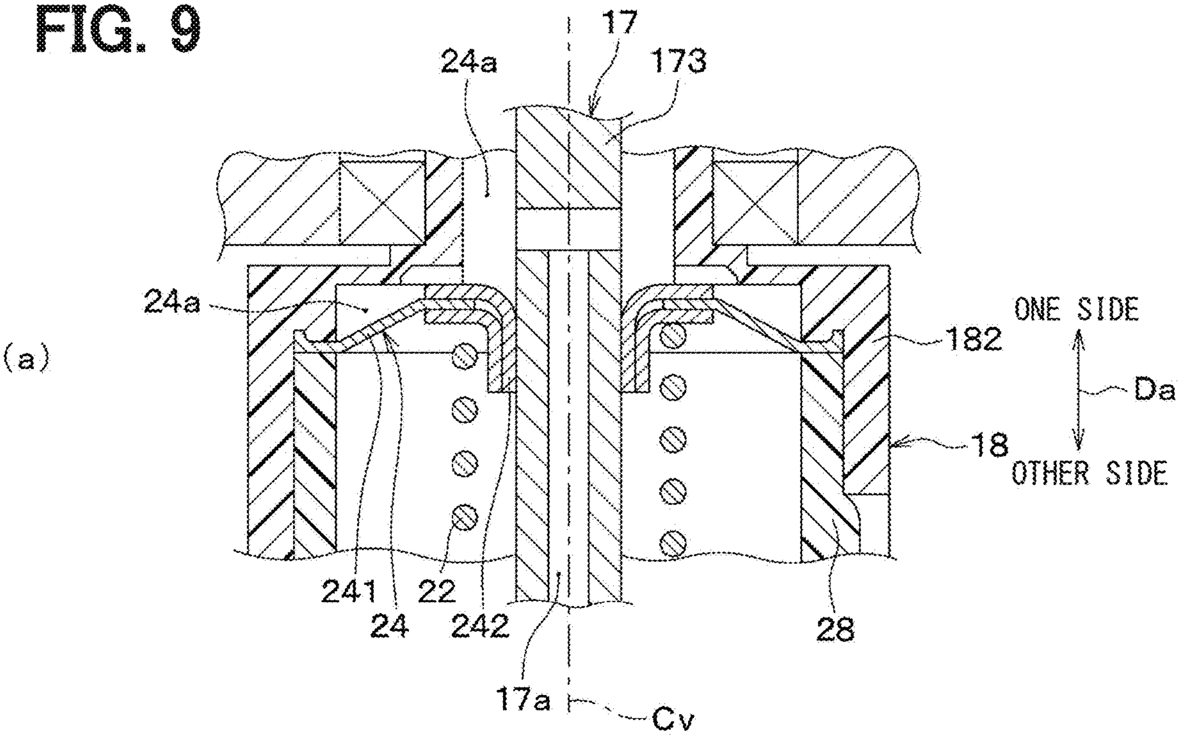
FIG. 9(*a*) is an enlarged partial view of FIG. 1 around a differential pressure device and its periphery, showing a state of the differential pressure device where a pressure in a pressure chamber becomes lower than a pressure in a one-side space, and FIG. 9(*b*) is an enlarged partial view of FIG. 1 around the differential pressure device and its periphery, showing another state of the differential pressure device where the pressure in the pressure chamber becomes higher than the pressure in the one-side space.
Figure 9:
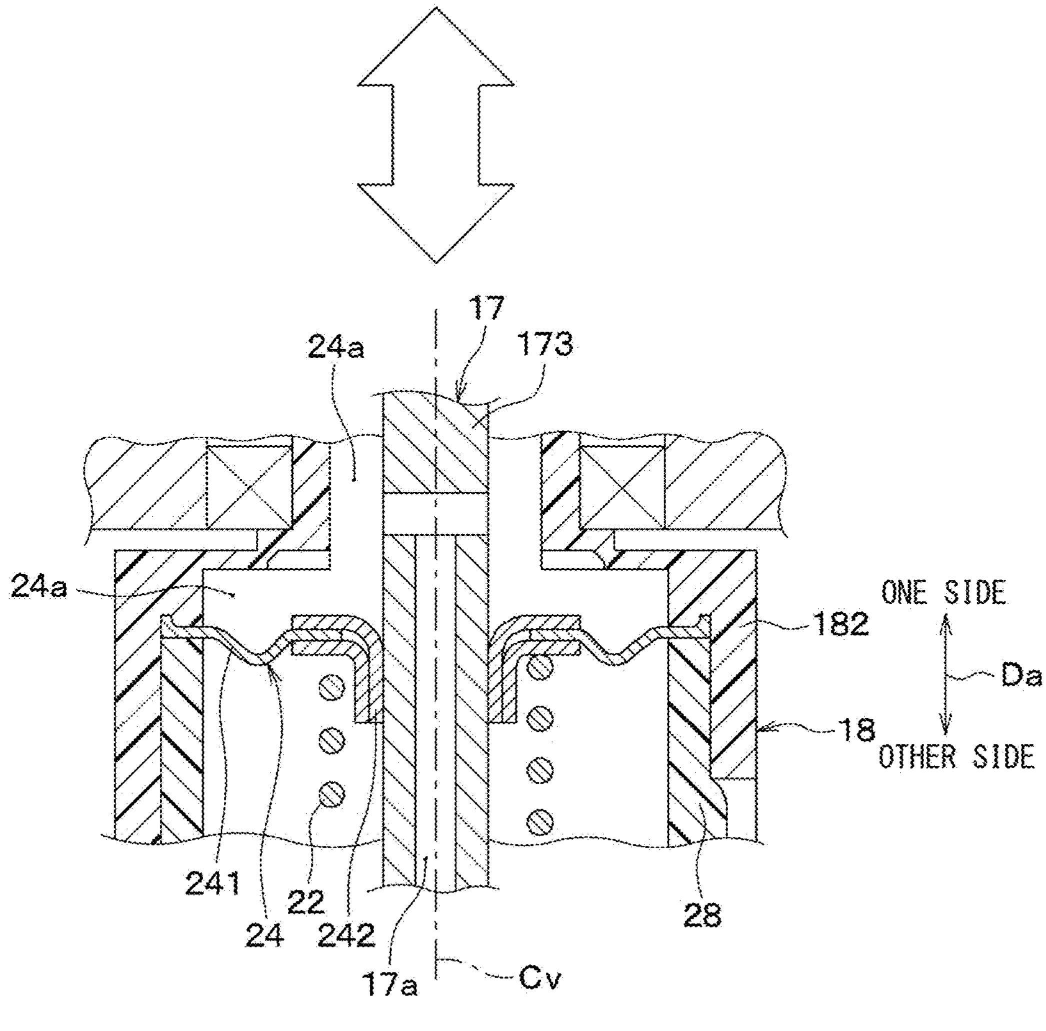

As a result, the urging portion 242 of the differential pressure device 24 is urged by the differential pressure between the pressure P1 in the pressure chamber 24*a* and the pressure P2 in the one-side space 11*a* toward the other axial side in the valve axial direction Da, and thereby the urging portion 242 of the differential pressure device 24 is moved from the moving end on the one axial side in the valve axial direction Da toward the other axial side in the valve axial direction Da, as shown in FIG. 9(*b*). Therefore, the differential pressure device 24 generates the urging force which urges the rotor 16 against the stator 12.

In the valve apparatus 10 configured in the above-described manner, as shown in FIG. 1, the drive force of the actuator 14 is first transmitted to the shaft body 18 and is then transmitted from the shaft body 18 to the lever 20 and the rotor 16 in this order. Then, the drive force of the actuator 14 causes the shaft body 18, the rotor 16, the shaft 17, the lever 20, the urging spring 22, the differential pressure device 24 and the fixture component 28 to rotate integrally about the valve central axis Cv.

For example, when the rotor 16 is rotated, the other-side space, which is communicated with the one-side space 11*a* through the opening-degree adjusting hole 161 of the rotor 16, is changed among the first to fourth other-side spaces 11*b*-11*e* in response to the rotation of the rotor 16. Also, the pair of other-side spaces, which are communicated with each other through the intercommunication groove 162 of the rotor 16, are changed among the first to fourth other-side spaces 11*b*-11*e* in response to the rotation of the rotor 16.

In the present embodiment, each of a forward flow of the heat medium and a reverse flow of the heat medium may possibly be generated. The forward flow of the heat medium refers to a flow of the heat medium from the one-side port passage 110*a* to one of the other-side port passages 111*a*, 112*a*, 113*a*, 114*a*. Furthermore, the reverse flow of the heat medium refers to a flow of the heat medium from one of the other-side port passages 111*a*, 112*a*, 113*a*, 114*a* to the one-side port passage 110*a*.

For instance, there will be described an example where the heat medium flows between the one-side port passage 110*a* and the third other-side port passage 113*a*. In this example, each of the forward flow and the reverse flow of the heat medium may possibly be generated. In each of the forward flow and the reverse flow of the heat medium, the opening degree of the third passage hole 123 of the stator 12 relative to the one-side space 11*a* is increased or decreased according to the rotational position of the rotor 16, and the third passage hole 123 can be fully closed or fully opened. This is also true for each of the rest of examples where the heat medium flows between the one-side port passage 110*a* and the corresponding one of the first, second and fourth other-side port passages 111*a*, 112*a*, 114*a*.

As described above, according to the present embodiment, as shown in FIGS. 1 and 8, in the case where the pressure in the third other-side space 11*d* is higher than the pressure P2 in the one-side space 11*a*, the differential pressure device 24 is operated as follows. Specifically, in this case, the differential pressure device 24 generates the urging force, which urges the rotor 16 against the stator 12, by the differential pressure between the pressure P1 in the pressure chamber 24*a* and the pressure P2 in the one-side space 11*a*. The urging force is increased when the pressure P1 in the pressure chamber 24*a* is increased relative to the pressure P2 in the one-side space 11*a*. In other words, the urging force is increased when differential pressure between the pressure P1 in the pressure chamber 24*a* and the pressure P2 in the one-side space 11*a* is increased in the state where the pressure P1 in the pressure chamber 24*a* is equal to or higher than the pressure P2 in the one-side space 11*a*.

Here, in the case where the pressure in the third other-side space 11*d* is higher than the pressure P2 in the one-side space 11*a*, a reverse pressure, which is a fluid pressure that lifts the rotor 16 away from the stator 12, is generated, and this lifting force, which lifts the rotor 16 away from the stator 12, is proportional to the reverse pressure. In the present embodiment, the differential pressure device 24 urges the rotor 16 against the stator 12 through the urging spring 22 and the lever 20 to counteract the reverse pressure. The urging force of the differential pressure device 24 is increased in response to the increase in the pressure P1 in the pressure chamber 24*a* relative to the pressure P2 in the one-side space 11*a*, so that the urging force of the differential pressure device 24 is adjusted according to the amount of the reverse pressure. For example, in a case where the reverse pressure is not generated, the urging force of the differential pressure device 24 will be minimized.

Therefore, an excessive increase in the frictional torque between the rotor 16 and the stator 12 can be limited for each of the forward flow and the reverse flow of the heat medium between the one-side space 11*a* and the third other-side space 11*d*. Thereby, it is possible to limit the lifting of the rotor 16 away from the stator 12 while limiting the excessive increase in the frictional torque.

For example, the pressure receiving surface area of the diaphragm 241 and the urging portion 242 on the one-side space 11*a* side and the pressure receiving surface area of the diaphragm 241 and the urging portion 242 on the pressure chamber 24*a* side may be designed such that the lifting load, which lifts the rotor 16 away from the stator 12, and the urging force of the differential pressure device 24 are balanced in the case where the reverse pressure is generated. In this way, the urging force of the differential pressure device 24, which limits the lifting of the rotor 16, becomes an appropriate amount in proportional to the amount of the reverse pressure. Therefore, at each of the time of the forward flow of the heat medium and the time of the reverse flow of the heat medium, the urging force, which urges the rotor 16 against the stator 12, does not largely change, and the drive torque, which rotates the rotor 16, does not largely change.

(1) According to the present embodiment, the communication passage 17*a*, which communicates between the third other-side space 11*d* and the pressure chamber 24*a*, is formed. Therefore, in the case where the reverse pressure, which lifts the rotor 16 away from the stator 12, is generated due to the pressure in the third other-side space 11*d*, the rotor 16 can be urged against the stator 12 by the differential pressure device 24. Thus, the lifting of the rotor 16 caused by this reverse pressure can be limited. Furthermore, in the case where the reverse pressure is not generated as in the case of, for example, the forward flow of the heat medium, the urging force of the differential pressure device 24 is minimized. Therefore, the drive torque, which rotates the rotor 16, can be reduced.

(2) According to the present embodiment, the communication passage 17*a*, which communicates between the third other-side space 11*d* and the pressure chamber 24*a*, is formed at the inside of the shaft 17. Therefore, it is possible to achieve the compact size of the valve apparatus 10 compared to a case where the communication passage 17*a* is formed in, for example, an external pipe placed at the outside of the housing 11.

(3) According to the present embodiment, the differential pressure device 24 is supported through the shaft 17 in a manner that enables the rotation of the differential pressure device 24 about the valve central axis Cv relative to the housing 11, and thereby the differential pressure device 24 can be rotated integrally with the rotor 16 about the valve central axis Cv. Therefore, the rotor 16 can be urged against the stator 12 by the urging portion 242 of the differential pressure device 24 without generating the relative slide movement between the urging portion 242 of the differential pressure device 24 and the rotor 16 in the valve circumferential direction Dc. Furthermore, since the relative slide movement is not generated between the urging portion 242 and the rotor 16 in the valve circumferential direction Dc, an increase in the torque caused by a friction generated by this relative slide movement does not occur.

(4) According to the present embodiment, the diaphragm 241 of the differential pressure device 24 is placed on the other axial side relative to the pressure chamber 24*a* of the differential pressure device 24 in the valve axial direction Da and partitions between the pressure chamber 24*a* and the one-side space 11*a*. Furthermore, the diaphragm 241 has the inner peripheral end portion 241*b*. The inner peripheral end portion 241*b* is the movable end portion which is movable in the valve axial direction Da and is coupled to the urging portion 242 of the differential pressure device 24. The pressure P1 in the pressure chamber 24*a* acts to urge the urging portion 242 toward the other axial side in the valve axial direction Da, and the urging portion 242 urges the rotor 16 toward the other axial side in the valve axial direction Da.

Therefore, an occupied volume, which is required by the structure that urges the rotor 16 against the stator 12 by the differential pressure between the pressure P1 in the pressure chamber 24*a* and the pressure P2 in the one-side space 11*a*, can be reduced by using the diaphragm 241.

(5) According to the present embodiment, the urging spring 22, which is the resilient body, is installed in the state where the urging spring 22 is compressed and is deformed in the valve axial direction Da, and the urging spring 22 urges the rotor 16 toward the other axial side in the valve axial direction Da by the repulsive force generated in response to the compression and deformation of the urging spring 22. Therefore, the urging force, which urges the rotor 16 against the stator 12, can be always generated regardless of the differential pressure between the pressure P1 in the pressure chamber 24*a* and the pressure P2 in the one-side space 11*a*.

Second Embodiment

Next, a second embodiment will be described. In the present embodiment, points, which are different from the first embodiment, will be mainly described. Furthermore, the description of the same or equivalent portions as those in the aforementioned embodiment will be omitted or simplified. This is also true in the description of the later embodiments.

As shown in FIGS. 10 to 13, the valve apparatus 10 of the present embodiment includes a check valve body 32. The check valve body 32 is received in the other-side portion 11*g* of the shaft insertion hole 11*f*. The check valve body 32 is made of, for example, metal or resin. The check valve body 32 is made of a plate material which has a thin wall thickness and is resilient, and this plate material is wound about the valve central axis Cv into a cylindrical tubular form. Furthermore, the check valve body 32 tightly abuts against a peripheral wall surface of the other-side portion 11*g* of the shaft insertion hole 11*f* over its entire circumference due to the resiliency of the check valve body 32 which tends to radially outwardly expand. Specifically, the check valve body 32 is shaped in a simple wound plate form that is formed by winding the thin plate material by generally one turn along the peripheral wall surface of the other-side portion 11*g*.

In addition, the housing 11 of the present embodiment has a first communication hole 115*a*, a second communication hole 115*b*, a third communication hole 115*c* and a fourth communication hole 115*d* in place of the communication hole 11*j* of the first embodiment (see FIG. 1). The first communication hole 115*a* extends through the wall between the other-side portion 11*g* of the shaft insertion hole 11*f* and the first other-side space 11*b* in the valve radial direction Dr to communicate between the other-side portion 11*g* and the first other-side space 11*b* through the check valve body 32. The second communication hole 115*b* extends through the wall between the other-side portion 11*g* of the shaft insertion hole 11*f* and the second other-side space 11*c* in the valve radial direction Dr to communicate between the other-side portion 11*g* and the second other-side space 11*c* through the check valve body 32.

The third communication hole 115*c* extends through the wall between the other-side portion 11*g* of the shaft insertion hole 11*f* and the third other-side space 11*d* in the valve radial direction Dr to communicate between the other-side portion 11*g* and the third other-side space 11*d* through the check valve body 32. The fourth communication hole 115*d* extends through the wall between the other-side portion 11*g* of the shaft insertion hole 11*f* and the fourth other-side space 11*e* in the valve radial direction Dr to communicate between the other-side portion 11*g* and the fourth other-side space 11*e* through the check valve body 32. The third communication hole 115*c* is the same as the communication hole 11*j* of the first embodiment.

Since the first to fourth communication holes 115*a*, 115*b*, 115*c*, 115*d* are formed in the above-described manner, the communication passage 17*a* of the shaft 17 is connected to each of the first to fourth other-side spaces 11*b*-11*e* through the check valve body 32. In the description of the present embodiment, the first to fourth communication holes 115*a*, 115*b*, 115*c*, 115*d* may be written as first to fourth communication holes 115*a*-115*d*.

Each circumferentially adjacent two of the first to fourth communication holes 115*a*-115*d*, which are adjacent to each other in the valve circumferential direction Dc, are displaced relative to each other in the valve axial direction Da. For example, the first communication hole 115*a* and the third communication hole 115*c* are displaced relative to the second communication hole 115*b* and the fourth communication hole 115*d* toward the other axial side in the valve axial direction Da. The position of the first communication hole 115*a* in the valve axial direction Da is the same as the position of the third communication hole 115*c* in the valve axial direction Da, and the position of the second communication hole 115*b* in the valve axial direction Da is the same as the position of the fourth communication hole 115*d* in the valve axial direction Da.

Furthermore, the check valve body 32 has: a first check valve portion 321 which covers an opening of the first communication hole 115*a*; and a second check valve portion 322 which covers an opening of the second communication hole 115*b*. Also, the check valve body 32 has: a third check valve portion 323 which covers an opening of the third communication hole 115*c*; and a fourth check valve portion 324 which covers an opening of the fourth communication hole 115*d*.

For instance, an operation of the first check valve portion 321 will now be described. The first check valve portion 321 is deformed and is lifted away from the peripheral wall surface of the shaft insertion hole 11*f* to form a gap between the first check valve portion 321 and the peripheral wall surface of the shaft insertion hole 11*f* in response to the flow of the heat medium from the first other-side space 11*b* toward the communication passage 17*a*. Therefore, the heat medium can flow through this gap, and thereby the first check valve portion 321 enables the flow of the heat medium from the first other-side space 11*b* to the communication passage 17*a*.

In contrast, the first check valve portion 321 is urged against the peripheral wall surface of the shaft insertion hole 11*f* to tightly contact the peripheral wall surface of the shaft insertion hole 11*f* by the pressure in the shaft insertion hole 11*f* in response to the flow of the heat medium from the communication passage 17*a* toward the first other-side space 11*b*. Therefore, the first check valve portion 321 blocks the flow of the heat medium from the communication passage 17*a* to the first other-side space 11*b*.

An operation of each of the second to fourth check valve portions 322, 323, 324 is the same as that of the first check valve portion 321. Therefore, the second check valve portion 322 enables the flow of the heat medium from the second other-side space 11*c* to the communication passage 17*a* and blocks the flow of the heat medium from the communication passage 17*a* to the second other-side space 11*c*. Furthermore, the third check valve portion 323 enables the flow of the heat medium from the third other-side space 11*d* to the communication passage 17*a* and blocks the flow of the heat medium from the communication passage 17*a* to the third other-side space 11*d*. Also, the fourth check valve portion 324 enables the flow of the heat medium from the fourth other-side space 11*e* to the communication passage 17*a* and blocks the flow of the heat medium from the communication passage 17*a* to the fourth other-side space 11*e*.

Now, it is assumed that the first other-side space 11*b* has the highest pressure among the first to fourth other-side spaces 11*b*-11*e*, and the reverse pressure described above is generated. In this case, since the first check valve portion 321 enables the flow of the heat medium from the first other-side space 11*b* to the communication passage 17*a*, the pressure in the shaft insertion hole 11*f* and the pressure P1 in the pressure chamber 24*a* become equal to the pressure in the first other-side space 11*b*. In contrast, since the pressure in each of the second to fourth other-side spaces 11*c*, 11*d*, 11*e* becomes lower than the pressure in the shaft insertion hole 11*f*, the second to fourth check valve portions 322, 323, 324 tightly contact the peripheral wall surface of the shaft insertion hole 11*f* to close the second to fourth communication holes 115*b*, 115*c*, 115*d*. Therefore, the heat medium, which enters the shaft insertion hole 11*f* from the first other-side space 11*b*, is limited from flowing into any of the second to fourth other-side spaces 11*c*, 11*d*, 11*e*.

This is also true in each of the rest of the cases where one of the second to fourth other-side spaces 11*c*, 11*d*, 11*e* gets the highest pressure among the first to fourth other-side spaces 11*b*-11*e*, and the reverse pressure described above is generated.

Figure 10:
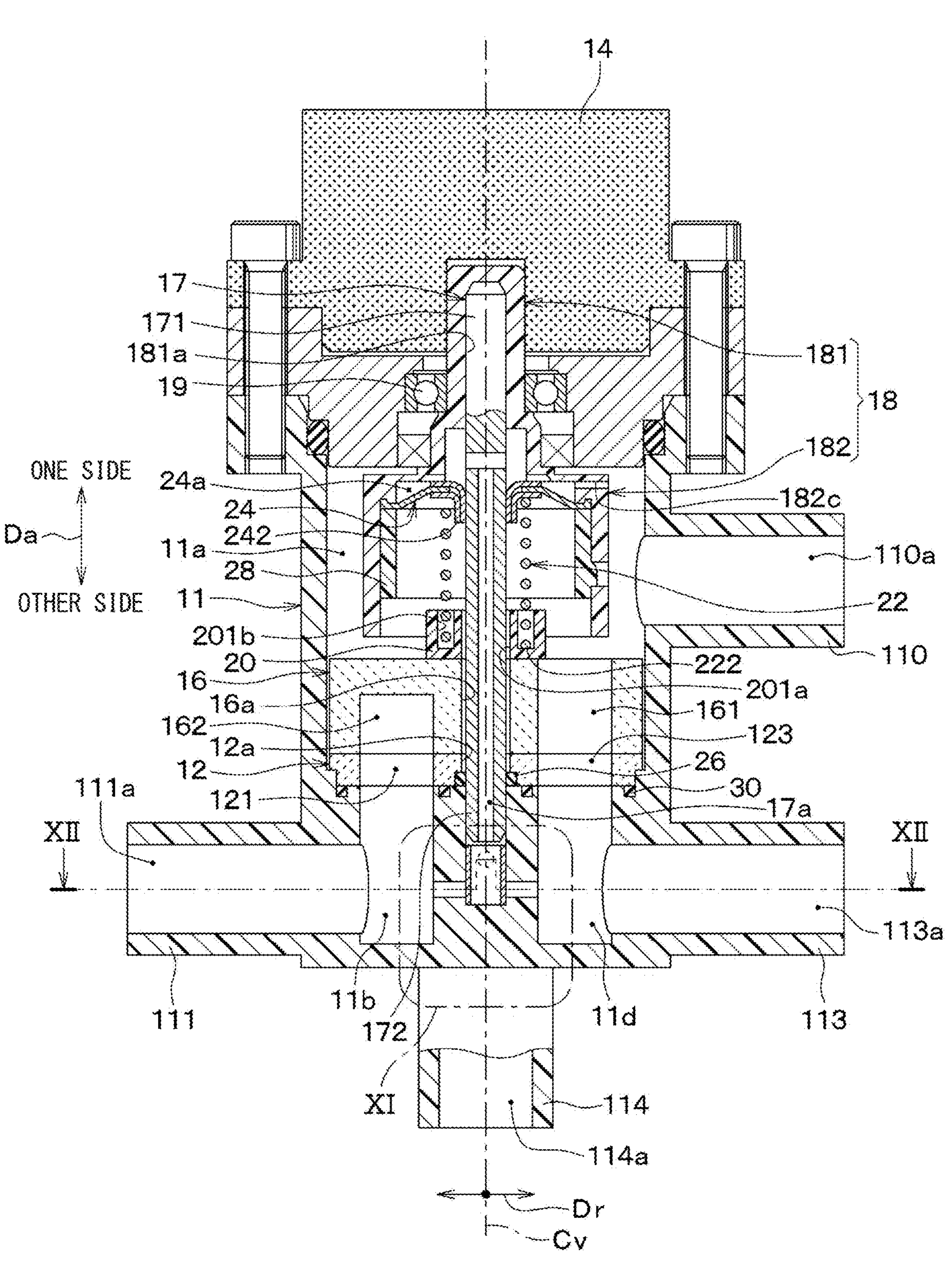
FIG. 10 is a schematic longitudinal cross-sectional view of a valve apparatus of a second embodiment, corresponding to FIG. 1.
Figure 11:
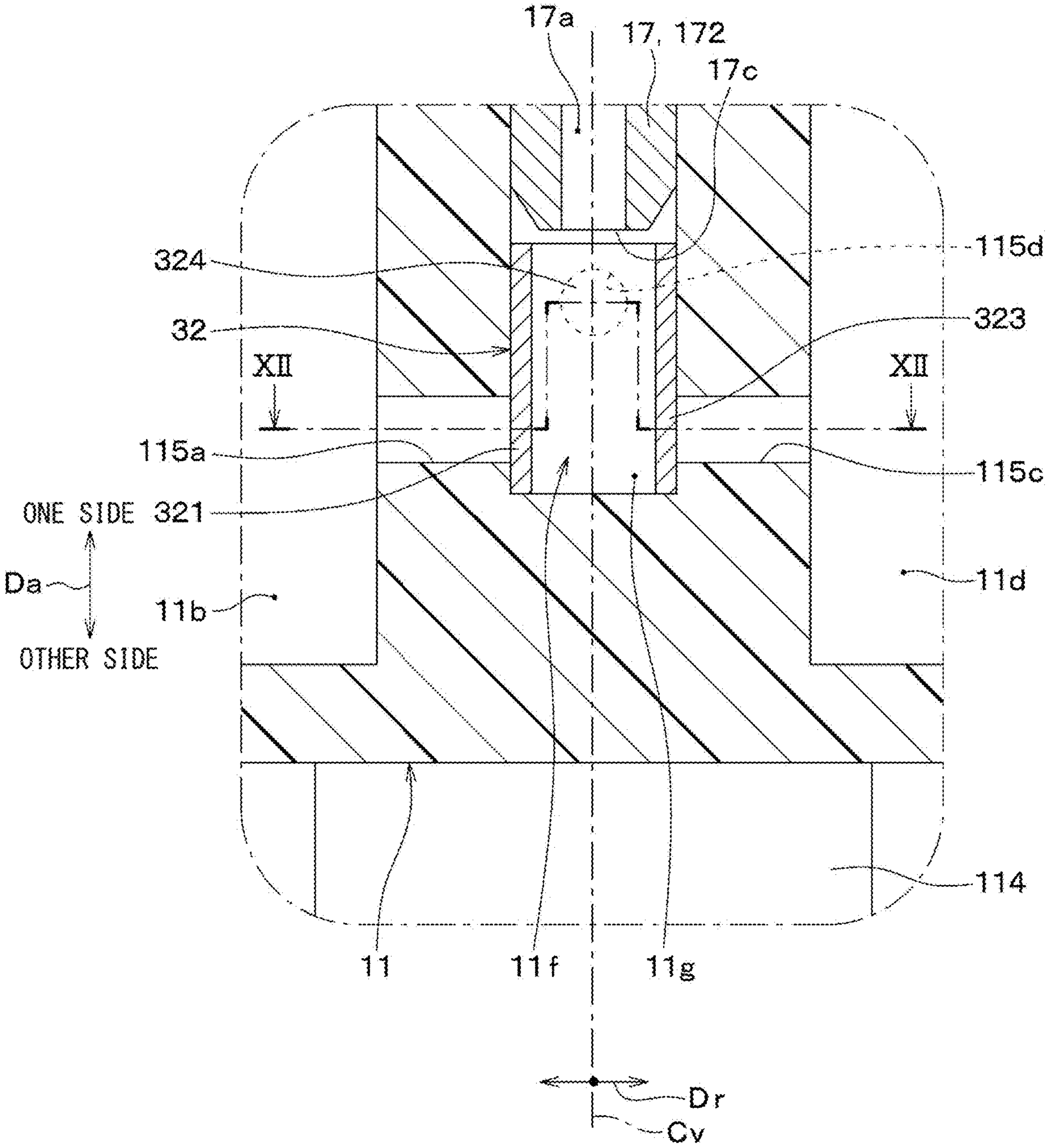
FIG. 11 is a partial enlarged view of a portion XI in FIG. 10 according to the second embodiment.
Figure 12:
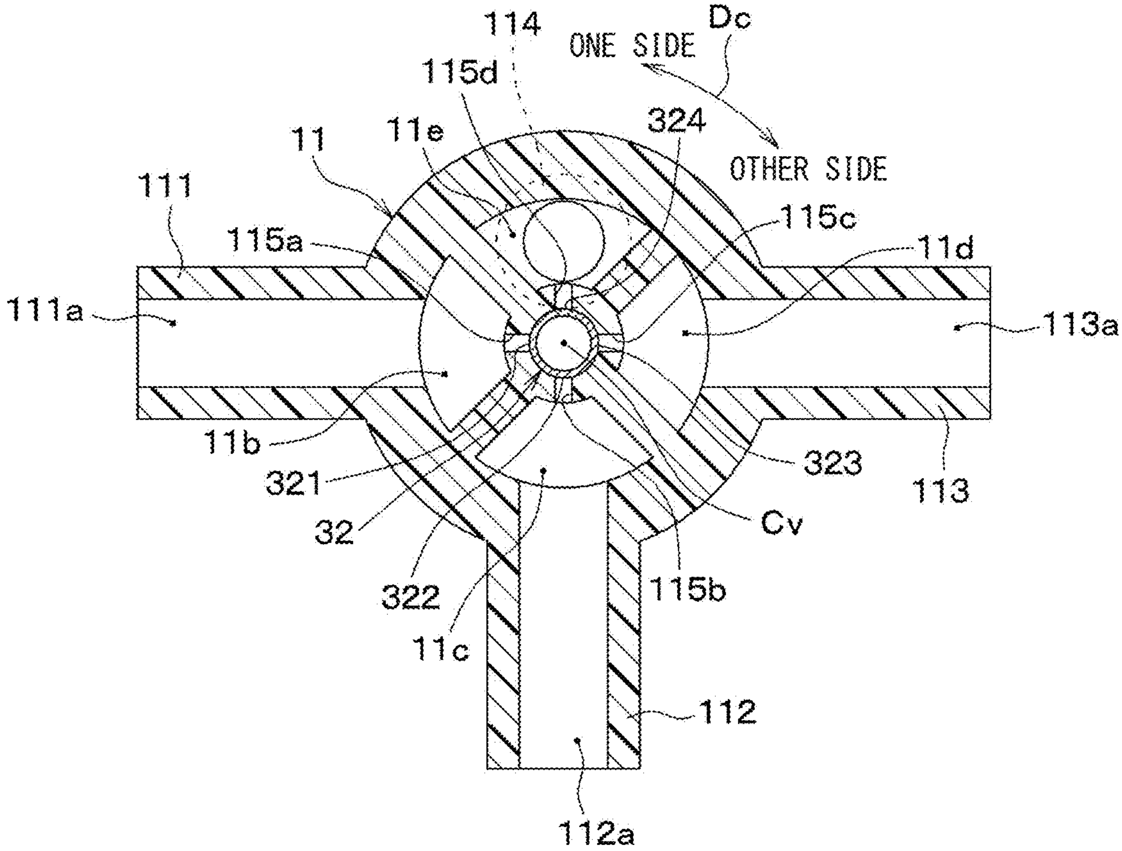
FIG. 12 is a cross-sectional view taken along line XII-XII in FIGS. 10 and 11 according to the second embodiment, corresponding to FIG. 2.
Figure 13:
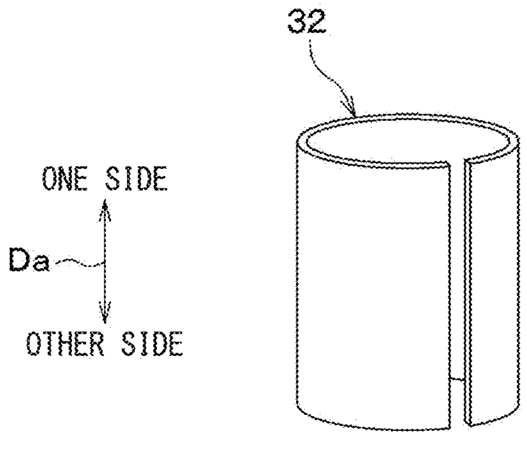
FIG. 13 is a perspective view of a check valve body alone of the valve apparatus according to the second embodiment.

As shown in FIG. 10, a depressurizing hole 182*c*, which extends from the pressure chamber 24*a* to the one-side space 11*a* of the housing 11, is formed at the tubular portion 182 of the shaft body 18. The depressurizing hole 182*c* is formed as a leakage passage that enables leakage of the heat medium from the pressure chamber 24*a* to the one-side space 11*a* in the case where the pressure P1 in the pressure chamber 24*a* is higher than the pressure P2 in the one-side space 11*a*.

A passage cross-sectional area of the depressurizing hole 182*c* is very small. Specifically, the depressurizing hole 182*c* is formed such that a flow resistance of the depressurizing hole 182*c* is the largest relative to the flow paths of the heat medium each of which connects the corresponding one of the first to fourth other-side spaces 11*b*-11*e* to the pressure chamber 24*a*. Therefore, in the case where the reverse pressure described above is generated, the depressurizing hole 182*c* does not interfere an increase in the pressure P1 in the pressure chamber 24*a* in response to the introduction of the pressure of the heat medium which is from one of the first to fourth other-side spaces 11*b*-11*e* to the pressure chamber 24*a* and causes the reverse pressure.

(1) As described above, according to the present embodiment, the valve apparatus 10 includes the first to fourth check valve portions 321, 322, 323, 324. The first check valve portion 321 enables the flow of the heat medium from the first other-side space 11*b* to the communication passage 17*a* and blocks the flow of the heat medium from the communication passage 17*a* to the first other-side space 11*b*. The operation of each of the second to fourth check valve portions 322, 323, 324 relative to the corresponding one of the second to fourth other-side spaces 11*c*, 11*d*, 11*e* is the same as that of the first check valve portion 321.

Therefore, the pressure of the heat medium can be introduced from any one of the first to fourth other-side spaces 11*b*-11*e* into the pressure chamber 24*a* of the differential pressure device 24. That is, even in the case where the reverse pressure is generated due to the pressure in any one of the first to fourth other-side spaces 11*b*-11*e*, the differential pressure device 24 can generate the urging force which urges the rotor 16 against the stator 12. Furthermore, the communication among the first to fourth other-side spaces 11*b*-11*e* through the shaft insertion hole 11*f* can be limited.

(2) Furthermore, according to the present embodiment, the depressurizing hole 182*c* of the shaft body 18 is formed as the leakage passage that enables the leakage of the heat medium from the pressure chamber 24*a* to the one-side space 11*a* in the case where the pressure P1 in the pressure chamber 24*a* is higher than the pressure P2 in the one-side space 11*a*.

Here, since the check valve body 32 is provided, the pressure P1 in the pressure chamber 24*a* is not released to any of the first to fourth other-side spaces 11*b*-11*e* through the communication passage 17*a*. Therefore, in an imaginary case where the depressurizing hole 182*c* is absent, the pressure P1 in the pressure chamber 24*a*, which is increased upon the introduction of the heat medium from any one of the first to fourth other-side spaces 11*b*-11*e*, will be held at this increased pressure. In order to limit the occurrence of this phenomenon, the depressurizing hole 182*c* is provided.

In other words, in the case where the reverse pressure described above ceases to act after once acting on the rotor 16, and the pressure, which is higher than the pressure P2 in the one-side space 11*a*, is no longer introduced into the pressure chamber 24*a*, the heat medium can be discharged from the pressure chamber 24*a* into the one-side space 11*a* through the depressurizing hole 182*c*. In short, in the case where the reverse pressure described above no longer acts on the rotor 16, the pressure chamber 24*a* can be quickly depressurized, and the urging force of the differential pressure device 24, which urges the rotor 16 against the stator 12, can be reduced.

Furthermore, according to the present embodiment, the first to fourth check valve portions 321, 322, 323, 324 are included in the check valve body 32 that is formed by the single wound plate. Therefore, it is not required to provide check valve elements, which are formed respectively from separate components, to the first to fourth communication holes 115*a*-115*d*, respectively.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Third Embodiment

Next, a third embodiment will be described. In the present embodiment, points, which are different from the first embodiment, will be mainly described.

Figure 14:
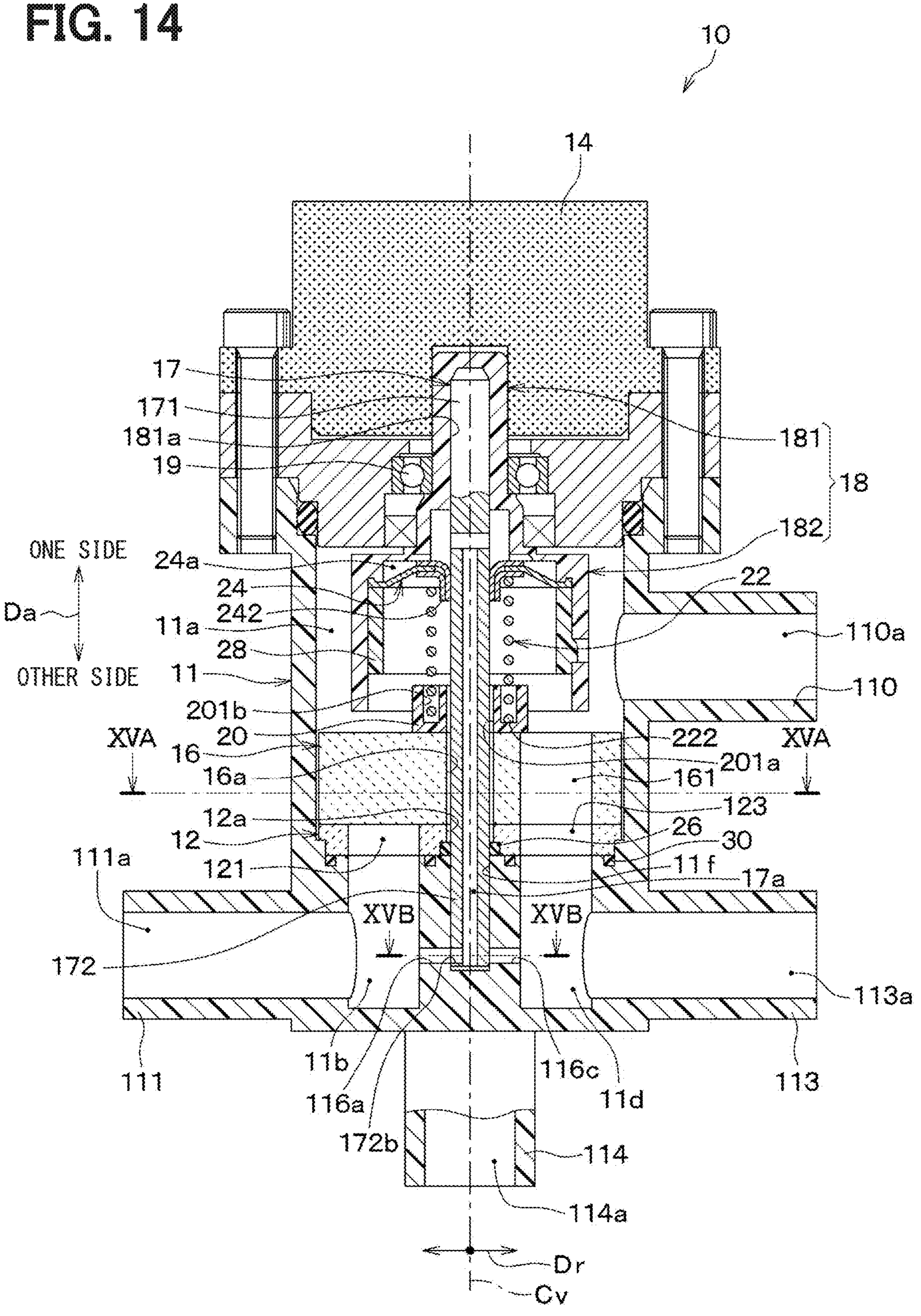
FIG. 14 is a schematic longitudinal cross-sectional view of a valve apparatus of a third embodiment, corresponding to FIG. 1.
Figure 15A:
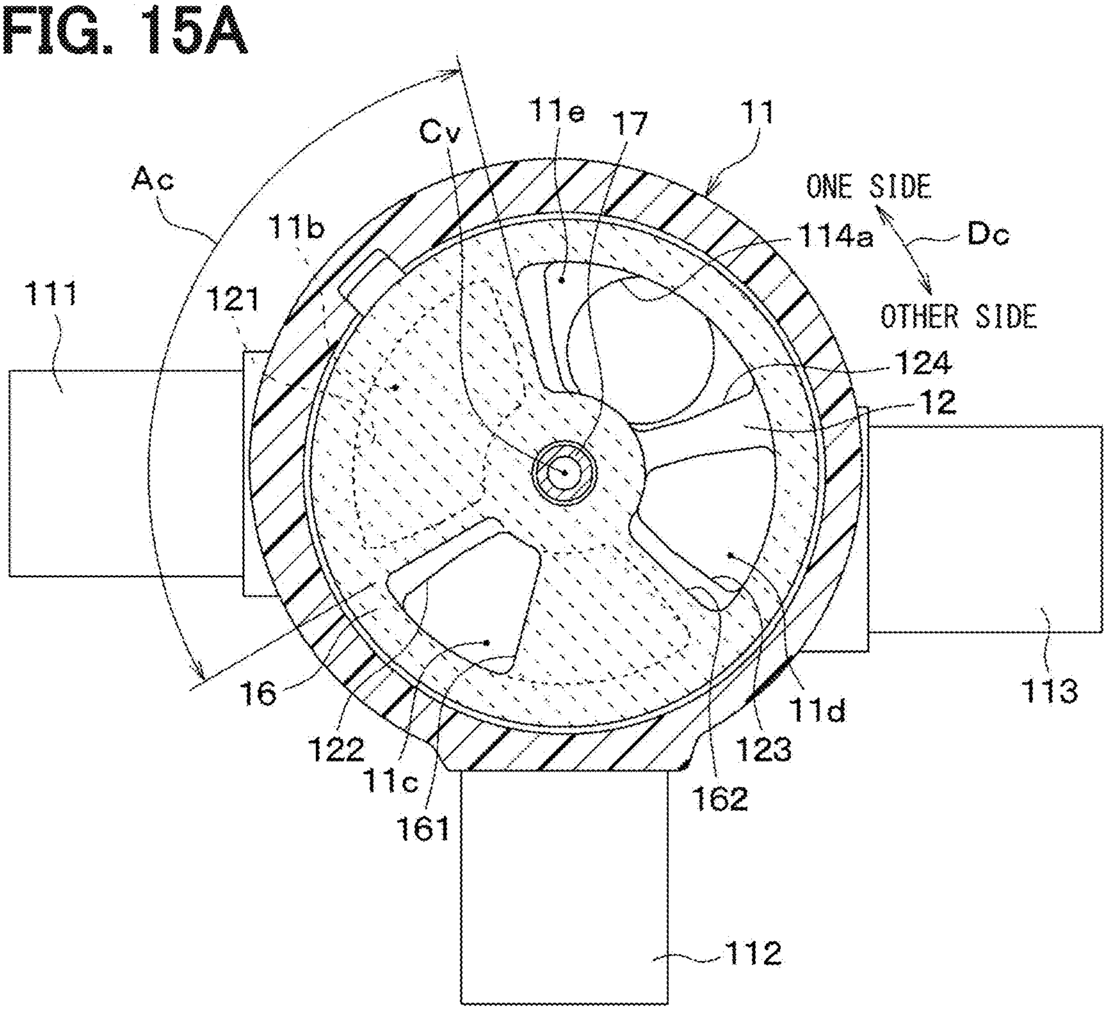
FIG. 15A is a cross-sectional view taken along line XVA-XVA in FIG. 13 according to the third embodiment, indicating a state where a first passage hole of a stator is fully closed by a rotor.
Figure 15B:
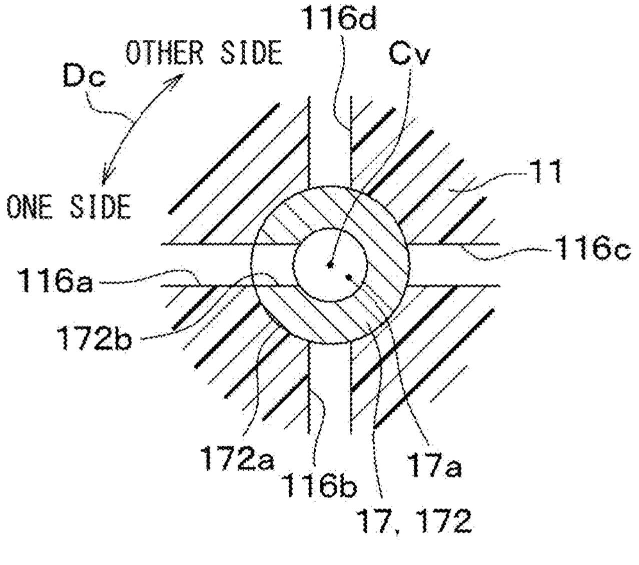
FIG. 15B is a cross-sectional view taken along line XVB-XVB in FIG. 13 according to the third embodiment, indicating a state where the rotor is positioned at the same rotational position as that of FIG. 15A.

As shown in FIGS. 14 to 15B, the housing 11 of the present embodiment has a first communication hole 116*a*, a second communication hole 116*b*, a third communication hole 116*c* and a fourth communication hole 116*d* in place of the communication hole 11*j* of the first embodiment (see FIG. 1). The first communication hole 116*a* extends through the wall between the shaft insertion hole 11*f* and the first other-side space 11*b* in the valve radial direction Dr to communicate between the shaft insertion hole 11*f* and the first other-side space 11*b*. The second communication hole 116*b* extends through the wall between the shaft insertion hole 11*f* and the second other-side space 11*c* in the valve radial direction Dr to communicate between the shaft insertion hole 11*f* and the second other-side space 11*c*. In the present embodiment, the shaft insertion hole 11*f* serves as an insertion hole of the present disclosure. The third communication hole 116*c* extends through the wall between the shaft insertion hole 11*f* and the third other-side space 11*d* in the valve radial direction Dr to communicate between the shaft insertion hole 11*f* and the third other-side space 11*d*. The fourth communication hole 116*d* extends through the wall between the shaft insertion hole 11*f* and the fourth other-side space 11*e* in the valve radial direction Dr to communicate between the shaft insertion hole 11*f* and the fourth other-side space 11*e*. The first to fourth communication holes 116*a*, 116*b*, 116*c*, 116*d* are arranged such that the axial positions of the first to fourth communication holes 116*a*, 116*b*, 116*c*, 116*d* in the valve axial direction Da are identical to each other. In the description of the present embodiment, the first to fourth communication holes 116*a*, 116*b*, 116*c*, 116*d* may be written as first to fourth communication holes 116*a*-116*d*.

Furthermore, in the present embodiment, since the shaft 17 is inserted along generally an entire extent of the shaft insertion hole 11*f*, the other-side portion 11*g* of the shaft insertion hole 11*f* (see FIG. 1) becomes very small. The first to fourth communication holes 116*a*-116*d* of the present embodiment open within an axial range of an occupied portion of the shaft insertion hole 11*f*, which is occupied by the shaft 17, in the valve axial direction Da. In other words, the first to fourth communication holes 116*a*-116*d* are arranged to overlap the shaft other-side portion 172 on the radially outer side of the shaft other-side portion 172 in the valve radial direction Dr.

Furthermore, even in the present embodiment, the shaft other-side portion 172 is rotatable relative to the housing 11 like in the first embodiment. However, in the present embodiment, a gap between the shaft other-side portion 172 and a peripheral wall surface of the shaft insertion hole 11*f* is airtightly sealed or is substantially sealed to such an extent that the leakage of the heat medium through the gap is negligible.

Figure 16:
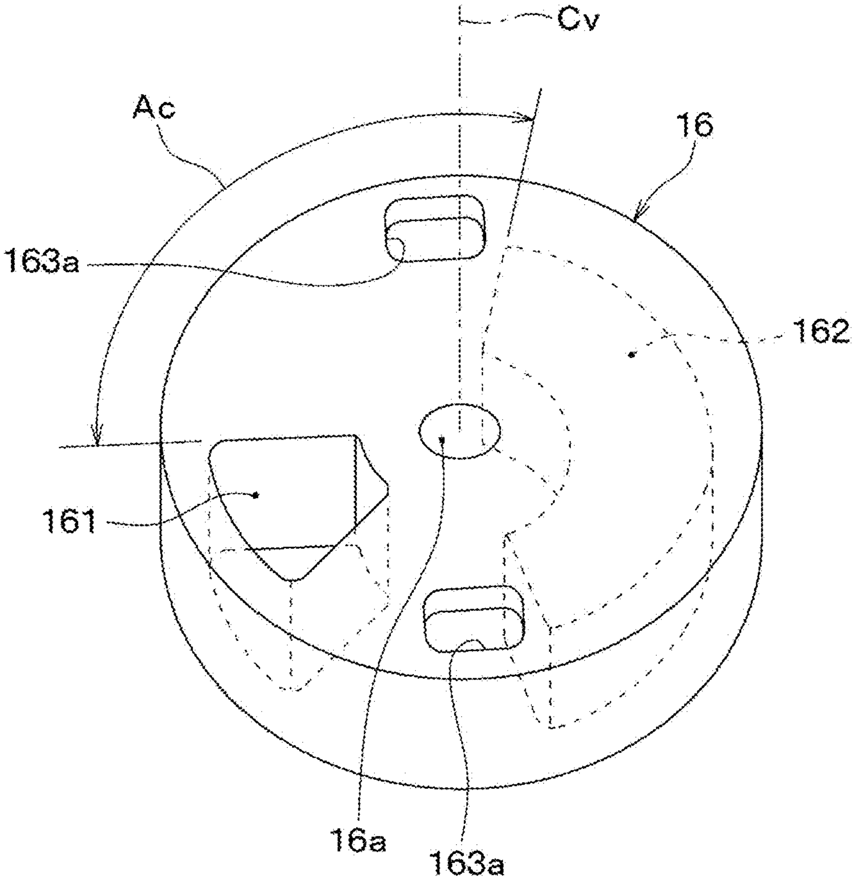
FIG. 16 is a perspective view of the rotor alone according to the third embodiment.

In the present embodiment, as shown in FIGS. 15A and 16, the rotor 16 has a fully closing angular range Ac. The fully closing angular range Ac is an angular range about the valve central axis Cv, and the opening-degree adjusting hole 161 and the intercommunication groove 162 are not formed in the fully closing angular range Ac. When the fully closing angular range Ac of the rotor 16 covers the entire opening of the first passage hole 121 of the stator 12, the first passage hole 121 is held in a fully closing state where the first passage hole 121 is fully closed. This is also true with respect to the fully closing state of each of the second to fourth passage holes 122, 123, 124. The same is true for the fully closing angular range Ac in the first embodiment described above.

As shown in FIGS. 14 to 15B, unlike the first embodiment, the shaft other-side portion 172 of the present embodiment has a peripheral surface hole 172*b* which opens at an outer peripheral surface 172*a* of the shaft other-side portion 172. The peripheral surface hole 172*b* is included in the communication passage 17*a* and forms an end portion of the communication passage 17*a* placed on the other axial side in the valve axial direction Da.

Specifically, at the outer peripheral surface 172*a* of the shaft other-side portion 172, the peripheral surface hole 172*b* of the shaft other-side portion 172 opens at a predetermined location within the fully closing angular range Ac of the rotor 16. This predetermined location is set such that the first communication hole 116*a* and the peripheral surface hole 172*b* are communicated with each other in the state where the first passage hole 121 of the stator 12 is fully closed, and the second communication hole 116*b* and the peripheral surface hole 172*b* are communicated with each other in the state where the second passage hole 122 of the stator 12 is fully closed. Since the shaft 17 and the rotor 16 are integrally rotated, the positional relationship between the peripheral surface hole 172*b* of the shaft other-side portion 172 and the fully closing angular range Ac of the rotor 16 does not change even when the shaft 17 is rotated.

Therefore, as shown in, for example, FIGS. 15A and 15B, when the opening of the first passage hole 121 on the rotor 16 side is entirely placed in the fully closing angular range Ac, the first passage hole 121 is fully closed by the rotor 16. At this time, the opening of the first communication hole 116*a* and the opening of the peripheral surface hole 172*b* of the shaft other-side portion 172 are opposed to each other, and the peripheral surface hole 172*b* is selectively communicated only with the first communication hole 116*a* among the first to fourth communication holes 116*a*-116*d*. Thereby, the pressure in the first other-side space 11*b* is introduced into the pressure chamber 24*a* in the state where the communication among the first to fourth other-side spaces 11*b*-11*e* is blocked. FIG. 15B indicates the orientation of the peripheral surface hole 172*b* (in other words, the orientation of the shaft 17) when the rotor 16 is placed at the rotational position shown in FIG. 15A.

Figure 17A:
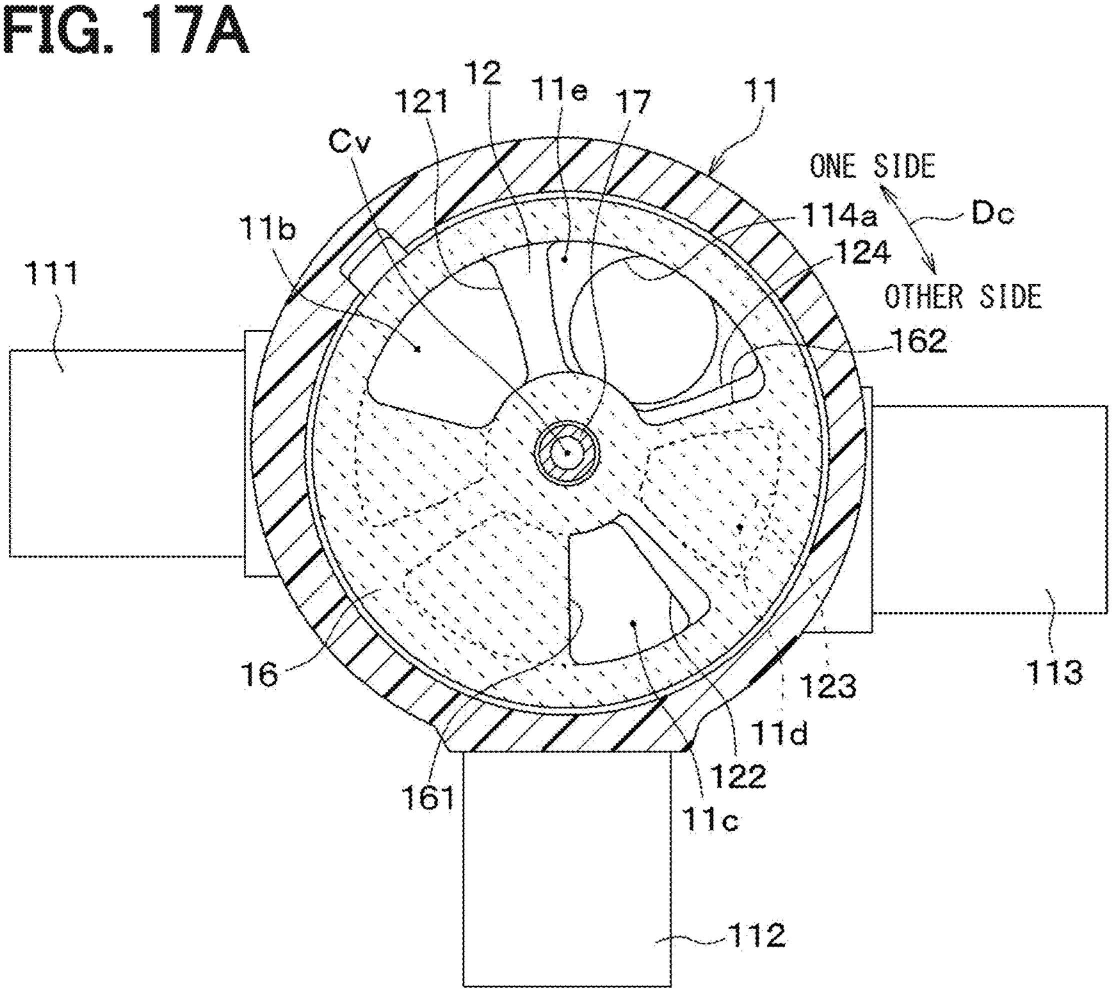
FIG. 17A is a cross-sectional view taken along line XVA-XVA in FIG. 14 according to the third embodiment, indicating a state where the rotor is rotated from the rotational position of FIG. 15A toward one circumferential side in a valve circumferential direction, so that first and second passage holes of the stator are opened by the rotor.
Figure 17B:
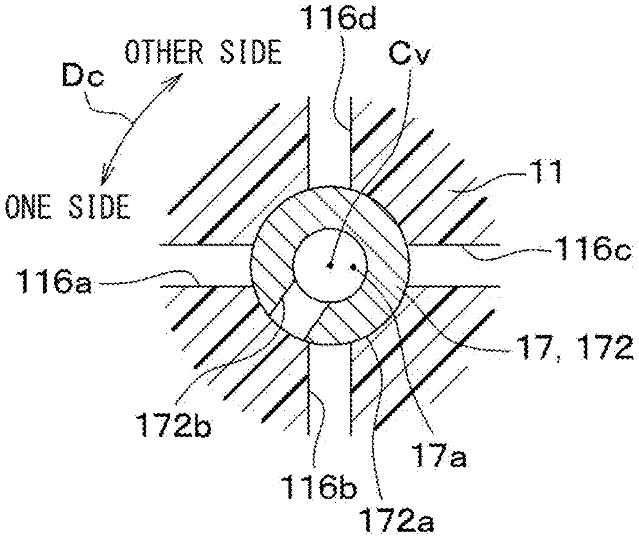
FIG. 17B is a cross-sectional view taken along line XVB-XVB in FIG. 14 according to the third embodiment, corresponding to FIG. 15B and indicating a state where the rotor is positioned at the same rotational position as that of FIG. 17A.

Then, when the rotor 16 is slightly rotated toward the one circumferential side in the valve circumferential direction Dc from the state shown in FIGS. 15A and 15B, the rotor 16 is placed in a state shown in FIGS. 17A and 17B. FIG. 17B indicates the orientation of the peripheral surface hole 172*b* when the rotor 16 is placed at the rotational position shown in FIG. 17A.

In the state shown in FIGS. 17A and 17B, each of the first and second passage holes 121, 122 of the stator 12 is not fully closed. The peripheral surface hole 172*b* of the shaft other-side portion 172 is placed between the first communication hole 116*a* and the second communication hole 116*b* in the valve circumferential direction Dc and is not communicated with any of the first to fourth communication holes 116*a*-116*d*.

Figure 18A:
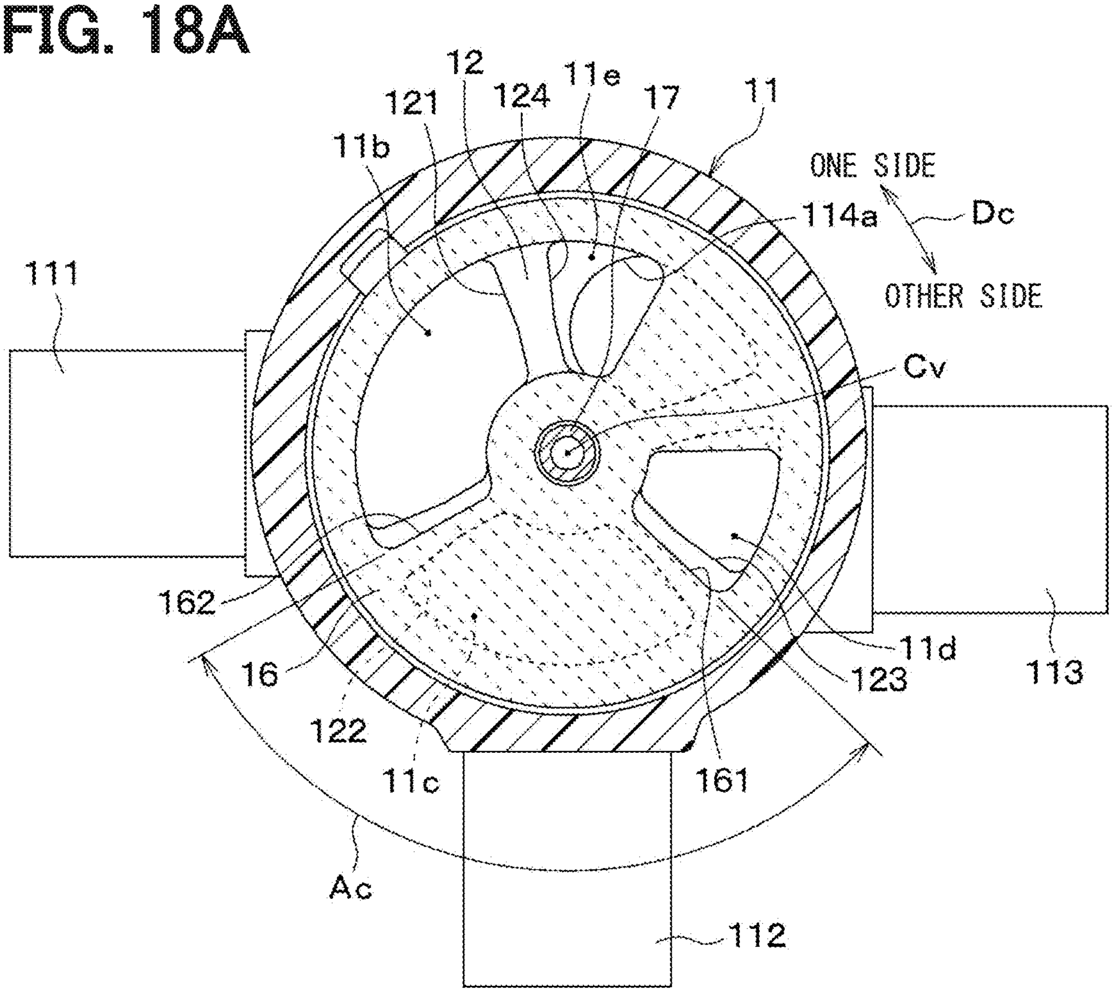
FIG. 18A is a cross-sectional view taken along line XVA-XVA in FIG. 14 according to the third embodiment, corresponding to FIG. 15A and indicating a state where the rotor is rotated from the rotational position of FIG. 17A toward the one circumferential side in the valve circumferential direction, so that a second passage hole of the stator is fully closed by the rotor.
Figure 18B:
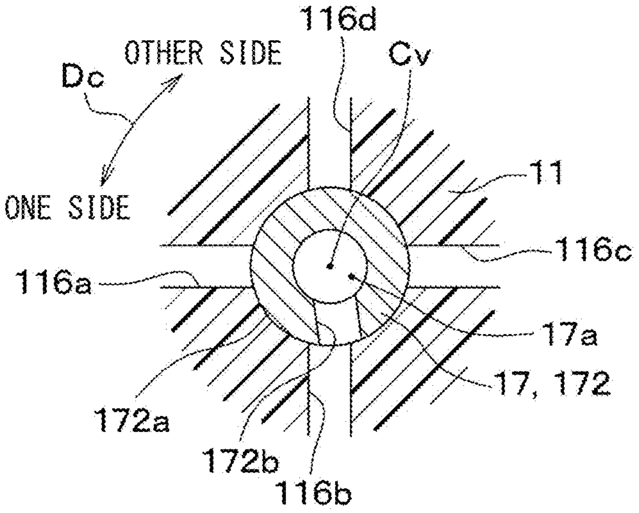
FIG. 18B is a cross-sectional view taken along line XVB-XVB in FIG. 14 according to the third embodiment, corresponding to FIG. 15B and indicating a state where the rotor is positioned at the same rotational position as that of FIG. 18A.

Then, when the rotor 16 is slightly rotated toward the one circumferential side in the valve circumferential direction Dc from the state shown in FIGS. 17A and 17B, the rotor 16 and the shaft 17 are placed in a state shown in FIGS. 18A and 18B. In the state shown in FIGS. 18A and 18B, since the opening of the second passage hole 122 on the rotor 16 side is entirely placed in the fully closing angular range Ac of the rotor 16, the second passage hole 122 is fully closed by the rotor 16. At this time, the opening of the second communication hole 116*b* and the opening of the peripheral surface hole 172*b* of the shaft other-side portion 172 are opposed to each other, and the peripheral surface hole 172*b* is selectively communicated only with the second communication hole 116*b* among the first to fourth communication holes 116*a*-116*d*. Thereby, the pressure in the second other-side space 11*c* is introduced into the pressure chamber 24*a* in the state where the communication among the first to fourth other-side spaces 11*b*-11*e* is blocked. FIG. 18B indicates the orientation of the peripheral surface hole 172*b* when the rotor 16 is placed at the rotational position shown in FIG. 18A.

Here, there is assumed a case where a suction side (i.e., a suction port) of the pump, which circulates the heat medium in the heat medium circuit having the valve apparatus 10 of the present embodiment, is connected to the one-side port passage 110*a*. Furthermore, in this case, it is also assumed that the discharge side of this pump is connected to the rest of the other-side port passages which are other than the pair of other-side port passages communicated with each other through the intercommunication groove 162 of the rotor 16 among the first to fourth other-side port passages 111*a*-114*a*.

In this case, in the state shown in FIGS. 15A and 15B, among the first to fourth other-side spaces 11*b*-11*e*, although the flow of the heat medium is generated at the second to fourth other-side spaces 11*c*, 11*d*, 11*e*, a reverse flow of the heat medium at the first other-side space 11*b* is blocked by the rotor 16. In the passages, in which the flow of the fluid is generated, since a pressure loss is generated at the time of passing through a heat exchanger(s) and/or a pipe(s) of the heat medium circuit, the pressure of the fluid at the time of reaching the valve apparatus 10 is dropped. However, since the flow of the fluid is not generated at the blocked passage, the pressure of this fluid is not dropped, and the discharge pressure of the pump is directly exerted at the valve apparatus 10. Thus, the first other-side space 11*b* becomes a highest-pressure space which has the highest pressure among the first to fourth other-side spaces 11*b*-11*e*. That is, the first other-side space 11*b* becomes the highest-pressure space when the first passage hole 121 of the stator 12 is fully closed. Then, as shown in FIG. 15B, the communication passage 17*a* of the shaft 17 is communicated with the first other-side space 11*b* when the first other-side space 11*b* becomes the highest-pressure space.

Furthermore, in the state shown in FIGS. 18A and 18B, among the first to fourth other-side spaces 11*b*-11*e*, although the flow of the heat medium is generated at the first, third and fourth other-side spaces 11*b*, 11*d*, 11*e*, the reverse flow of the heat medium at the second other-side space 11*c* is blocked by the rotor 16. Therefore, the second other-side space 11*c* becomes the highest-pressure space. That is, the second other-side space 11*c* becomes the highest-pressure space when the second passage hole 122 of the stator 12 is fully closed. Then, as shown in FIG. 18B, the communication passage 17*a* of the shaft 17 is communicated with the second other-side space 11*c* when the second other-side space 11*c* becomes the highest-pressure space.

As described above, the highest-pressure space is changed from the first other-side space 11*b* to the second other-side space 11*c* in response to the rotation of the rotor 16 toward the one circumferential side in the valve circumferential direction Dc. In contrast, the highest-pressure space is changed from the second other-side space 11*c* to the first other-side space 11*b* in response to the rotation of the rotor 16 toward the other circumferential side (also simply referred to as the other side) in the valve circumferential direction Dc.

In the state shown in FIGS. 15A and 15B, although the pressure in each of the first to fourth other-side spaces 11*b*-11*e* is exerted to the rotor 16 as the reverse pressure, the pressure in the first other-side space 11*b*, which is the highest-pressure space, becomes the highest reverse pressure. Furthermore, even in the state shown in FIGS. 18A and 18B, the pressure in each of the first to fourth other-side spaces 11*b*-11*e* is exerted to the rotor 16 as the reverse pressure. However, in this case, the pressure in the second other-side space 11*c*, which is the highest-pressure space, becomes the highest reverse pressure.

Furthermore, in the present embodiment, there is a case where the opening of the third passage hole 123 of the stator 12 is entirely covered by the fully closing angular range Ac of the rotor 16 and is fully closed. In this case, the peripheral surface hole 172*b* of the shaft other-side portion 172 is communicated only with the third communication hole 116*c* among the first to fourth communication holes 116*a*-116*d*. Like the cases described above, there is a case where the opening of the fourth passage hole 124 is entirely covered by the fully closing angular range Ac of the rotor 16 and is fully closed. In this case, the peripheral surface hole 172*b* of the shaft other-side portion 172 is communicated only with the fourth communication hole 116*d* among the first to fourth communication holes 116*a*-116*d*.

(1) As shown in FIGS. 15A, 15B, 18A and 18B, according to the present embodiment, in the case where the reverse pressure described above is exerted to the rotor 16, the highest-pressure space having the highest pressure among the first to fourth other-side spaces 11*b*-11*e* is changed, for example, as follows. That is, the highest-pressure space is changed from the first other-side space 11*b* to the second other-side space 11*c* in response to the rotation of the rotor 16 toward the one circumferential side in the valve circumferential direction Dc. Here, the communication passage 17*a* of the shaft 17 is communicated with the first other-side space 11*b* when the first other-side space 11*b* becomes the highest-pressure space. In addition, the communication passage 17*a* of the shaft 17 is communicated with the second other-side space 11*c* when the second other-side space 11*c* becomes the highest-pressure space.

Therefore, the pressure of the heat medium can be introduced from any one of the first and second other-side spaces 11*b*, 11*c* into the pressure chamber 24*a* of the differential pressure device 24. Here, no matter which of the first and second other-side spaces 11*b*, 11*c* becomes the highest-pressure space, the pressure in this highest-pressure space can be introduced into the pressure chamber 24*a* of the differential pressure device 24. That is, the urging force, which urges the rotor 16 against the stator 12 by the pressure P1 in the pressure chamber 24*a*, can be generated at the amount according to the highest reverse pressure described above.

Furthermore, according to the present embodiment, the first communication hole 116*a* of the housing 11 and the peripheral surface hole 172*b* of the shaft other-side portion 172 are communicated with each other when the first other-side space 11*b* becomes the highest-pressure space according to the rotational position of the rotor 16. Furthermore, the second communication hole 116*b* of the housing 11 and the peripheral surface hole 172*b* of the shaft other-side portion 172 are communicated with each other when the second other-side space 11*c* becomes the highest-pressure space.

Therefore, the communication passage 17*a* of the shaft 17 can be communicated with the highest-pressure space among the first to fourth other-side spaces 11*b*-11*e* in the state where the communication among the first to fourth other-side spaces 11*b*-11*e* through the shaft insertion hole 11*f* is limited. Furthermore, without adding an additional component, such as the check valve body 32 of the second embodiment (see FIG. 11), the reverse pressure described above can be introduced into the pressure chamber 24*a* in the state where the communication among the first to fourth other-side spaces 11*b*-11*e* is limited.

Furthermore, according to the present embodiment, the first other-side space 11*b* becomes the highest-pressure space when the first passage hole 121 among the first to fourth passage holes 121-124 of the stator 12 is fully closed. Furthermore, the second other-side space 11*c* becomes the highest-pressure space when the second passage hole 122 of the stator 12 is fully closed.

The one to be fully closed among the first and second passage holes 121, 122 of the stator 12 is determined based on the rotational position of the rotor 16 and the configurations of the openings of the rotor 16 (e.g., the positions of the opening-degree adjusting hole 161 and the intercommunication groove 162). Since the rotor 16 and the shaft 17 are integrally rotated about the valve central axis Cv, the peripheral surface hole 172*b* of the shaft other-side portion 172 is rotated integrally with the rotor 16.

Therefore, the orientation of the opening of the communication passage 17*a* (specifically, the orientation of the peripheral surface hole 172*b*) can be easily determined according to the configurations of the openings of the rotor 16 described above such that the destination, to which the communication passage 17*a* of the shaft 17 is communicated, becomes the highest-pressure space.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Fourth Embodiment

Next, a fourth embodiment will be described. In the present embodiment, points, which are different from the first embodiment, will be mainly described.

Figure 19:
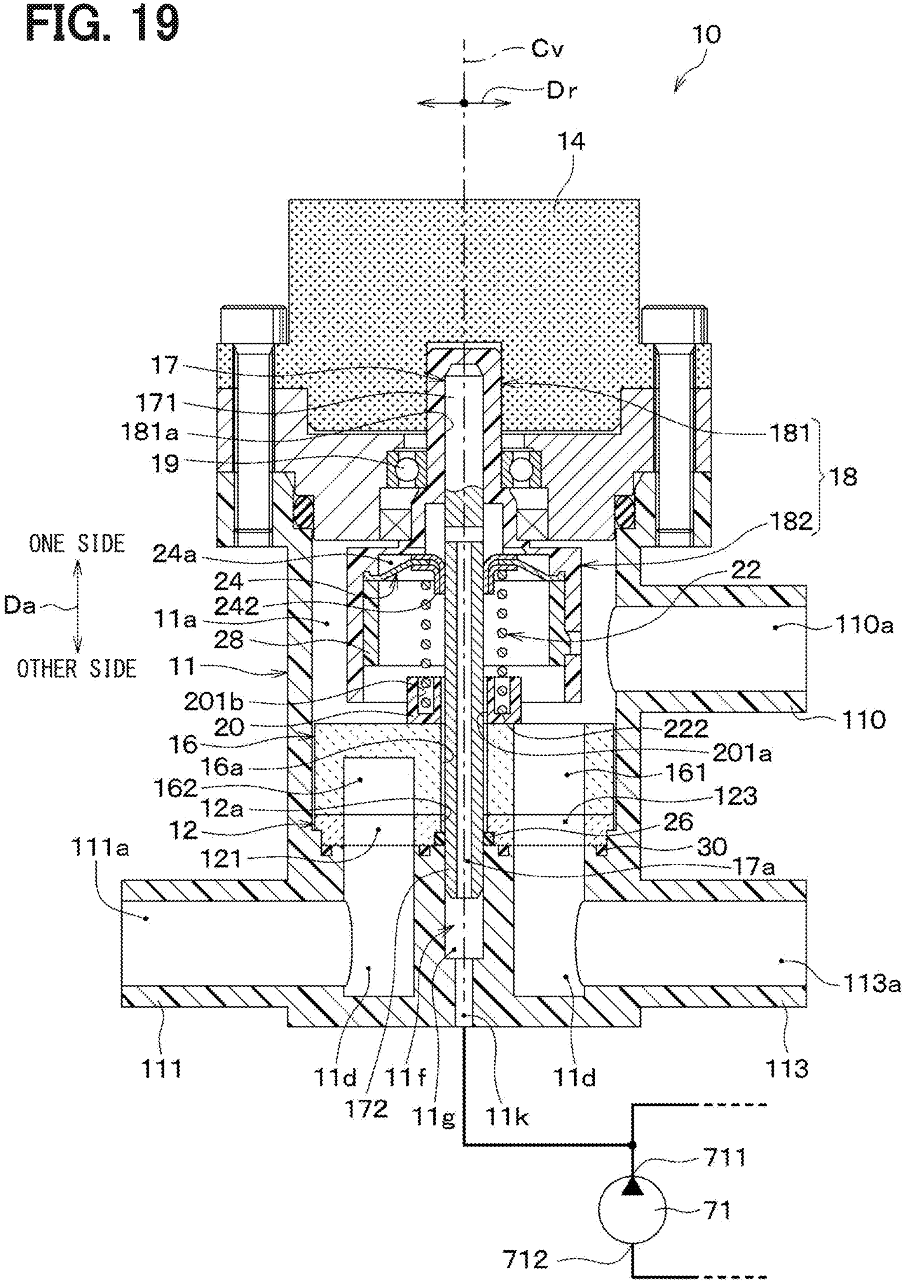
FIG. 19 is a schematic longitudinal cross-sectional view of a valve apparatus of a fourth embodiment, corresponding to FIG. 1.
Figure 20:
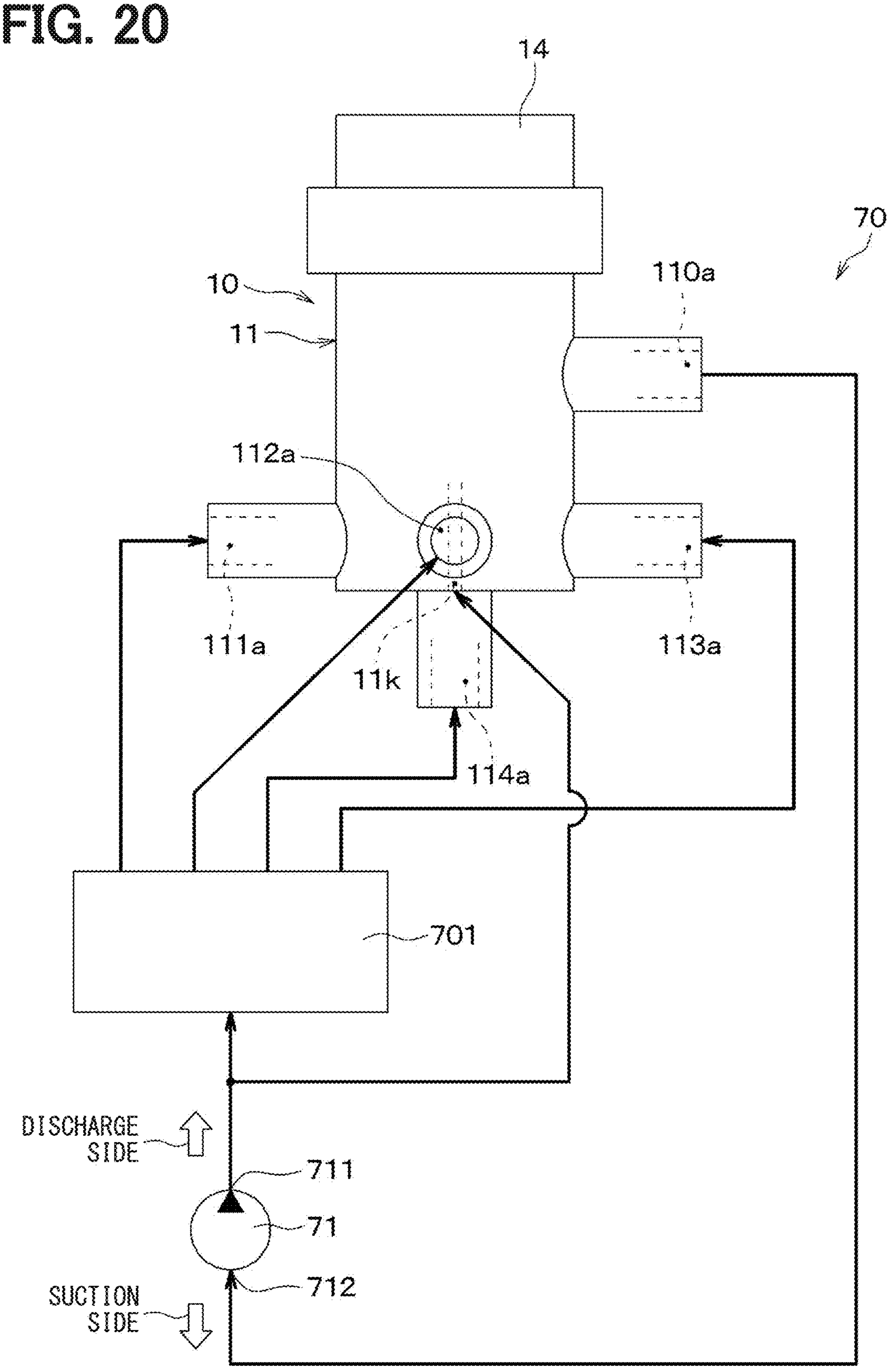
FIG. 20 is a circuit diagram indicating a schematic structure of a heat medium circuit including the valve apparatus according to the fourth embodiment.

As shown in FIGS. 19 and 20, even in the present embodiment, the valve apparatus 10 forms the part of the heat medium circuit 70 in which the heat medium is circulated like in the first embodiment. The heat medium circuit 70 serves as a fluid circuit of the present disclosure. The heat medium circuit 70 includes the pump 71. The pump is placed at the outside of the valve apparatus 10, i.e., is placed at the outside of the housing 11 of the valve apparatus 10.

In the heat medium circuit 70, the heat medium is discharged from a discharge port 711 of the pump 71, and the discharged heat medium is circulated in the heat medium circuit 70 and is suctioned into a suction port 712 of the pump 71.

Furthermore, in the heat medium circuit 70 of the present embodiment, the discharge side of the pump 71 can be connected to each of the first to fourth other-side port passages 111*a*-114*a* of the valve apparatus 10 through an intermediate circuit 701 that forms a part of the heat medium circuit 70. The intermediate circuit 701 includes, for example, a plurality of heat exchangers and a plurality of pipes. Furthermore, depending on the circuit structure of the intermediate circuit 701, the discharge side of the pump 71 may be connected to one of the first to fourth other-side port passages 111*a*-114*a* in one case or may be connected to all of the first to fourth other-side port passages 111*a*-114*a* in another case. In the present embodiment, the one-side port passage 110*a* of the valve apparatus 10 is connected to the suction side of the pump 71.

Furthermore, the housing 11 of the valve apparatus 10 has an outside communication hole 11*k* that extends through the wall of the housing 11 from the other-side portion 11*g* of the shaft insertion hole 11*f* to the outside of the housing 11. The discharge port 711 of the pump 71 is connected to the outside communication hole 11*k* through a pipe of the heat medium circuit 70. At the inside of the housing 11, the outside communication hole 11*k* is communicated to the pressure chamber 24*a* of the differential pressure device 24 through the other-side portion 11*g* of the shaft insertion hole 11*f* and the communication passage 17*a* of the shaft 17. Therefore, the communication passage 17*a* of the shaft 17 of the present embodiment communicates between the discharge side of the pump 71 and the pressure chamber 24*a* of the differential pressure device 24.

Here, it should be noted that in the present embodiment, the housing 11 does not have the communication hole 11*j* of the first embodiment (see FIG. 1). Therefore, the shaft insertion hole 11*f* is not communicated with any of the first to fourth other-side spaces 11*b*-11*e*.

(1) In the case where the reverse pressure described above is applied from one of the first to fourth other-side spaces 11*b*-11*e* to the rotor 16, a source of this reverse pressure is the pump 71 of the heat medium circuit 70. As described above, according to the present embodiment, the communication passage 17*a* of the shaft 17 communicates between the discharge side of the pump 71, which is placed at the outside of the housing 11, and the pressure chamber 24*a* of the differential pressure device 24.

Therefore, even when the reverse pressure described above is generated from any one among the first to fourth other-side spaces 11*b*-11*e*, the discharge side of the pump, i.e., the source of this reverse pressure is communicated with the pressure chamber 24*a*, and thereby the rotor 16 can be urged against the stator 12 by the urging force which corresponds to this reverse pressure.

Thus, in the present embodiment, there is no need to use the check valve body 32 (see FIG. 11) as in the second embodiment described above or to change the connection destination of the communication passage 17*a* at the peripheral surface hole 172*b* (see FIG. 15B) of the shaft other-side portion 172 as in the third embodiment.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Fifth Embodiment

Next, a fifth embodiment will be described. In the present embodiment, points, which are different from the fourth embodiment described above, will be mainly described.

Figure 21:
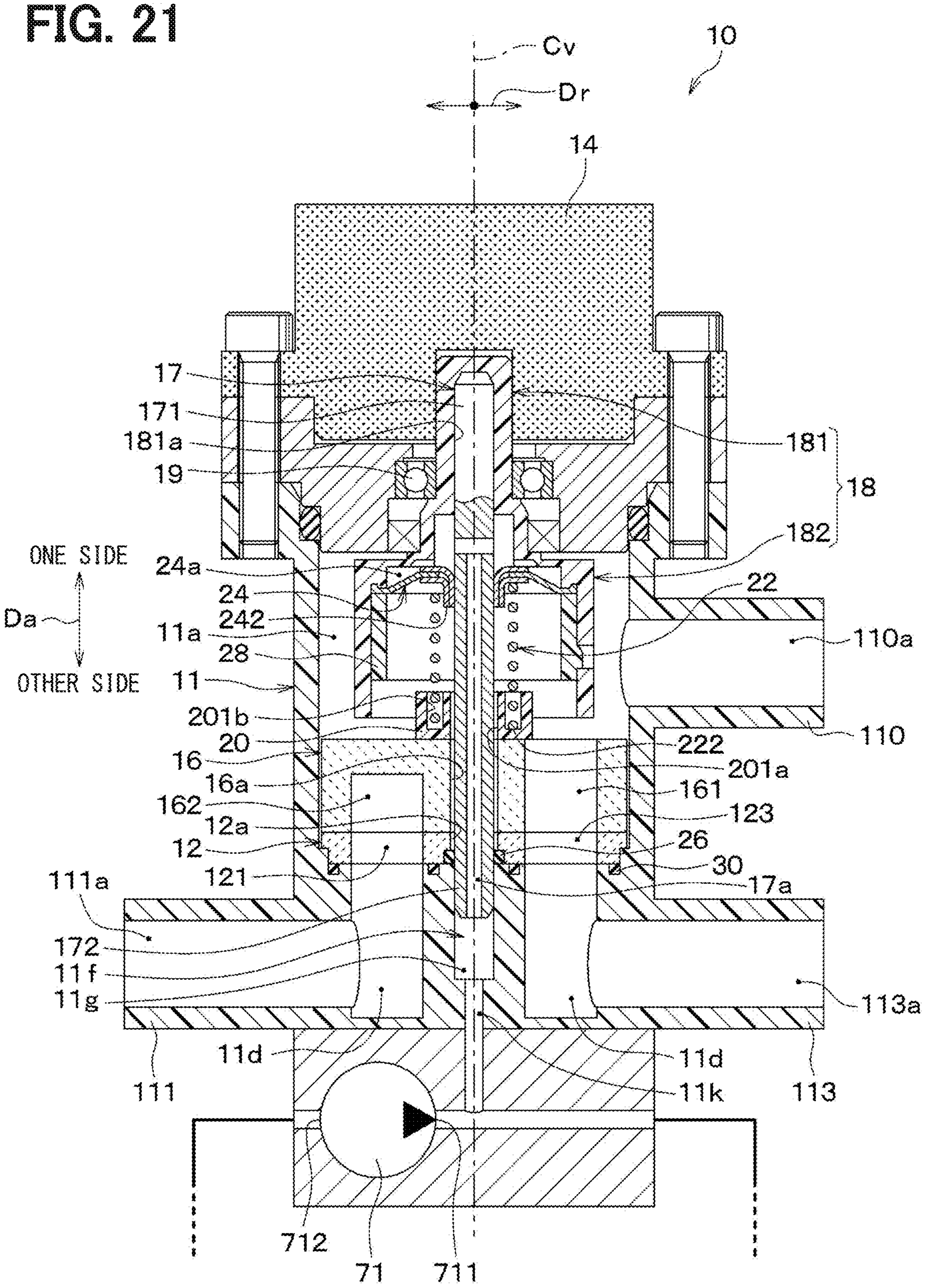
FIG. 21 is a schematic longitudinal cross-sectional view of a valve apparatus of a fifth embodiment, corresponding to FIG. 1.

As shown in FIG. 21, the pump 71 of the heat medium circuit 70 is formed integrally with the valve apparatus 10. Therefore, the pipe, which connects the discharge port 711 of the pump 71 to the outside communication hole 11*k* of the valve apparatus 10, is not required.

The rest of the present embodiment, which is other than the above-described points, is the same as that of the fourth embodiment. Furthermore, in the present embodiment, the advantages, which are achieved by the common configuration that is common to the fourth embodiment described above, can be obtained in the same manner as in the fourth embodiment.

Sixth Embodiment

Next, a sixth embodiment will be described. In the present embodiment, points, which are different from the first embodiment, will be mainly described.

Figure 22:
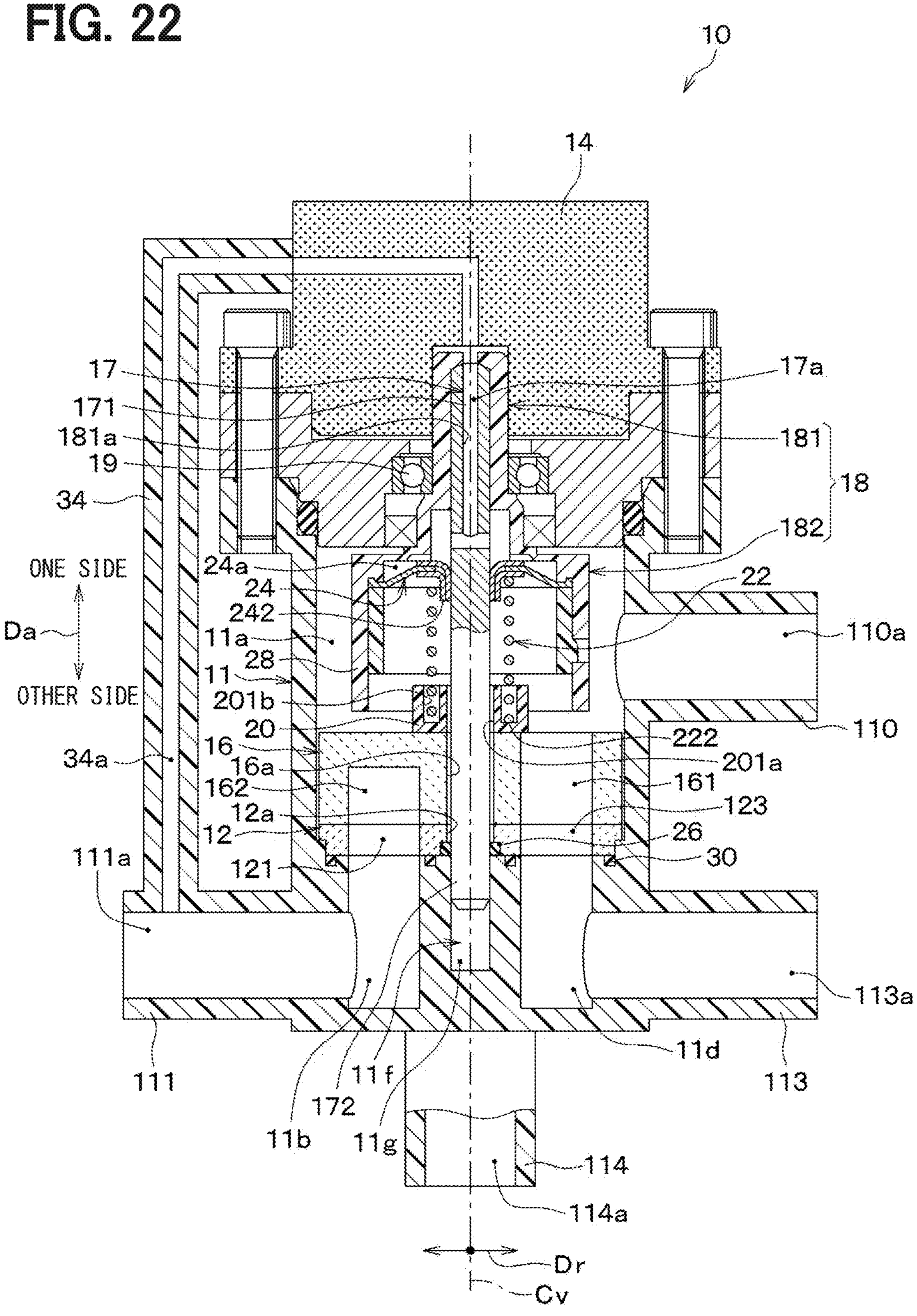
FIG. 22 is a schematic longitudinal cross-sectional view of a valve apparatus of a sixth embodiment, corresponding to FIG. 1.

As shown in FIG. 22, in the present embodiment, the housing 11 does not have the communication hole 11*j* of the first embodiment (see FIG. 1). Instead, the valve apparatus 10 of the present embodiment has an external pipe 34 which is placed at the outside of the housing 11. In the present embodiment, since the communication hole 11*j* (see FIG. 1) is absent, the shaft insertion hole 11*f* is not communicated with any of the first to fourth other-side spaces 11*b*-11*e*.

Furthermore, in the present embodiment, although the communication passage 17*a* of the shaft 17 is communicated with the pressure chamber 24*a*, the communication passage 17*a* extends from the pressure chamber 24*a* toward the one axial side instead of the other axial side in the valve axial direction Da. The communication passage 17*a* is communicated with the pressure chamber 24*a* through an end portion of the communication passage 17*a* placed on the other axial side in the valve axial direction Da and opens at an end surface of the shaft 17 which faces the one axial side in the valve axial direction Da.

Therefore, since the communication passage 17*a* of the present embodiment is not communicated with the shaft insertion hole 11*f*, the communication passage 17*a* is not communicated with the third other-side space 11*d*. However, the communication passage 17*a* is communicated with the first other-side port passage 111*a* through an external passage 34*a* formed in the external pipe 34. Thus, in the present embodiment, instead of the third other-side space 11*d*, the first other-side space 11*b* serves as an other-side space (one of at least one other-side space) of the present disclosure. The differential pressure device 24 generates the urging force that urges the rotor 16 against the stator 12 by the differential pressure between the pressure P1 in the pressure chamber 24*a* and the pressure P2 in the one-side space 11*a* in the case where the pressure in the first other-side space 11*b* is higher than the pressure P2 in the one-side space 11*a*.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Seventh Embodiment

Next, a seventh embodiment will be described. In the present embodiment, points, which are different from the first embodiment, will be mainly described.

Figure 23:
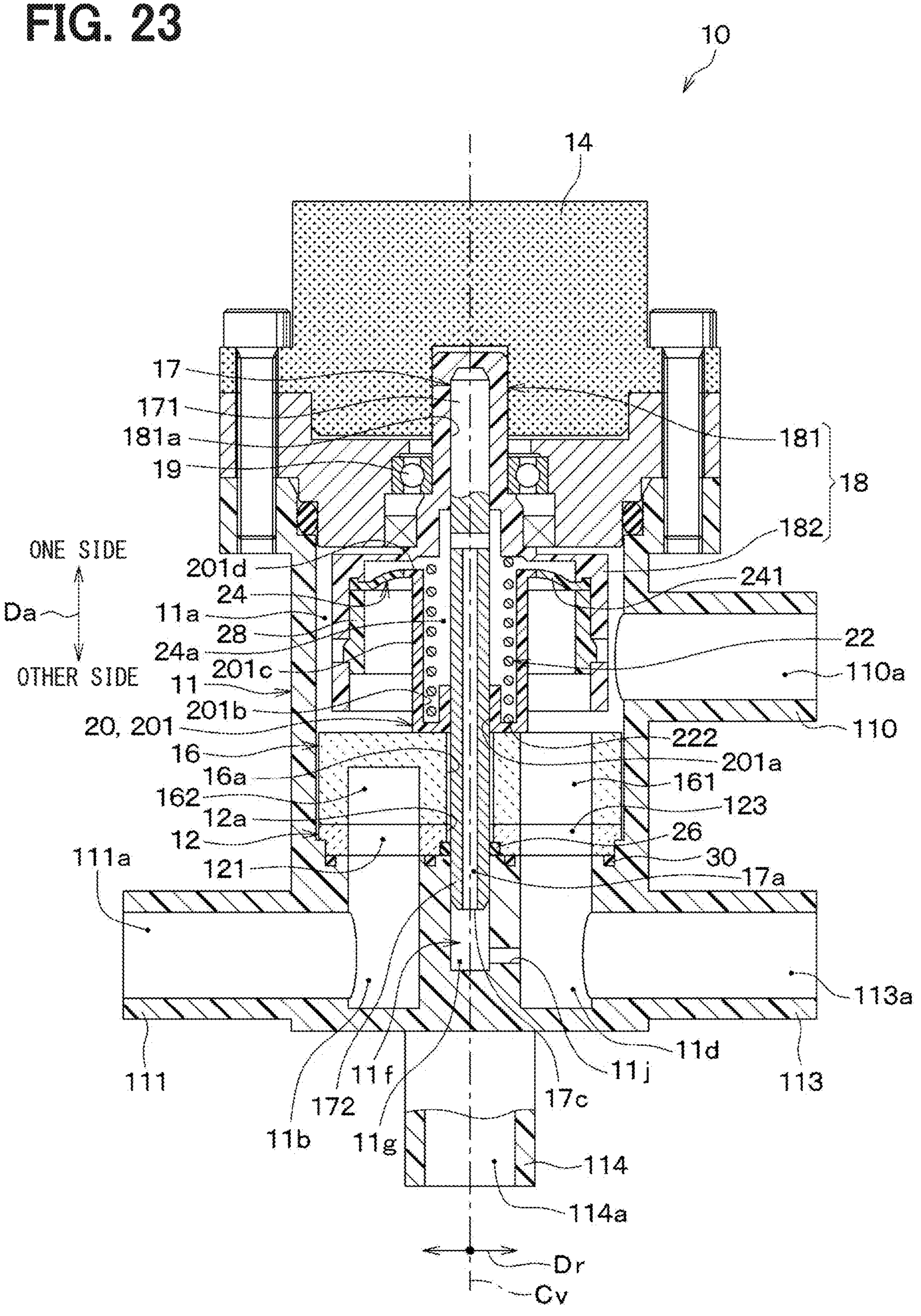
FIG. 23 is a schematic longitudinal cross-sectional view of a valve apparatus of a seventh embodiment, corresponding to FIG. 1.

As shown in FIG. 23, the valve apparatus 10 of the present embodiment does not have the urging portion 242 shown in FIG. 8. Instead, the differential pressure device 24, which forms the part of the valve apparatus 10, includes the lever center portion 201 as an urging portion that urges the rotor 16 toward the other axial side in the valve axial direction Da. Therefore, the lever center portion 201 is the part of the lever 20 and is also a part of the differential pressure device 24.

Since the urging portion 242 of the first embodiment is not provided in the present embodiment, for example, the one end portion 221 (see FIG. 8) of the urging spring 22 contacts the shaft body 18, and thereby the position of the one end portion 221 is maintained.

Specifically, the lever 20 of the present embodiment includes the lever center portion 201 and the pair of arm portions 202 like in the first embodiment. Therefore, even in the present embodiment, like in the first embodiment, the drive force of the actuator 14 is first transmitted to the shaft body 18 and is then transmitted from the shaft body 18 to the lever 20 and the rotor 16 in this order.

However, the lever center portion 201 of the lever 20 of the present embodiment has a central cylindrical tubular portion 201*c*. The central cylindrical tubular portion 201*c* is shaped in a cylindrical tubular form and extends toward the one axial side in the valve axial direction Da from a part of the lever center portion 201, which is placed on the radially outer side relative to the spring support groove 201*b* (see FIG. 4) in the valve radial direction Dr. The central cylindrical tubular portion 201*c* is placed on the radially outer side relative to the urging spring 22 in the valve radial direction Dr. The central cylindrical tubular portion 201*c* has one end portion 201*d* which faces the one axial side in the valve axial direction Da.

Furthermore, the inner peripheral end portion 241*b* (see FIG. 8) of the diaphragm 241 is fixed to the one end portion 201*d* of the central cylindrical tubular portion 201*c*. A gap between the inner peripheral end portion 241*b* of the diaphragm 241 and the one end portion 201*d* of the central cylindrical tubular portion 201*c* is airtightly sealed. As described above, since the central cylindrical tubular portion 201*c* is joined to the diaphragm 241, the central cylindrical tubular portion 201*c* forms a part of the pressure chamber 24*a* of the differential pressure device 24.

The urging spring 22 of the present embodiment is placed in the pressure chamber 24*a* of the differential pressure device 24. The urging spring 22 urges the rotor 16 toward the other axial side in the valve axial direction Da through the lever center portion 201.

Furthermore, the relationship between the lever center portion 201 and the shaft 17 of the present embodiment is set such that the relative movement between the lever center portion 201 and the shaft 17 in the valve axial direction Da is enabled. In the present embodiment, unlike the first embodiment, the peripheral wall surface of the insertion hole 201*a* of the lever center portion 201 is in contact with the shaft 17. The gap between the peripheral wall surface of the insertion hole 201*a* and the shaft 17 is airtightly sealed or is substantially sealed to such an extent that leakage of the heat medium through the gap is negligible.

(1) As described above, in the present embodiment, the urging spring 22 is placed in the pressure chamber 24*a* of the differential pressure device 24 and urges the rotor 16 toward the other axial side in the valve axial direction Da through the lever center portion 201. Therefore, in the structure where the urging spring 22, which urges the rotor 16 against the stator 12, is provided, the differential pressure device 24 can urge the rotor 16 without using the urging spring 22 at the time of urging the rotor 16 toward the other axial side in the valve axial direction Da.

Thereby, even when the differential pressure device 24 is actuated to urge the rotor 16 toward the other axial side in the valve axial direction Da, the lever center portion 201, which serves as the urging portion, is hardly displaced. That is, even when the differential pressure between the pressure P1 in the pressure chamber 24*a* (see FIG. 8) and the pressure P2 in the one-side space 11*a* is changed, the diaphragm 241 is hardly deformed. Therefore, the durability of the diaphragm 241 can be improved compared to the structure in which the differential pressure device 24 urges the rotor 16 through the urging spring 22.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Although the present embodiment is a modification based on the first embodiment, it is possible to combine the present embodiment with any one of the second to sixth embodiments described above.

Eighth Embodiment

Next, an eighth embodiment will be described. In the present embodiment, points, which are different from the first embodiment, will be mainly described.

Figure 24:
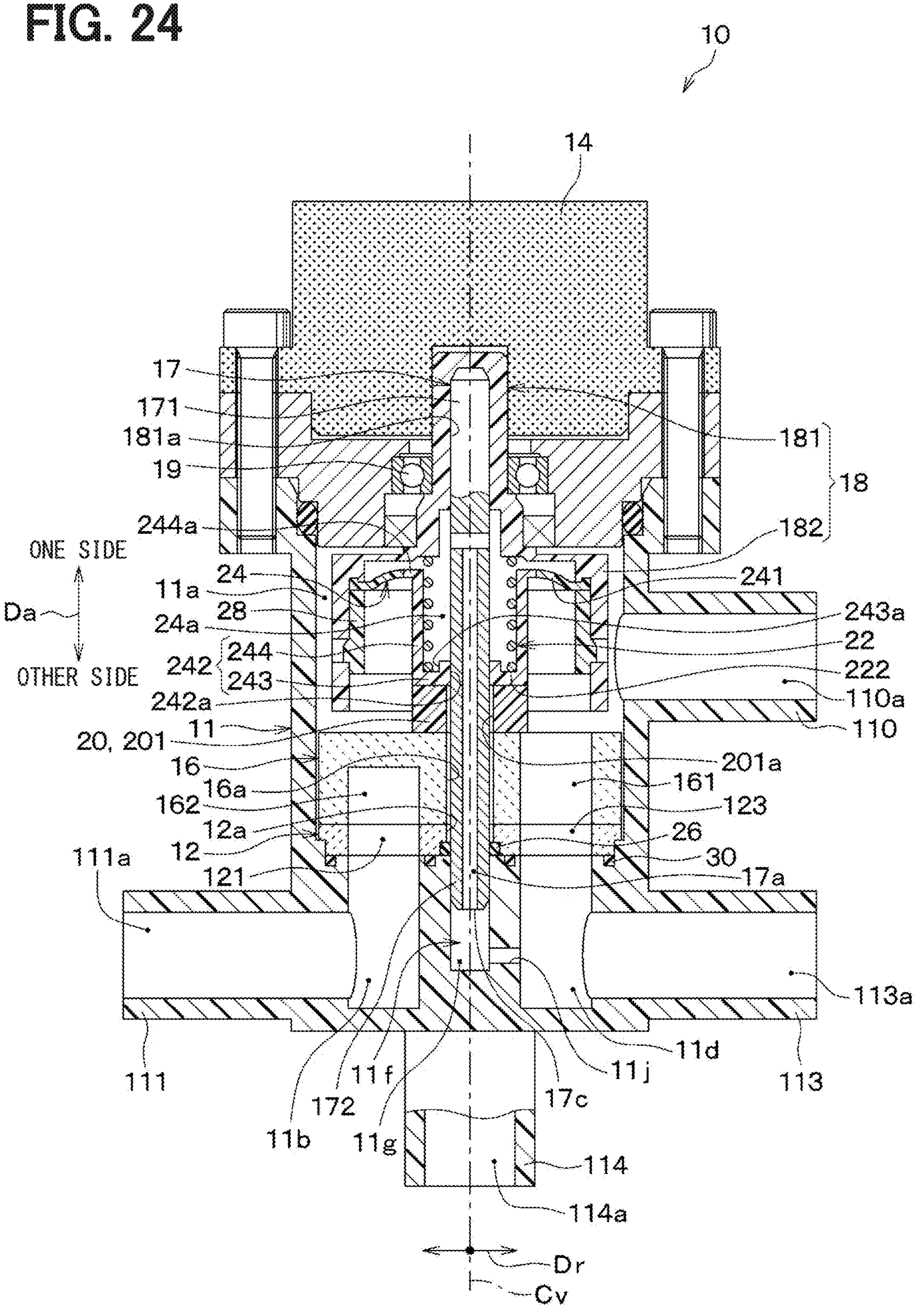
FIG. 24 is a schematic longitudinal cross-sectional view of a valve apparatus of an eighth embodiment, corresponding to FIG. 1.

As shown in FIG. 24, in the valve apparatus 10 of the present embodiment, although the insertion hole 201*a* is formed at the lever center portion 201, the spring support groove 201*b* (see FIG. 1) is not formed. Instead, the urging portion 242 of the differential pressure device 24 of the present embodiment has: a spring support portion 243 which has a spring support groove 243*a*; and a tubular portion 244.

In the present embodiment, except that the spring support groove 201*b* is absent, the lever 20 includes the lever center portion 201 and the pair of arm portions 202 like in the first embodiment. Therefore, even in the present embodiment, like in the first embodiment, the drive force of the actuator 14 is first transmitted to the shaft body 18 and is then transmitted from the shaft body 18 to the lever 20 and the rotor 16 in this order.

The spring support portion 243 of the present embodiment is placed on the one axial side relative to the lever center portion 201 in the valve axial direction Da, and the spring support portion 243 contacts the lever center portion 201 from the one axial side in the valve axial direction Da. Thus, the urging portion 242, which includes this spring support portion 243, can urge the rotor 16 toward the other axial side in the valve axial direction Da through the lever center portion 201 without using the urging spring 22.

The urging portion through-hole 242*a*, which is similar to the urging portion through-hole 242*a* of the first embodiment, is formed at the inside of the spring support portion 243, and the shaft 17 is inserted through the urging portion through-hole 242*a*. The spring support portion 243 is movable in the valve axial direction Da relative to the shaft 17 inserted through the urging portion through-hole 242*a*. The sealing at the urging portion through-hole 242*a* of the present embodiment is the same as that of the first embodiment, and the gap between the spring support portion 243 and the shaft 17 is airtightly sealed or is substantially sealed.

Like the spring support groove 201*b* of the first embodiment, the spring support groove 243*a* of the present embodiment circumferentially extends in a circular ring form centered on the valve central axis Cv. The spring support groove 243*a* has a groove bottom on the other axial side in the valve axial direction Da and an opening on the one axial side in the valve axial direction Da. The other end portion 222 of the urging spring 22 is inserted in the spring support groove 243*a*.

The tubular portion 244 extends toward the one axial side in the valve axial direction Da from an outer part of the spring support portion 243 which is placed on the radially outer side relative to the spring support groove 243*a* in the valve radial direction Dr, and the tubular portion 244 is shaped in a cylindrical tubular form centered on the valve central axis Cv. The tubular portion 244 is placed on the radially outer side relative to the urging spring 22 in the valve radial direction Dr. The tubular portion 244 has one end portion 244*a* which faces the one axial side in the valve axial direction Da.

Furthermore, the inner peripheral end portion 241*b* (see FIG. 8) of the diaphragm 241 is fixed to the one end portion 244*a* of the tubular portion 244. A gap between the inner peripheral end portion 241*b* of the diaphragm 241 and the one end portion 244*a* of the tubular portion 244 is airtightly sealed.

The urging spring 22 of the present embodiment is placed in the pressure chamber 24*a* of the differential pressure device 24. The one end portion 221 (see FIG. 8) of the urging spring 22 contacts the shaft body 18, and thereby the position of the one end portion 221 is maintained. The other end portion 222 of the urging spring 22 contacts the spring support portion 243 at the inside of the spring support groove 243*a*. Therefore, the urging spring 22 urges the rotor 16 toward the other axial side in the valve axial direction Da through the spring support portion 243 and the lever center portion 201.

The urging portion 242 of the differential pressure device 24 of the present embodiment is always urged against the lever center portion 201 by the urging spring 22. Therefore, in the present embodiment, the stopper (not shown), which defines the moving end of the urging portion 242 at the time of moving the urging portion 242 toward the one axial side in the valve axial direction Da, is not provided unlike the first embodiment.

(1) As described above, in the present embodiment, the urging spring 22 is placed in the pressure chamber 24*a* of the differential pressure device 24 and urges the rotor 16 toward the other axial side in the valve axial direction Da through the spring support portion 243 of the urging portion 242. Therefore, like in the seventh embodiment, in the structure where the urging spring 22, which urges the rotor 16 against the stator 12, is provided, the differential pressure device 24 can urge the rotor 16 without using the urging spring 22 at the time of urging the rotor 16 toward the other axial side in the valve axial direction Da.

Therefore, according to the present embodiment, like in the seventh embodiment, even when the differential pressure between the pressure P1 in the pressure chamber 24*a* (see FIG. 8) and the pressure P2 in the one-side space 11*a* is changed, the diaphragm 241 is hardly deformed. Therefore, the durability of the diaphragm 241 can be improved compared to the structure in which the differential pressure device 24 urges the rotor 16 through the urging spring 22.

The rest of the present embodiment, which is other than the above-described points, is the same as that of the first embodiment. Furthermore, in the present embodiment, the advantages, which are achieved by the common configuration that is common to the first embodiment described above, can be obtained in the same manner as in the first embodiment.

Although the present embodiment is a modification based on the first embodiment, it is possible to combine the present embodiment with any one of the second to sixth embodiments described above.

Other Embodiments (1) In each of the embodiments described above, as shown in, for example, FIGS. 1 and 2, the valve apparatus 10 is the five-way valve having the five ports 110, 111, 112, 113, 114. Alternatively, the valve apparatus 10 may be a two-way valve or a six-way valve. For example, in the case where the valve apparatus 10 is the two-way valve, the number of space(s) corresponding to the other-side spaces 11*b*-11*e* formed at the housing 11 of the present embodiment is one.

(2) In the first embodiment described above, as shown in FIGS. 1 and 4, the rotor 16 has the single opening-degree adjusting hole 161 and the single intercommunication groove 162. However, various passage patterns including the opening-degree adjusting hole 161 and the intercommunication groove 162 can be implemented. For example, the rotor 16 may have a V-shaped cutout in place of the opening-degree adjusting hole 161. Alternatively, the rotor 16 may not have the intercommunication groove 162 and may only have the opening-degree adjusting hole 161.

(3) In the second embodiment described above, as shown in FIG. 10, the shaft body 18 has the depressurizing hole 182*c*. However, this is only one example. The depressurizing hole 182*c* may be formed at any portion of the housing 11 that partitions between the one-side space 11*a* and the pressure chamber 24*a*. Furthermore, in a case where the heat medium slightly leaks between the urging portion 242 of the differential pressure device 24 and the shaft 17, this leaking portion, from which the heat medium leaks between the urging portion 242 and the shaft 17, may function as the depressurizing hole 182*c*.

Figure 25:
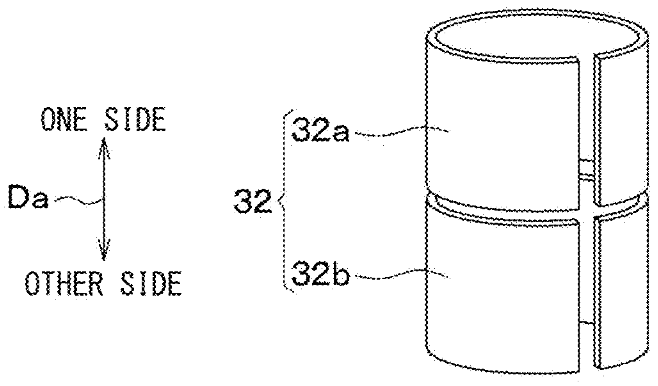
FIG. 25 is a perspective view of a check valve body alone of a valve apparatus according to a first modification of the second embodiment, corresponding to FIG. 13.

(4) In the second embodiment described above, as shown in FIGS. 11 and 13, the check valve body 32 is shaped in the simple wound plate form that is formed by winding the thin plate material by generally one turn along the peripheral wall surface of the other-side portion 11*g*. However, this is only one example. For example, as shown in FIG. 25, the check valve body 32 may be formed as follows. That is, the wound plate shown in FIG. 13 may be divided into two wound plates which are divided in the valve axial direction Da, so that the check valve body 32 includes: a one-side wound plate 32*a*; and an other-side wound plate 32*b* which is placed on the other axial side relative to the one-side wound plate 32*a* in the valve axial direction Da. In this case, the second check valve portion 322 and the fourth check valve portion 324 are included in the one-side wound plate 32*a*, and the first check valve portion 321 and the third check valve portion 323 are included in the other-side wound plate 32*b*.

Figure 26:
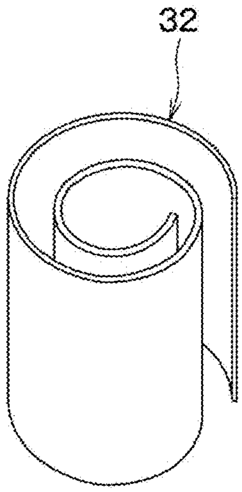
FIG. 26 is a perspective view of a check valve body alone of a valve apparatus according to a second modification of the second embodiment, corresponding to FIG. 13.

Furthermore, as shown in FIG. 26, the check valve body 32 may be shaped in a wound plate that is formed by spirally winding a thin plate material more than one turn.

Figure 27:
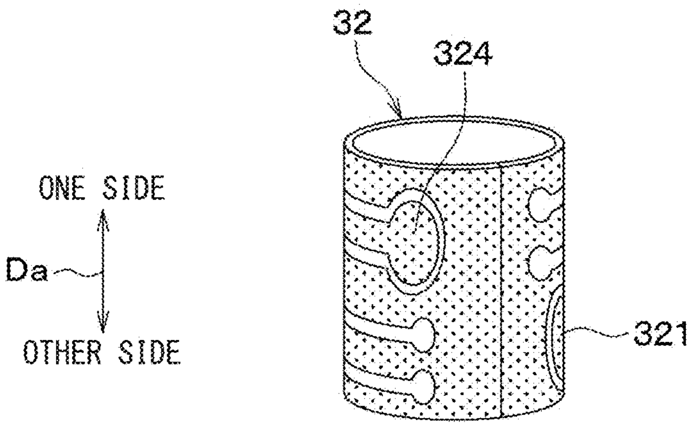
FIG. 27 is a perspective view of a check valve body alone of a valve apparatus according to a third modification of the second embodiment, corresponding to FIG. 13.

Furthermore, as shown in FIG. 27, the check valve body 32 may be formed such that a wound plate, which is wound by generally one turn, is partially cut, and thereby each of the first to fourth check valve portions 321, 322, 323, 324 is in a form of a reed valve. In FIG. 27, in order to clearly show the shape of the check valve body 32, uncut portions of the outer peripheral surface of the check valve body 32, which is not cut, are indicated with dot hatching, and the cutout portions of the outer peripheral surface of the check valve body 32 are indicated without the dot hatching.

Figure 28:
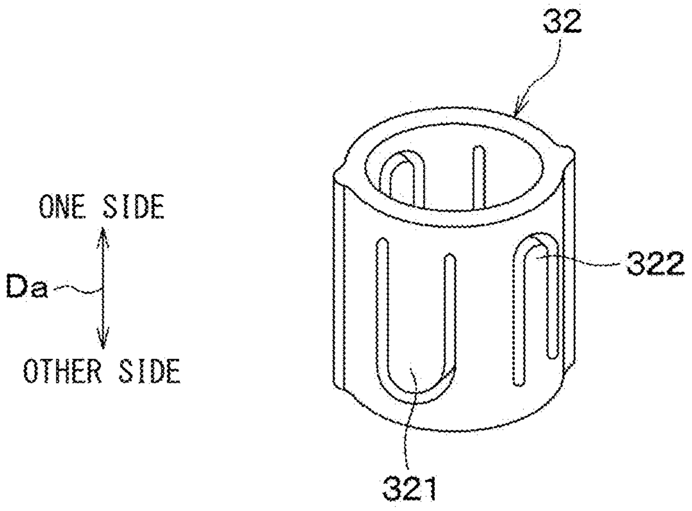
FIG. 28 is a perspective view of a check valve body alone of a valve apparatus according to a fourth modification of the second embodiment, corresponding to FIG. 13.

Furthermore, instead of forming the check valve body 32 by the wound plate formed from the thin plate material made of the metal or the resin, the check valve body 32 may be made from rubber, as shown in FIG. 28. Even in the check valve body 32 shown in FIG. 28, each of the first to fourth check valve portions 321, 322, 323, 324 is in a form of reed valve.

(5) In the fourth embodiment, as shown in FIG. 20, the one-side port passage 110*a* of the valve apparatus 10 is always communicated with the suction side of the pump 71. However, this is only one example. For example, the intermediate circuit 701 may have a structure that is different from the structure shown in FIG. 20 such that the discharge side of the pump 71 may be selectively connectable to the one-side port passage 110*a* in addition to the first to fourth other-side port passages 111*a*-114*a* of the valve apparatus 10. In this instance, in a case where the discharge side of the pump 71 is connected to the one-side port passage 110*a*, one of the first to fourth other-side port passages 111*a*-114*a* is connected to the suction side of the pump 71.

Even in the structure, in which the discharge side of the pump 71 can be connected to the one-side port passage 110*a*, the discharge side of the pump 71 is always connected to the outside communication hole 11*k* shown in FIG. 19 like in the fourth embodiment, and the discharge pressure of the pump 71 is always introduced into the pressure chamber 24*a*. That is, the discharge pressure of the pump 71 is introduced into the pressure chamber 24*a* in each of: the case where the forward flow of the heat medium is generated in the valve apparatus 10; and the case where the reverse flow of the heat medium is generated in the valve apparatus 10. Therefore, for example, in the case where the discharge side of the pump 71 is connected to the one-side port passage 110*a*, and the forward flow of the heat medium is generated in the valve apparatus 10, there is concern that the differential pressure device 24 may unnecessarily urge the rotor 16 against the stator 12.

However, in the case where the discharge pressure of the pump 71 is applied to the one-side port passage 110*a*, the pressure P2 in the one-side space 11*a* and the pressure P1 in the pressure chamber 24*a* shown in FIG. 8 are increased to the discharge pressure of the pump 71. Therefore, since the pressure difference is not generated between the one-side space 11*a* and the pressure chamber 24*a*, the urging force, which urges the rotor 16 against the stator 12, is not generated in response to the pressure P1 in the pressure chamber 24*a*. That is, in the case where the forward flow of the heat medium is generated, the differential pressure device 24 does not excessively urge the rotor 16.

(6) In the fourth embodiment described above, as shown in FIG. 20, there is only the single pump 71 in the heat medium circuit 70. However, this is only one example. For example, it is possible that, in addition to the pump 71 shown in FIG. 20, there may be an independent pump that has a constant discharge pressure, and the discharge side of this independent pump is not connected to any of the port passages 110*a*, 111*a*, 112*a*, 113*a*, 114*a*.

Furthermore, in this instance, in the case where the forward flow of the heat medium is generated in the valve apparatus 10, the discharge pressure of the independent pump may be set such that the pressure P1 in the pressure chamber 24*a* is slightly higher than the pressure P2 in the one-side space 11*a*.

This is because the pressure P2 in the one-side space 11*a* is reduced in the case of the reverse flow of the heat medium compared to the case of the forward flow of the heat medium, and the urging force of the differential pressure device 24, which urges the rotor 16, is larger in the case of the reverse flow than in the case of the forward flow. That is, this is because, as in the fourth embodiment, the urging force of the differential pressure device 24 is adjusted according to the amount of the reverse pressure applied to the rotor 16.

Thus, the urging force of the differential pressure device 24, which urges the rotor 16 against the stator 12 by the differential pressure between the pressure P1 in the pressure chamber 24*a* and the pressure P2 in the one-side space 11*a*, does not need to be zero in the case of the forward flow of the heat medium. In other words, this urging force of the differential pressure device 24 does not need to be zero even in the case where the pressure P2 in the one-side space 11*a* is higher than any one of the first to fourth other-side spaces 11*b*-11*e*.

In short, the urging force of the differential pressure device 24 should be generated at least when the pressure in any one of the first to fourth other-side spaces 11*b*-11*e* is higher than the pressure P2 in the one-side space 11*a*. The term "at least" described above means that the urging force of the differential pressure device 24 may be generated in a case that is other than the case where the pressure in any one of the first to fourth other-side spaces 11*b*-11*e* is higher than the pressure P2 in the one-side space 11*a*. Additionally, the term "at least" described above does not necessarily limit the structure of the differential pressure device 24 to the structure of the differential pressure device 24 which always generates the urging force in the case where the pressure in any one of the first to fourth other-side spaces 11*b*-11*e* is higher than the pressure P2 in the one-side space 11*a*.

(7) In each of the embodiments described above, the fluid, which flows through the valve apparatus 10, is the heat medium. Alternatively, the fluid may be another type of fluid that is other than the heat medium. Furthermore, the fluid, which flows through the valve apparatus 10, may be a gas rather than the liquid.

(8) In each of the embodiments described above, the valve apparatus 10 is installed in, for example, the hybrid vehicle, but the application of the valve apparatus 10 is not limited to the vehicle use.

(9) In each of the embodiments described above, as shown in FIG. 1, the valve apparatus 10 includes the actuator 14 to rotate the rotor 16. However, this is only one example. For example, the valve apparatus 10 may not include the actuator 14 and may rotate the rotor 16 by an external drive source that is placed at the outside of the valve apparatus 10.

(10) In each of the embodiments described above, the rotor 16 and the stator 12 shown in FIG. 1 are both made of the ceramic. Alternatively, for example, one or both of the rotor 16 and the stator 12 may be made of resin having high sliding performance.

(11) In each of the embodiments described above, as shown in FIG. 1, the housing 11 and the stator 12 are respectively formed as separate components. However, this is only one example. For example, the housing 11 and the stator 12 may be made as a single molded component that is formed integrally in one-piece.

(12) In each of the embodiments described above, as shown in FIG. 8, the differential pressure device 24 includes the diaphragm 241 to set the urging force, which urges the rotor 16 against the stator 12, to the appropriate amount that corresponds to the differential pressure between the pressure P1 in the pressure chamber 24*a* and the pressure P2 in the one-side space 11*a*. However, this is only one example. For example, it is possible that the differential pressure device 24 includes a piston mechanism instead of the diaphragm 241, and the differential pressure device 24 uses the piston mechanism to adjust the urging force, which urges the rotor 16 against the stator 12, to the amount that corresponds to the differential pressure described above.

(13) According to the first embodiment described above, as shown in FIG. 1, the communication passage 17*a*, which communicates between the third other-side space 11*d* and the pressure chamber 24*a*, is formed at the inside of the shaft 17. However, this is only one example. For example, this communication passage 17*a* may be connected to the pressure chamber 24*a* without passing through the shaft 17.

(14) In the first embodiment described above, as shown in FIG. 8, in the case where the pressure P1 in the pressure chamber 24*a* and the pressure P2 in the one-side space 11*a* satisfy the relationship of P1>P2, the differential pressure device 24 generates the urging force that urges the rotor 16 toward the stator 12 by the differential pressure between the pressure P1 and the pressure P2. However, this is only one example. For example, the differential pressure device 24 may generate the urging force described above on the condition that a predetermined value Px, which is larger than zero, is defined, and the pressure P1 and the pressure P2 satisfy a relationship of P1>P2+Px.

(15) In each of the embodiments described above, for example, as shown in FIG. 1, the urging spring 22 and the differential pressure device 24 are provided as the urging device which urges the rotor 16 against the stator 12. However, this is only one example. For example, it is possible that the differential pressure device 24 is provided, but the urging spring 22 is not provided.

(16) The present disclosure is not limited to the above-described embodiments and may be implemented in various variations. Further, the above embodiments are not unrelated to each other and can be appropriately combined unless the combination is clearly impossible.

Needless to say, in each of the embodiments described above, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when the material, the shape, the positional relationship or the like of the constituent elements of the embodiment is mentioned, the present disclosure should not be limited the material, the shape, the positional relationship or the like unless it is clearly stated that it is essential and/or it is required in principle.

Characteristics of Present Disclosure

First Aspect

A valve apparatus comprising:

a housing that is configured to conduct a fluid through an inside of the housing;

a passage hole forming portion that is placed in the housing and is not rotatable relative to the housing, wherein the passage hole forming portion has at least one passage hole which is configured to conduct the fluid through the at least one passage hole;

a rotor that is placed in the housing on one axial side relative to the passage hole forming portion in an axial direction of a predetermined central axis of the rotor, wherein the rotor is configured to rotate about the predetermined central axis while sliding relative to the passage hole forming portion; and a differential pressure device that is placed on the one axial side relative to the rotor in the axial direction and has a pressure chamber which is configured to receive the fluid, wherein:

the housing has:

a one-side space that is placed on the one axial side relative to the rotor in the axial direction; and at least one other-side space that is placed on another axial side, which is opposite to the one axial side, relative to the passage hole forming portion in the axial direction, wherein the at least one other-side space is communicated with the at least one passage hole;

the rotor is configured to increase or decrease an opening degree of the at least one passage hole relative to the one-side space in response to rotation of the rotor;

the differential pressure device is configured to generate an urging force that urges the rotor against the passage hole forming portion by a differential pressure between a pressure in the pressure chamber and a pressure in the one-side space at least when a pressure in the at least one other-side space is higher than the pressure in the one-side space; and the urging force is increased when the pressure in the pressure chamber is increased relative to the pressure in the one-side space.

Second Aspect

The valve apparatus according to the first aspect, wherein a communication passage is formed to communicate between the at least one other-side space and the pressure chamber.

Third Aspect

The valve apparatus according to the first aspect, comprising a shaft that is placed in the housing and extends from the one axial side relative to the passage hole forming portion and the rotor to the another axial side relative to the passage hole forming portion and the rotor along the predetermined central axis, wherein the shaft has a pressure-chamber exposed portion that is exposed in the pressure chamber, wherein:

a communication passage is formed at an inside of the shaft and is configured to communicate between the at least one other-side space and the pressure chamber; and the communication passage extends at the inside of the shaft in the axial direction from the one axial side relative to the passage hole forming portion and the rotor to the another axial side relative to the passage hole forming portion and the rotor, wherein the communication passage opens to the pressure chamber at the pressure-chamber exposed portion.

Fourth Aspect

The valve apparatus according to the third aspect, wherein the differential pressure device is supported through the shaft in a manner that enables rotation of the differential pressure device relative to the housing about the predetermined central axis, and the differential pressure device is configured to rotate integrally with the rotor about the predetermined central axis.

Fifth Aspect

The valve apparatus according to any one of the second to fourth aspects, comprising a first check valve portion and a second check valve portion, wherein:

the at least one other-side space is a plurality of other-side spaces formed in the housing;

the plurality of other-side spaces include a first other-side space and a second other-side space;

the at least one passage hole is a plurality of passage holes which are formed at the passage hole forming portion and correspond to the plurality of other-side spaces, respectively;

the communication passage is connected to each of the first other-side space and the second other-side space;

the first check valve portion enables the fluid to flow from the first other-side space to the communication passage and blocks the fluid from flowing from the communication passage to the first other-side space; and the second check valve portion enables the fluid to flow from the second other-side space to the communication passage and blocks the fluid from flowing from the communication passage to the second other-side space.

Sixth Aspect

The valve apparatus according to the fifth aspect, comprising a leakage passage that enables the fluid to leak from the pressure chamber to the one-side space in a case where the pressure in the pressure chamber is higher than the pressure in the one-side space.

Seventh Aspect

The valve apparatus according to the third or fourth aspect, wherein:

the at least one other-side space is a plurality of other-side spaces formed in the housing;

the plurality of other-side spaces include a first other-side space and a second other-side space, wherein the second other-side space is placed on one circumferential side relative to the first other-side space in a circumferential direction of the predetermined central axis;

the at least one passage hole is a plurality of passage holes which are formed at the passage hole forming portion and correspond to the plurality of other-side spaces, respectively;

the shaft is configured to rotate integrally with the rotor about the predetermined central axis;

when one of the plurality of other-side spaces has a highest-pressure among the plurality of other-side spaces, the one of the plurality of other-side spaces is defined as a highest-pressure space, wherein the highest-pressure space is changed from the first other-side space to the second other-side space in response to rotation of the rotor toward the one circumferential side in the circumferential direction; and the communication passage is communicated with the first other-side space when the first other-side space is the highest-pressure space, and the communication passage is communicated with the second other-side space when the second other-side space is the highest-pressure space.

Eighth Aspect

The valve apparatus according to the seventh, wherein:

the shaft has a shaft other-side portion that is placed on the another axial side relative to the passage hole forming portion in the axial direction;

the housing has:

an insertion hole that is placed on a radially inner side of the plurality of other-side spaces in a radial direction of the predetermined central axis and receives the shaft other-side portion;

a first communication hole that communicates between the first other-side space and the insertion hole; and a second communication hole that communicates between the second other-side space and the insertion hole;

the communication passage has a peripheral surface hole, wherein the peripheral surface hole is formed at the shaft other-side portion and opens at an outer peripheral surface of the shaft other-side portion;

the first communication hole and the peripheral surface hole are communicated with each other when the first other-side space is the highest-pressure space; and the second communication hole and the peripheral surface hole are communicated with each other when the second other-side space is the highest-pressure space.

Ninth Aspect

The valve apparatus according to the seventh or eighth aspect, wherein:

the first other-side space becomes the highest-pressure space when a first passage hole, which is one of the plurality of passage holes and is communicated with the first other-side space, is fully closed; and the second other-side space becomes the highest-pressure space when a second passage hole, which is another one of the plurality of passage holes and is communicated with the second other-side space, is fully closed.

Tenth Aspect

The valve apparatus according to the first aspect, wherein a communication passage is formed to communicate between the pressure chamber and a discharge side of a pump placed at an outside of the housing.

Eleventh Aspect

The valve apparatus according to the first aspect, wherein:

the valve apparatus forms a part of a fluid circuit in which the fluid is circulated by a pump;

in the fluid circuit, a discharge side of the pump is configured to connect with the at least one other-side space; and a communication passage is formed to communicate between the discharge side of the pump and the pressure chamber.

Twelfth Aspect

The valve apparatus according to the third or fourth aspect, wherein:

the differential pressure device includes:

a diaphragm that is placed on the another axial side relative to the pressure chamber in the axial direction and partitions between the pressure chamber and the one-side space; and an urging portion that is configured to urge the rotor toward the another axial side in the axial direction;

the shaft extends through the diaphragm;

the diaphragm has a movable end portion that is movable in the axial direction and is coupled to the urging portion; and the pressure in the pressure chamber acts to urge the urging portion toward the another axial side in the axial direction.

Thirteenth Aspect

The valve apparatus according to the twelfth aspect, comprising a resilient body that is installed in a state where the resilient body is compressed and is deformed in the axial direction, wherein the resilient body is configured to urge the rotor toward the another axial side in the axial direction by a repulsive force of the resilient body generated in response to the state where the resilient body is compressed and is deformed in the axial direction, wherein:

the resilient body is placed in the pressure chamber and is configured to urge the rotor through the urging portion.

Fourteenth Aspect

The valve apparatus according to any one of the first to twelfth aspects, comprising a resilient body that is installed in a state where the resilient body is compressed and is deformed in the axial direction, wherein the resilient body is configured to urge the rotor toward the another axial side in the axial direction by a repulsive force of the resilient body generated in response to the state where the resilient body is compressed and is deformed in the axial direction.

What is claimed is:

1. A valve apparatus comprising:

a housing that is configured to conduct a fluid through an inside of the housing;

a passage hole forming portion that is placed in the housing and is not rotatable relative to the housing, wherein the passage hole forming portion has at least one passage hole which is configured to conduct the fluid through the at least one passage hole;

a rotor that is placed in the housing on one axial side relative to the passage hole forming portion in an axial direction of a predetermined central axis of the rotor, wherein the rotor is configured to rotate about the predetermined central axis while sliding relative to the passage hole forming portion; and a differential pressure device that is placed on the one axial side relative to the rotor in the axial direction and has a pressure chamber which is configured to receive the fluid, wherein:

the housing has:

a one-side space that is placed on the one axial side relative to the rotor in the axial direction; and at least one other-side space that is placed on another axial side, which is opposite to the one axial side, relative to the passage hole forming portion in the axial direction, wherein the at least one other-side space is communicated with the at least one passage hole;

the rotor is configured to increase or decrease an opening degree of the at least one passage hole relative to the one-side space in response to rotation of the rotor;

the differential pressure device is configured to generate an urging force that urges the rotor against the passage hole forming portion by a differential pressure between a pressure in the pressure chamber and a pressure in the one-side space at least when a pressure in the at least one other-side space is higher than the pressure in the one-side space; and the urging force is increased when the pressure in the pressure chamber is increased relative to the pressure in the one-side space;

an urging portion of the differential pressure device is configured to be displaced toward the rotor in the axial direction and to mechanically urge the rotor against the passage hole forming portion when the pressure in the pressure chamber is higher than the pressure in the one-side space; and a diaphragm of the differential pressure device is fixed to the urging portion of the differential pressure device.

2. The valve apparatus according to claim 1, wherein a communication passage is formed to communicate between the at least one other-side space and the pressure chamber.

3. The valve apparatus according to claim 2, comprising a first check valve portion and a second check valve portion, wherein:

the at least one other-side space is a plurality of other-side spaces formed in the housing;

the plurality of other-side spaces include a first other-side space and a second other-side space;

the at least one passage hole is a plurality of passage holes which are formed at the passage hole forming portion and correspond to the plurality of other-side spaces, respectively;

the communication passage is connected to each of the first other-side space and the second other-side space;

the first check valve portion enables the fluid to flow from the first other-side space to the communication passage and blocks the fluid from flowing from the communication passage to the first other-side space; and the second check valve portion enables the fluid to flow from the second other-side space to the communication passage and blocks the fluid from flowing from the communication passage to the second other-side space.

4. The valve apparatus according to claim 3, comprising a leakage passage that enables the fluid to leak from the pressure chamber to the one-side space in a case where the pressure in the pressure chamber is higher than the pressure in the one-side space.

5. The valve apparatus according to claim 1, comprising a shaft that is placed in the housing and extends from the one axial side relative to the passage hole forming portion and the rotor to the another axial side relative to the passage hole forming portion and the rotor along the predetermined central axis, wherein the shaft has a pressure-chamber exposed portion that is exposed in the pressure chamber, wherein:

a communication passage is formed at an inside of the shaft and is configured to communicate between the at least one other-side space and the pressure chamber; and the communication passage extends at the inside of the shaft in the axial direction from the one axial side relative to the passage hole forming portion and the rotor to the another axial side relative to the passage hole forming portion and the rotor, wherein the communication passage opens to the pressure chamber at the pressure-chamber exposed portion.

6. The valve apparatus according to claim 5, wherein the differential pressure device is supported through the shaft in a manner that enables rotation of the differential pressure device relative to the housing about the predetermined central axis, and the differential pressure device is configured to rotate integrally with the rotor about the predetermined central axis.

7. The valve apparatus according to claim 5, wherein:

the at least one other-side space is a plurality of other-side spaces formed in the housing;

the plurality of other-side spaces include a first other-side space and a second other-side space, wherein the second other-side space is placed on one circumferential side relative to the first other-side space in a circumferential direction of the predetermined central axis;

the at least one passage hole is a plurality of passage holes which are formed at the passage hole forming portion and correspond to the plurality of other-side spaces, respectively;

the shaft is configured to rotate integrally with the rotor about the predetermined central axis;

when one of the plurality of other-side spaces has a highest-pressure among the plurality of other-side spaces, the one of the plurality of other-side spaces is defined as a highest-pressure space, wherein the highest-pressure space is changed from the first other-side space to the second other-side space in response to rotation of the rotor toward the one circumferential side in the circumferential direction; and the communication passage is communicated with the first other-side space when the first other-side space is the highest-pressure space, and the communication passage is communicated with the second other-side space when the second other-side space is the highest-pressure space.

8. The valve apparatus according to claim 7, wherein:

the shaft has a shaft other-side portion that is placed on the another axial side relative to the passage hole forming portion in the axial direction;

the housing has:

- an insertion hole that is placed on a radially inner side of the plurality of other-side spaces in a radial direction of the predetermined central axis and receives the shaft other-side portion;
- a first communication hole that communicates between the first other-side space and the insertion hole; and
- a second communication hole that communicates between the second other-side space and the insertion hole;

the communication passage has a peripheral surface hole, wherein the peripheral surface hole is formed at the shaft other-side portion and opens at an outer peripheral surface of the shaft other-side portion;

the first communication hole and the peripheral surface hole are communicated with each other when the first other-side space is the highest-pressure space; and the second communication hole and the peripheral surface hole are communicated with each other when the second other-side space is the highest-pressure space.

9. The valve apparatus according to claim 7, wherein:

the first other-side space becomes the highest-pressure space when a first passage hole, which is one of the plurality of passage holes and is communicated with the first other-side space, is fully closed; and the second other-side space becomes the highest-pressure space when a second passage hole, which is another one of the plurality of passage holes and is communicated with the second other-side space, is fully closed.

10. The valve apparatus according to claim 5, wherein:

the diaphragm is placed on the another axial side relative to the pressure chamber in the axial direction and partitions between the pressure chamber and the one-side space;

the shaft extends through the diaphragm;

the diaphragm has a movable end portion that is movable in the axial direction and is coupled to the urging portion; and the pressure in the pressure chamber acts to urge the urging portion toward the another axial side in the axial direction.

11. The valve apparatus according to claim 10, comprising a resilient body that is installed in a state where the resilient body is compressed and is deformed in the axial direction, wherein the resilient body is configured to urge the rotor toward the another axial side in the axial direction by a repulsive force of the resilient body generated in response to the state where the resilient body is compressed and is deformed in the axial direction, wherein:

the resilient body is placed in the pressure chamber and is configured to urge the rotor through the urging portion.

12. The valve apparatus according to claim 1, wherein a communication passage is formed to communicate between the pressure chamber and a discharge side of a pump placed at an outside of the housing.

13. The valve apparatus according to claim 1, wherein:

the valve apparatus forms a part of a fluid circuit in which the fluid is circulated by a pump;

in the fluid circuit, a discharge side of the pump is configured to connect with the at least one other-side space; and a communication passage is formed to communicate between the discharge side of the pump and the pressure chamber.

14. The valve apparatus according to claim 1, comprising a resilient body that is installed in a state where the resilient body is compressed and is deformed in the axial direction, wherein the resilient body is configured to urge the rotor toward the another axial side in the axial direction by a repulsive force of the resilient body generated in response to the state where the resilient body is compressed and is deformed in the axial direction.

15. The valve apparatus according to claim 1, wherein the urging portion is bushing.

16. The valve apparatus according to claim 15, further comprising a shaft that is placed in the housing and extends from the one axial side relative to the passage hole forming portion and the rotor to the another axial side relative to the passage hole forming portion and the rotor along the predetermined central axis, wherein the shaft is inserted into the bushing.

17. A valve apparatus comprising:

a housing that is configured to conduct a fluid through an inside of the housing;

a passage hole forming portion that is placed in the housing and is not rotatable relative to the housing, wherein the passage hole forming portion has at least one passage hole which is configured to conduct the fluid through the at least one passage hole;

a rotor that is placed in the housing on one axial side relative to the passage hole forming portion in an axial direction of a predetermined central axis of the rotor, wherein the rotor is configured to rotate about the predetermined central axis while sliding relative to the passage hole forming portion; and a differential pressure device that is placed on the one axial side relative to the rotor in the axial direction and has a pressure chamber which is configured to receive the fluid, wherein:

the housing has:

a one-side space that is placed on the one axial side relative to the rotor in the axial direction; and at least one other-side space that is placed on another axial side, which is opposite to the one axial side, relative to the passage hole forming portion in the axial direction, wherein the at least one other-side space is communicated with the at least one passage hole;

the rotor is configured to increase or decrease an opening degree of the at least one passage hole relative to the one-side space in response to rotation of the rotor;

the differential pressure device is configured to generate an urging force that urges the rotor against the passage hole forming portion by a differential pressure between a pressure in the pressure chamber and a pressure in the one-side space at least when a pressure in the at least one other-side space is higher than the pressure in the one-side space;

the urging force is increased when the pressure in the pressure chamber is increased relative to the pressure in the one-side space; and a communication passage is formed to communicate between the at least one other-side space and the pressure chamber.

18. A valve apparatus comprising:

a housing that is configured to conduct a fluid through an inside of the housing;

a passage hole forming portion that is placed in the housing and is not rotatable relative to the housing, wherein the passage hole forming portion has at least one passage hole which is configured to conduct the fluid through the at least one passage hole;

a rotor that is placed in the housing on one axial side relative to the passage hole forming portion in an axial direction of a predetermined central axis of the rotor, wherein the rotor is configured to rotate about the predetermined central axis while sliding relative to the passage hole forming portion; and a differential pressure device that is placed on the one axial side relative to the rotor in the axial direction and has a pressure chamber which is configured to receive the fluid, wherein:

the housing has:

a one-side space that is placed on the one axial side relative to the rotor in the axial direction; and at least one other-side space that is placed on another axial side, which is opposite to the one axial side, relative to the passage hole forming portion in the axial direction, wherein the at least one other-side space is communicated with the at least one passage hole;

the rotor is configured to increase or decrease an opening degree of the at least one passage hole relative to the one-side space in response to rotation of the rotor;

the differential pressure device is configured to generate an urging force that urges the rotor against the passage hole forming portion by a differential pressure between a pressure in the pressure chamber and a pressure in the one-side space at least when a pressure in the at least one other-side space is higher than the pressure in the one-side space;

the urging force is increased when the pressure in the pressure chamber is increased relative to the pressure in the one-side space;

the valve apparatus comprises a shaft that is placed in the housing and extends from the one axial side relative to the passage hole forming portion and the rotor to the another axial side relative to the passage hole forming portion and the rotor along the predetermined central axis, wherein the shaft has a pressure-chamber exposed portion that is exposed in the pressure chamber;

a communication passage is formed at an inside of the shaft and is configured to communicate between the at least one other-side space and the pressure chamber; and the communication passage extends at the inside of the shaft in the axial direction from the one axial side relative to the passage hole forming portion and the rotor to the another axial side relative to the passage hole forming portion and the rotor, wherein the communication passage opens to the pressure chamber at the pressure-chamber exposed portion.

* * * * *